(12) United States Patent
Pape et al.

(10) Patent No.: US 6,664,897 B2
(45) Date of Patent: Dec. 16, 2003

(54) METHOD AND SYSTEM FOR LIVESTOCK DATA COLLECTION AND MANAGEMENT

(76) Inventors: William R. Pape, 256 Highway 95, Los Ojos, NM (US) 87551; Matthew J. Morrison, 5491 Sage Ct., Johnstown, CO (US) 80534; Andrew J. Dolan, 9628 W. 70$^{th}$ Pl., Arvada, CO (US) 80004; Leland D. Curkendall, 2223 Thomes Ave., Cheyenne, WY (US) 82001; Olin M. Armentrout, 13185 Bethany Rd., Alpharetta, GA (US) 30004

( * ) Notice: Subject to any disclaimer, the term of this patent is extended or adjusted under 35 U.S.C. 154(b) by 0 days.

(21) Appl. No.: 10/073,485

(22) Filed: Feb. 11, 2002

(65) Prior Publication Data

US 2002/0158765 A1 Oct. 31, 2002

Related U.S. Application Data

(60) Continuation-in-part of application No. 09/544,388, filed on Apr. 6, 2000, now Pat. No. 6,346,885, which is a division of application No. 09/036,564, filed on Mar. 9, 1998, now Pat. No. 6,342,839.

(51) Int. Cl.$^7$ .............................................. G08B 23/00
(52) U.S. Cl. ................................. 340/573.3; 119/51.02
(58) Field of Search .......................... 340/573.3, 573.1; 119/51.02; 600/300

(56) References Cited

U.S. PATENT DOCUMENTS

| | | | |
|---|---|---|---|
| 4,288,856 A | 9/1981 | Linseth | 119/51.02 X |
| 4,463,353 A | 7/1984 | Kuzara | 119/51.02 X |
| 4,617,876 A | 10/1986 | Hayes | 119/51.02 X |
| 4,857,716 A | * 8/1989 | Gombrich et al. | 235/462 |
| 5,003,472 A | * 3/1991 | Perrill et al. | 235/375 X |
| 5,157,687 A | * 10/1992 | Tymes | 235/472 X |
| 5,315,505 A | 5/1994 | Pratt | 600/300 |
| 5,673,647 A | 10/1997 | Pratt | 119/51.02 |
| 5,803,906 A | 9/1998 | Pratt | 600/300 |
| 5,942,987 A | * 8/1999 | Heinrich et al. | 340/10.1 |
| 6,000,361 A | 12/1999 | Pratt | 119/51.02 |
| 6,318,289 B1 | 11/2001 | Pratt | 119/51.02 |
| 2002/0004752 A1 | * 1/2002 | Kuma | 705/23 |

OTHER PUBLICATIONS

RMS Research Management Systems USA Inc. Brochure: Cattle Data Network (Handout at NCBA Convention, Denver Feb. 2002).
RMS Brochure: National ID Technology (Handout at NCBA Feb. 2002).
RMS Brochure: Tagger Interface Module (Handout at NCBA Feb. 2002).
eMerse Interactive Brochure: Cattlelog LT (Handout at NCBA Feb. 2002).
eMerse Interactive Brochure: Cattlelog ME (Handout at NCBA Feb. 2002).

* cited by examiner

Primary Examiner—Thomas J Mullen
(74) Attorney, Agent, or Firm—Rick B. Yeager

(57) ABSTRACT

An efficient method and apparatus for livestock data collection and management is described to provide quality assurance source verification data and performance tracking for individual animals throughout the production cycle. Individual animal data is efficiently collected, transferred, and shared in a transactional, event-oriented, row-oriented structure with few columns without need for creating relational structures. The BeefLink™ software includes components for data collection and real-time data lookup components; share, switch, route, and interface components; extract, transform, and load components; and report and analyze data components. Embodiments include data acquisition from multiple RFID reader locations; a web-based information system for a beef marketing alliance; value-based procurement, and supply chain management.

2 Claims, 53 Drawing Sheets

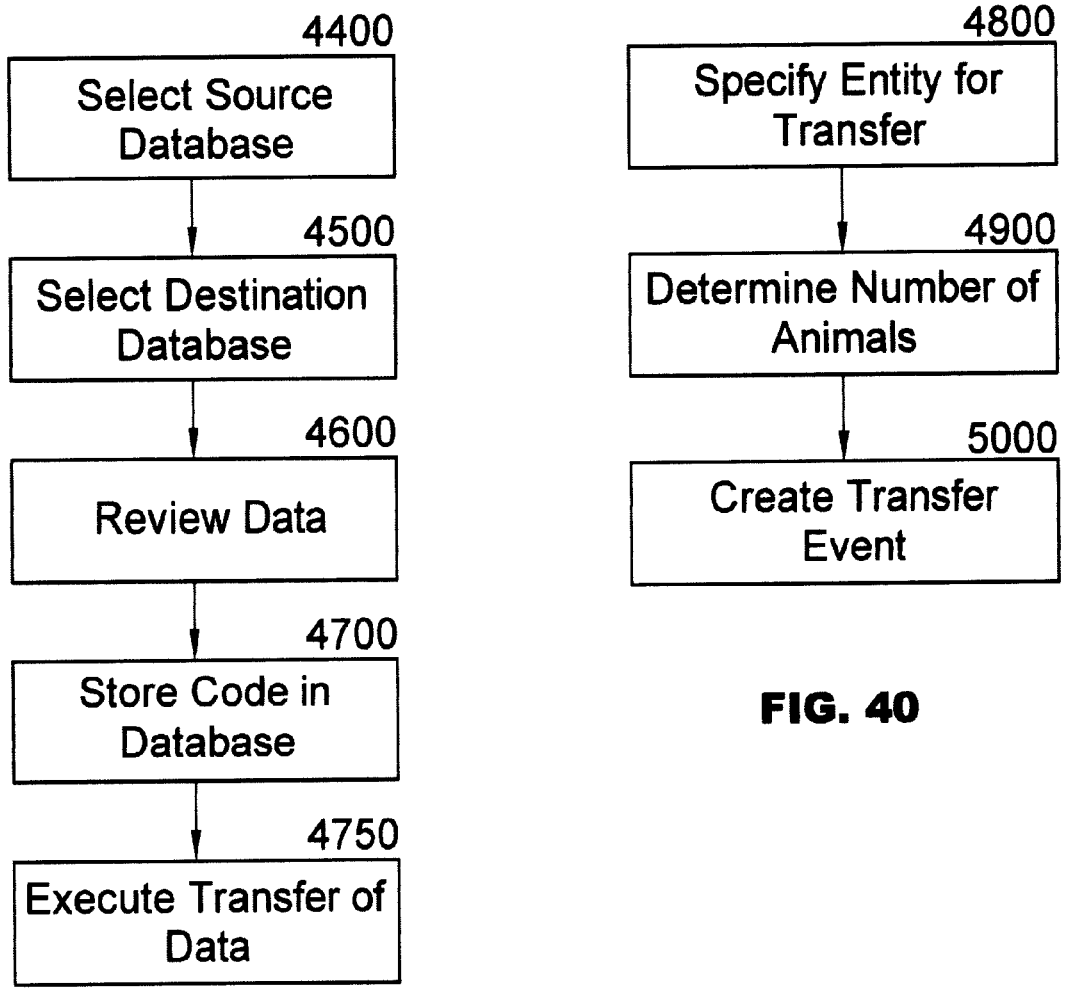

FIG. 52

| TagID | Dressing% | Plant_ID | Carcass_Wt | PYG | BackFat | REA | REA_Req | REA_Adjust | KPH | YG | YG_Group |
|---|---|---|---|---|---|---|---|---|---|---|---|
| 982000001137742 | 64.49 | 161230 | 894 | 3.60 | 0.64 | 13.80 | 14.6 | 0.2 | (0.20) | 3.64 | 3B |
| 982000003398327 | 64.49 | 161201 | 897 | 3.50 | 0.60 | 13.40 | 14.6 | 0.4 | (0.20) | 3.66 | 3B |
| 982000003398387 | 64.49 | 161202 | 881 | 3.30 | 0.52 | 15.50 | 14.3 | (0.4) | (0.20) | 2.74 | 2B |
| 982000001110227 | 64.49 | 161200 | 853 | 2.70 | 0.28 | 13.60 | 14.0 | 0.1 | (0.20) | 2.62 | 2B |
| 982000003398466 | 64.49 | 161199 | 859 | 2.80 | 0.32 | 13.60 | 14.0 | 0.1 | (0.20) | 2.72 | 2B |
| 982000001110235 | 64.49 | 161198 | 873 | 3.60 | 0.64 | 12.00 | 14.3 | 0.7 | (0.20) | 4.09 | 4 |
| 982000003436178 | 64.49 | 161197 | 873 | 2.80 | 0.32 | 12.80 | 14.3 | 0.5 | (0.20) | 3.05 | 3A |
| 982000001132545 | 64.49 | 161249 | 837 | 3.10 | 0.44 | 14.50 | 13.7 | (0.2) | (0.20) | 2.66 | 2B |
| 982000003446767 | 64.49 | 161241 | 910 | 2.80 | 0.32 | 15.70 | 14.6 | (0.3) | (0.20) | 2.27 | 2A |
| 982000003398352 | 64.49 | 161179 | 913 | 2.70 | 0.28 | 11.50 | 14.6 | 0.9 | (0.20) | 3.43 | 3A |
| 982000003446361 | 64.49 | 161243 | 823 | 2.70 | 0.28 | 15.00 | 13.7 | (0.4) | (0.20) | 2.11 | 2A |
| 982000003446489 | 64.49 | 161244 | 796 | 3.50 | 0.60 | 12.60 | 13.4 | 0.2 | (0.20) | 3.54 | 3B |

Event Table

- Animal ID
- Unique Event ID
- Parent ID
- Date/Time
- Event
- Event Detail
- Entity ID
- Security Level
- REM

FIG. 59

METHOD AND SYSTEM FOR LIVESTOCK DATA COLLECTION AND MANAGEMENT

CROSS-REFERENCE TO RELATED APPLICATIONS

This application is a continuation-in-part of application number 09/544,388 filed Apr. 6, 2000 as a Divisional Application of application Ser. No. 09/036,564, filed Mar. 9, 1998, entitled "Method and Apparatus for a Livestock Data Collection and Management System" which issued on Jan. 29, 2002 as U.S. Pat. No. 6,342,839. Application Ser. No. 09/544,388 is issued as U.S. Pat. No. 6,346,885 on Feb. 12, 2002.

BACKGROUND

1. Field of Invention

The present invention relates to a system, computer-program product and method for tracking processing events for a meat animal from its conception to its consumption, by using data entry devices that minimize keyboard entry and multiple interconnected databases such that a particular animal history can provide both quality assurance source verification and performance tracking.

2. Description of Related Art

Overview

There is a need, for both economic and quality assurance reasons, for an efficient and cost-effective method for identifying and tracking livestock, and for the monitoring of the processing of those livestock. Throughout the livestock production and processing cycle, there is a need for more detailed information so that ranchers, stockmen, feedlots, packers, distributors retailers, consumers, and others can make informed decisions about factors and variables such as genetics, herd management, purchasing, feed strategies, and ship dates. Producers who improve their animal performance can realize greater returns with performance based compensation when accurate information about the history and the value of each animal is easily available.

There is also a growing concern about quality assurance in the livestock processing cycle; and there is an opportunity for producers and processors who can establish that quality assurance to improve their compensation. Effective quality assurance programs such as HACCP, or Hazards Analysis and Critical Control Points, programs require accurate and timely information about the history of each animal. The certification of organic food products, hormone-free food products, and non-genetically modified food products requires an accurate history of those food products.

The Beef Industry

The beef industry is a good example of the livestock industry. Traditionally, there are four segments to the U.S. beef industry: the cow/calf producer, the stockman, the feedlot, and the packer.

The commercial cow/calf producer has a herd of mother cows that are used to produce calves. The cows are bred to bulls so that, ideally, each cow has a new calf each year. The calf crop that is produced each year is used primarily for meat production, with some calves retained as replacements for the herd. The calves are usually weaned from their mothers at between six and eight months of age. The traditional producer will sell his animals once they are weaned. Typically, the main objectives of the producer are to have a calf from each cow each year; to have healthy, vigorous calves with the highest weaning weights at the lowest cost; and to produce the best meat, by factors such as tenderness and taste, at the lowest cost.

In order to support these objectives, the producer is interested in efficient systems for identifying and tracking individual animals as they rotate through the producer's pastures; identifying which animals have a good calving history; monitoring the performance of various pastures; recording calf birth date and birth weight statistics and tracking the genetic history of each animal; evaluating the performance of calves from particular cows or bulls; recording the weaning date and weaning weight of each animal; and recording treatments, vaccinations, and other significant or events that have occurred in the animal's life.

The stockman receives the weaned calves when they weigh approximately 500 pounds, and feeds them for four to six months until they weigh 700 to 800 pounds. The stockman's typical objective is to add weight as fast as possible, while keeping the animals healthy. In order to support these objectives, the stockman is interested in collecting and using information such as identifying and tracking individual animals as they rotate through the stockman's pastures; recording beginning, ending, and periodic weight measurements and treatments; and recording vaccinations, movement and ownership changes, and other significant events that have occurred in the animal's life in order to track of the success of treatments as well as to eliminate duplicate treatments.

After the stockman phase, the animals are typically sent to a feedlot where they are fed a high-energy diet for about 150 days. At the feedlot, the cattle are in a finishing stage, where the main objective is to add pounds quickly while keeping the animals healthy. The cattle will be finished when they reach a weight of approximately 1,100 to 1,200 pounds. The feedlot is interested in animal weight gain, animal health, the effectiveness of various feed ration formulations, the characteristics of the feed consumed by an animal, required waiting periods on shipping animals after drug treatments, and animal origin and history.

The slaughter facility or packer typically slaughters the animal and then chills, ages and cuts the carcass into the various cuts of meat and packs those cuts for shipment to distributors and retailers. The packer also provides grade and yield ratings for the carcass. Important quality factors include the live animal weight, the carcass weight, a chilled weight; and the yield, grade, and quality of the carcass and carcass defects. The information collected by the packer is important to all of the upstream participants, because it allows them to adjust their management practices based on the actual quality and economic result for each animal. The upstream data is important to the packer because it permits the packer to select animals that produce the results desired by its customers.

Typically, each of these four segments, the cow/calf producer, the stockman, the feedlot, and the packer, have attempted to optimize their own operations, and there has been relatively little emphasis on cooperative optimization efforts. There is a growing recognition across these industry segments, however, that for both quality assurance reasons and for the improvement of the industry in general, it is desirable to improve data collection and data management. An object of the present invention is to provide improved data collection and data management and reporting.

Variability and Quality Control

There is variability in individual animal production efficiency and in individual carcass quality characteristics such as weight, frame size, muscling, fat content, marbling, and feed efficiency. This variation is due to a combination of genetic factors and environmental factors such as health and drug treatments, nutrition, growth history, and environmental and management factors such as geography, weather, and animal husbandry. Many of the genetic and environmental factors can be controlled or managed to improve both quality and economic return on investment if accurate historical information were available throughout the production cycle.

The livestock industry has recognized that certain livestock species and breeds outperform other species during production and processing. The prior art has used data collection systems and statistical analysis of data related to livestock breeds in order to identify higher performance breeds. There is a need to extend this data collection so that individual producers can make informed decisions about individual animals in order to further improve their herds.

Electronic Identification

Although it is possible to use manual identification methods for livestock and to employ manual data entry methods, it is desirable to automate the identification and data entry in order to reduce expense and to improve accuracy of the data. These devices typically produce either a unique alphanumeric code or a unique decimal code.

Electronic identification devices and systems have provided a good method for providing identification of livestock. Typically, electronic identification systems utilize a passive electronic identification device that is induced to transmit its identification signal by an externally radiating source. These passive electronic identification devices may be a transponder carried with the individual animal on a collar as illustrated and described in Carroll U.S. Pat. No. 4,475,481, issued Oct. 9, 1984, entitled "Identification System" and in Kuzara U.S. Pat. No. 4,463,353, issued Jul. 31, 1984, entitled "Animal Feeding and Monitoring System"; in an ear tag such as those commercially available from Destron/Fearing, Inc., Allflex USA, Inc. and Avid Marketing, Inc.; in a transponder implanted in the animal as illustrated and described in Pollack U.S. Pat. No. 4,854,328, issued Aug. 8, 1989, entitled "Animal Monitoling Telltale and Information System" and in Hanton U.S. Pat. No. 4,262,632, issued Apr. 21, 1981, entitled "Electronic Livestock Identification System"; or in a bolus such as illustrated and described in U.S. Pat. No. 4,262,632, issued Apr. 21, 1981, entitled "Electronic Livestock Identification System" by John P. Hanton and Harley A. Leach.

Although electronic identification through radio frequency identification (RFID) tags or barcodes are used in some phases of the livestock production cycle, there is a need to provide a means for individual animal identification throughout the production cycle and to minimize the difficulty of data entry throughout the industry, by interfacing with identification technologies such as RFID, barcode, retina scan, iris scan, DNA, and visual identification.

RFID Readers

Several RFID readers are commercially available, typically from the transponder suppliers, including models from Destron/Fearing, Inc., Allflex USA, Inc., Avid Marketing, Inc., and Tag Tracker™ from InfoClip LLC.

The prior art includes RFID readers that can distinguish multiple types of RFID transponders as illustrated and described in U.S. Pat. No. 5,235,326, issued Aug. 10, 1993, "Multi-Mode Identification System" to Michael L. Beigel, Nathaniel Polish, and Robert E. Malm.

Databases and Management Systems

At different stages of the production cycle, there are different databases, which exist for different business purposes. The rancher will typically maintain his own database, a stockman will have an inventory system, a feedlot will have a management database, and a packer will have its own inventory and management system. There is also a trend toward larger marketing alliance or national databases that include some data from each of these industry segments.

U.S. Pat. No. 5,322,034, which issued Jun. 21, 1994 to Richard L. Willham, for a "Livestock Record System" describes a method for storing the individual animal's identification and performance data on a programmable electronic identification and data storage module carried with the animal. An object of the present invention is to provide a low-cost per animal system for obtaining and maintaining source verification and performance databases that are independent of the animal.

U.S. Pat. No. 5,315,505 issued to William C. Pratt on May 24, 1994 for a "Method and System for Providing Animal Health Histories and Tracking Inventory of Drugs" describes a method and system for providing improved drug treatment to selected animals in a retained group. A computer system is used to provide an operator with the health and drug treatment history of an animal. With this information and a diagnosis of the animal's health condition, a drug treatment is chosen. The diagnosis and treatment are entered into the computer system to update the animal's health and treatment history. An object of the present invention is to provide complete source verification and performance databases for all key livestock events.

U.S. Pat. No. 5,673,647 for a "Cattle Management Method and System", issued on Oct. 7, 1997 to William C. Pratt, describes an automated method and system for providing individual animal electronic identification, measurement and value based management of cattle in a large cattle feedlot. That method includes individual animal identification, a computer system, and multiple measurements coupled with a cattle handling and sorting system. An object of the Pratt patent was to build a feedlot database to more accurately identify and measure characteristics such as weight, so that subsequent animals could be produced and fed for more effective value-based selection and management of the animals. In particular, that database related to calculations for economic management of feeding and shipping to permit optimum weight gains and feedlot ship dates. Whereas the feedlot patent disclosed identifying a particular animal on arrival at the feedlot, an object of the present invention is to track individual animals throughout the production cycle and to maintain performance and source verification data in the least disruptive manner to existing databases and management systems.

SUMMARY OF THE INVENTION

The present invention relates to a system, computer program product and method for identifying, tracking and monitoring livestock. The resulting information will provide a basis for entities in a supply chain, such as the producer, the stockman, the feedlot, and the packer to make informed herd management and operational decisions.

An object of the present invention is to provide an effective data collection and database management methodology in the livestock industry. The present invention includes a database computer program product for maintenance and entry of data associated with livestock. Data may be entered into the invention in the form of events, which are significant occurrences in the livestock production and processing cycle, and include items such as vaccinations, medications, treatments, live weight, weight gain, slaughter date and carcass weight. Using the computer program product, the user may: enter new animals into the database; look up information, including identifying information and events, on animals which have already been input into the database; and run queries on information contained on the database. Using the computer program product, the user may also: apply an individual event to a group of animals; apply multiple events to a group of animals; determine an animal's average daily weight gain; determine the best time for an animal to go to slaughter based on target weight; manage hardware devices that support automated entry of the animal's identification and data associated with that animal; use his or her own local terminology when applying events to an animal's record; import data into the database after collecting the data from another application; send data to a spreadsheet while pointing the data to specific worksheets and cells within the spreadsheet; transfer animal data from one database to another on the same machine or within a network such as the world wide web; transfer animal records from one entity to another; and communicate with other databases for sharing information concerning the livestock.

With the addition of RFID transponders for each animal and "event/detail" transponders, the computer program product becomes part of a system such that an RFID reader may be used to read the transponders thereby facilitating automated entry of individual animal identification and automated entry of events and details associated with a particular animal. Events and event details may be aliased, and data entry simplified, such as through RFID, bar codes, function keys, memory buttons. With the addition of radio frequency wireless communications, the system becomes even more convenient and easy to use. The system also includes audio feedback to confirm receipt of data into the system and multiple interconnected databases to facilitate the transfer and maintenance of animal data. One result of this invention is that quality assurance source verification data for individual animals will be available throughout the production and processing cycle. This source verification will include the ability to implement HACCP plans. The source verification provides an opportunity for enhanced product value through improved quality assurance and food safety.

Another result of this data collection and management invention is that animal-specific performance information can be provided to the producer, the stockman, and the feedlot, and the packer so that those entities can make informed herd management and operational decisions. Improved information availability permits all segments of a supply chain such as the livestock industry to reduce cost of operations while improving product quality. The opportunities for process improvement range from avoiding duplicate treatments; to selecting more cost effective breeding stock; to selecting more cost effective feeds. As part of the production process, other entities, which are not usually in the chain of title to an animal, also have an interest in a portion of the data. Veterinarians can access the health history, nutritionists can access the feed and health history, and bankers can know the location of their collateral. Authorization levels designate what information may be made available to these entities.

The data collection and management capability is provided in a seamless and non-intrusive manner to all participants. The system encourages the collection and storage of data by putting the majority of the data collection and management process in the background, transparent to the user.

Through the current invention, the complete history of an animal is equally available throughout the production cycle, and both source verification and specific performance information are accessible without unnecessary duplication of data.

One result of this data collection and management invention is that quality assurance and source verification data for individual animals will be available throughout the production cycle. This source verification will include the ability to implement HACCP plans. The source verification provides an opportunity for enhanced product value through improved quality assurance and food safety.

Another result of this data collection and management invention is that specific information can be provided throughout the supply chain so that entities in the supply chain can make informed management and operational decisions. Improved information availability permits segments of the supply chain to reduce their cost of operations while improving product quality. In the livestock industry, some opportunities for process improvement include avoiding duplicate treatments; selecting more cost effective breeding stock; and selecting more cost effective feeds.

Although the invention is described in the context of beef cattle, it is not so limited. It should be apparent to those skilled in the art that the invention can be modified, without departing from its principles, for other livestock including cattle, swine, sheep, goats, and fowl; and to other agricultural products including grain, fruits, and feedstuffs.

DESCRIPTION OF FIGURES

These and other features, aspects, and advantages of the present invention will become better understood with regard to the following description, appended claims, and accompanying drawings where:

FIG. 39 is a flowchart for the transfer of animal data in the embodiment of FIG. 36.

FIG. 40 is a flowchart for the transfer of an animal in the embodiment of FIG. 36.

FIG. 52 is a sample Lot Overview screen for an example AgInfoLink.net system.

FIG. 56 is a sample Select Kill Lot screen for an example AgInfoLink.net system.

FIG. 58 is a sample 4-View Comparison screen for an example AgInfoLink.net system.

FIG. 59 shows a transactional data structure event table.

DETAILED DESCRIPTION OF THE INVENTION—WIRELESS EMBODIMENT

Figure 4:
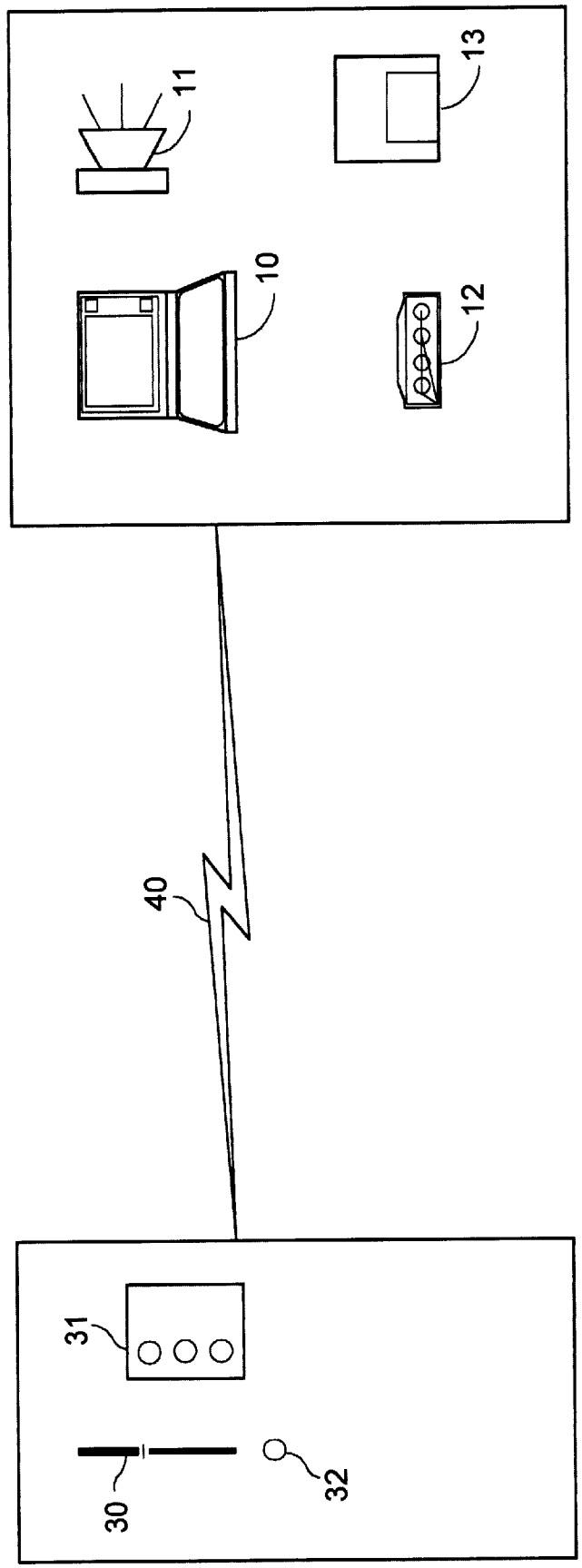
FIG. 4 is a schematic showing a wireless radio frequency data communication (RFDC) connection between the RFID reader and a host computer.

An embodiment of the computer system disclosed herein operates using a programmable IBM®-compatible laptop host computer. Other hosts include other devices and operating systems including hand held devices. Referring now to FIG. 4 illustrating this embodiment for the computer system, the host computer 10 includes a central processing unit; a coprocessor; a display device; a random access memory; a read only memory; a first data storage means; a second data storage means; a third data storage means; memory controllers; motherboard resources; a keyboard; a sound card and driver; external power supply with DC connection; and a USB or serial port. BEEFLINK™ data collection software, a means for accessing the BEEFLINK™ database, a means for accessing portions of the BEEFLINK™ software by hyperlink, and an operating system run on the host computer 10. A speaker 11 is connected to the host computer 10 such that information recorded into the BEEFLINK™ data collection software's database by the reader or by key entry may be audibly confirmed. When the host computer 10 confirms that any information, including a transponder reading, was handled within the BEEFLINK data collection software, the reading of a .WAV file is initiated in the host computer and the .WAV file is played through the PC sound card to the speaker 11.

EXAMPLE

Wireless Communication and Data Consolidation

In order to better understand the invention, key portions of the invention are described as examples, and larger examples are used to show how the pieces are integrated in the invention.

Figure 5:
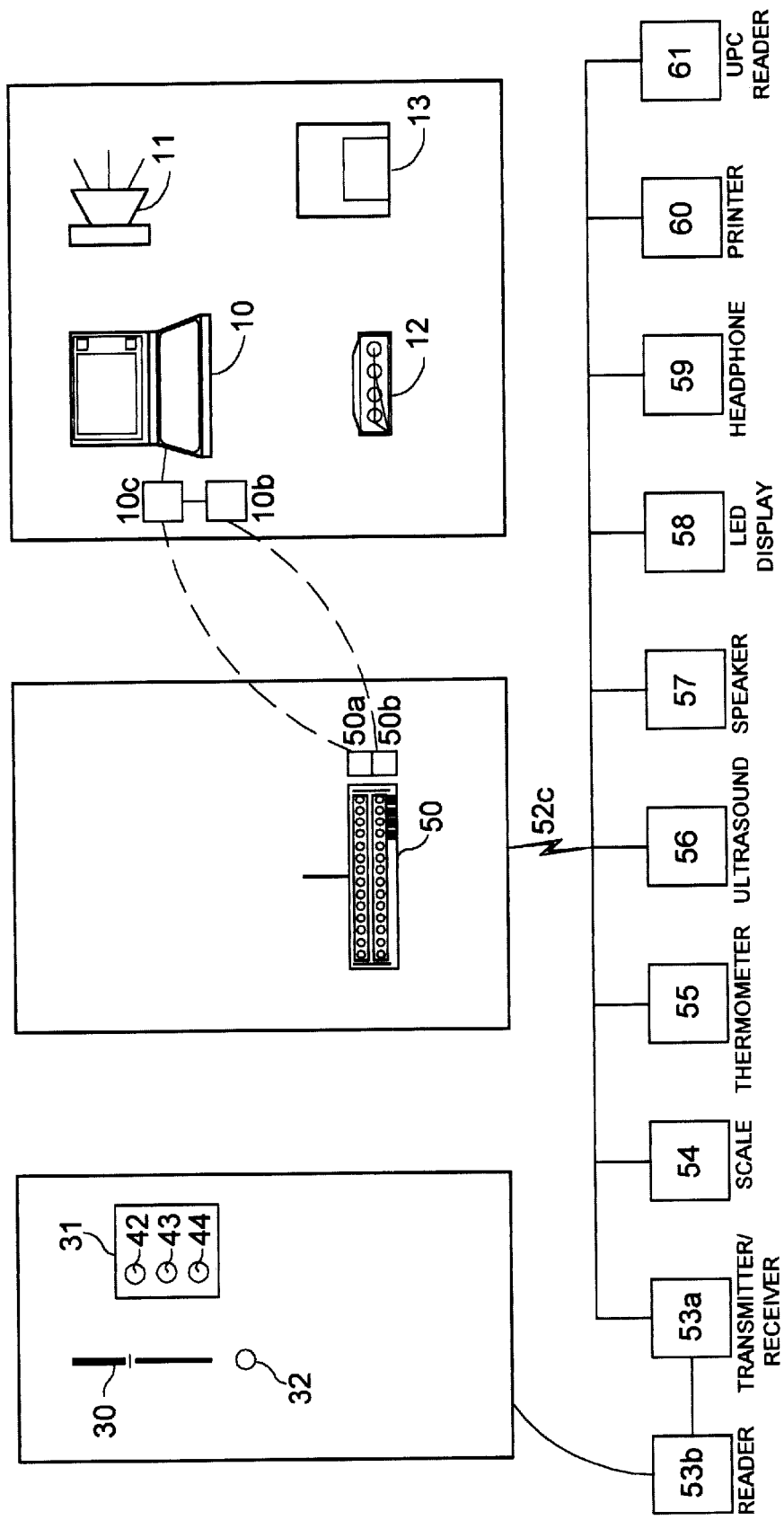
FIG. 5 is a schematic showing a wireless radio frequency data communication (RFDC) connection to a base station transmitter/receiver located between the RFID reader and a host computer.

Referring now to FIG. 5, an animal is uniquely identified by means of a radio frequency identification (RFID) ear tag 32 or other type of identifier such as bar code, iris or retinal, DNA, or visual identifier. The preferred identification is an RFID ear tag such as those provided by Y-Tex Corporation, SFK Technology, Destron/Fearing, Inc., Allflex USA, Inc, Avid Marketing, Inc. Alternately, the identification may be by means of an RFID implant, a rumen bolus, or a collar fitting on a neck or leg.

This RFID identification is typically applied at the first opportunity to pen and work the animals, such as at an initial immunization or branding. The identification typically remains with the animal until the time of its slaughter. The RFID identification, typically will have previously been applied to older breeding animals.

As the animal is typically restrained in a working chute, its identification may be determined by means of an RFID reader 30. This identification is accomplished by placing the reader near, typically within six inches, of an RFID ear tag or implant transponder. The rumen bolus has a greater range. The preferred reader is described in more detail in an alternative embodiment described below.

Typical events performed on the animal may also be captured without keyboard entry by means of a Work Card 31 which is a collection of common tasks or events that are assigned unique RFID transponder codes, indicated as transponders 42, 43 and 44, such that the reader can designate an event by reading the transponder associated with an event. This reading is accomplished by placing the reader near the transponder. Alternately, the event transponders can be placed separately at convenient locations in the work area. The event transponders will typically be labeled with text or symbols to identify the event. Events may also be imported from other programs such as third party software, and may be manually entered such as with a Cattle Card™ system described in another example.

The reader communicates by means of radio frequency data communications (RFDC) to a radio frequency receiver/transmitter that is connected by serial or USB port 50a to the computer. The reader may be connected by direct cable linkage to the port, or preferably, will communicate by radio frequency data communications means 52c from a base station transmitter/receiver located on the reader to a transmitter/receiver connected to port 50a.

Other livestock measurement data can be collected through serial or USB port connections such as a scale 54, a thermometer 55, or an ultrasound measurement device 56. Various output devices including audio feedback means such as a speaker 57 or a headphone 59, an LED display 58, a printer 60, or a UPC Barcode printer or reader 61 can be connected to the computer. The audio feedback means may be a specified .wav file, a default .wav file, or a simple "ding".

The data is received by the computer through the base station. The preferred communication is a radio frequency link 52 between a transmitter/receiver 71 attached to the data concentrator and a transmitter/receiver 72 attached to an interface board in the computer. The computer may include a keyboard, a monitor, and a speaker 11. Data may be stored to a diskette 13, but will typically be transferred by means of a modem. The computer is preferably an IBM compatible laptop or desktop computer. Beeflink™ software runs on the computer to provide the livestock data entry management function. The computer is connected by means of network adapter or modem 12 to other computers as described more fully in other example embodiments.

This embodiment permits a portable reader to be used in a remote location to gather animal and event data and to communicate that data to a host computer.

The host computer preferably has a Windows 98 or above operating system, and at least one serial or USB port.

EXAMPLE

Single Port Communication to Remote Radio Frequency Identification Readers and Data Collection Devices Referring now to FIG. 5, in this embodiment, a remote transmitter/receiver 53a is incorporated into each of one or more RFID readers, and is in two-way wireless communication 52c to a base station 50. Multiple readers can be used for a single base station; and the base station requires only one input port 10c to the computer 10. Other data input devices such as scales 54 and thermometers 55 communicate with the base station through a remote for each such input device. When a remote device is installed, the Base Station Unit detects its presence and assigns a device identification. This information is relayed to the Host PC via the cabled connection (USB, RS485 or RS232). The Host PC makes the software application association through Beeflink or through included InfoClip driver software. Two-way communication between the host and the remote permit configuration such as specifying the baud rate of a device once the remote is detected. Multiple channels permit a one-to-many relationship between the host computer and the remotes.

An improved RFID reader 53b includes a microprocessor which scrubs the data and assigns a unique device number to the data. The communication utilizes spread spectrum 2.4 gHz with frequency hopping. An internal dipole antenna on the reader has a range of up to about 0.5 miles from the base station. The transceiver inside the reader can be procured with a RF connector which would allow the use of another internal antenna which would increase the RFDC range. An optional external antenna has a range of over 20 miles (Note this antenna configuration requires FCC approval). The same type of transmitter/receiver and firmware can be used to transmit data from the other measurement devices. The base station preferably has both a USB port 50a and a RS485 port 50b, which allows applications requiring more than 3 meters of cabling between the base station's USB port and the host computer to use the RS485 port which has a range of about 1700 feet. At the computer, a RS485 to USB port converter 10b is provided in order to use the computer's USB port 10c.

The low battery indicator light on the reader can be used as a status indicator of the connection with the base station, so that a green light indicates a good connection, a yellow light indicates a marginal connection, and a red light indicates a lack of connection. At low battery, the light flashes red. A global positioning system (GPS) may be included in the base station to identify the location of the base station at the time it receives data.

EXAMPLE

The Beeflink™ Data Collection and Management System

BeefLink is a data cattle collection and data management implementation of the current invention. The BeefLink system is easily adaptable to other livestock species and other individual units of production such as carcass, batch, or lots, and cuts of meat, with the major change being the definition of industry-specific events.

BeefLink is comprised of hardware and software to permit the user to scan radio frequency identification (RFID) ear tags, implants, collars, or boli with radio frequency identification scan readers; to enter new animals; to look up information on existing animals; to input new events; and to run queries on the work done. One objective of the software is to display pertinent data on each animal and add new events to the record in the least intrusive manner. The new animal records and events recorded are uploaded and incorporated into a larger database. Communication with the distributed databases allows the user to receive downstream animal performance data at his own computer.

The preferred components of the system include a computer, a base station transmitter/receiver for communication to remote wireless devices including readers and measurement devices, RFID transponders on each animal, and RFID Work Cards.

Figure 10:
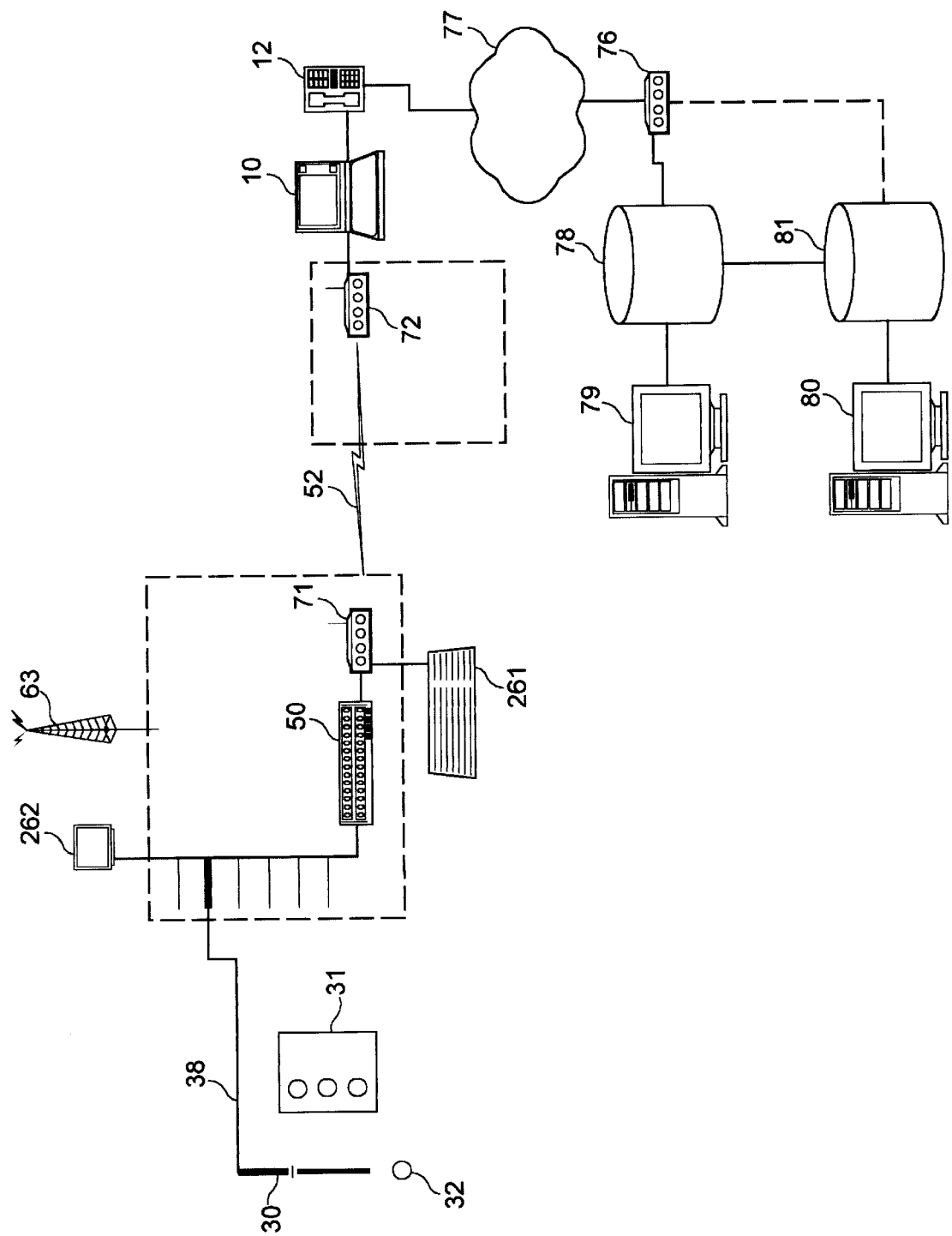
FIG. 10 is a schematic showing a cabled connection between the RFID reader and a data concentrator device and a wireless connection to a host computer and additional livestock databases.

Referring to FIG. 10 which is a schematic of one wireless embodiment of a data collection system, the BeefLink software runs on the host computer 10 which may be either laptop or desktop computer. The computer is in contact, by means of wireless radio frequency communication 52, with one or more readers and measurement devices. The wireless connection is accomplished by means of a transmitter/receiver 72 connected to the host computer, and a transmitter/receiver 71.

In the embodiment shown, the reader 30 is connected through a cable 38 and a serial port to the base station 50. In alternate embodiments, the reader is connected to the base station 50 by wireless radio frequency data communication. The reader may read an animal RFID transponder 32 and a Work Card 31, which consists of multiple event RFID transponders. The host computer 10 is connected to the Internet 77 by means of a network adapter or modem 12. Data is distributed to other databases by real time communication over the Internet, batch updates via Agil email files, or with physical media.

Other computers 79 and 80 containing other databases 78 and 81 may be connected to the Internet by means of a modem 76, such that data may be transferred over the Internet between the host computer and the other computers. Other embodiments illustrate the use of the Beeflink software on both simpler and more complex data gathering systems.

Double-clicking the Beeflink icon on the Windows Desktop display starts the BeefLink program. When the Company ID, the User ID, and the Password are entered on the Authorization Screen display, the program can be accessed.

In order to speed data entry, Action Tags are used to enter most events. Rather than typing in events at the computer keyboard, events are assigned to the Action Tags ahead of time so that the tags are simply scanned with the same reader used to scan animals in order to enter events or update fields in an animal's record. For instance, if cows are being checked for pregnancy, An Action Tag will be assigned beforehand for both the "pregnant" and "open" result so that the user can scan the cow and the appropriate pregnancy Action Tag when the result is known. Another example is that certain animals being processed are vaccinated for shipping fever. An Action Tag is assigned to the shipping fever vaccination event so that when animals get the vaccine, the user can scan the animal and the shipping fever Action Tag in order to record the event.

The Action Tags are typically affixed to a Work Card alongside their corresponding event labels. The Work Card can be placed in strategic locations such as on the side of a working chute or with the vaccine or treatment bottle to which they are assigned.

Most common events will be identified with Action Tags when the user receives the system. The user may, however, add to or change existing events through a work card editor.

Each event can have one or more default details associated with it. For instance, the event "LOCATION" might have three different details such as PEN-1, PEN-2, and NORTH 4000, that can be used to record changes in animals' locations. The user may edit workcards by adding or editing events associated with a unique identifier; and can designate a particular sound file to provide audio confirmation when selected.

Core events are included for process steps and data collection throughout the supply chain including: Abort, Assess Animal, Assess Animal-Health, Assess Animal-Sick, Assign Value, Birth, Birth-Est, Brand, Bred-Al, Bred-Bull-Grp, Bred-Bull-Ind, Breed, Buller, BullOut, Calving, Carcass, Carcass Weight, Clock-In, Clock-Out, Clone, Colot, DamID, Diagnose, Died, Dry Conversion Rate, Feed, Feedlot In, Feedlot Out, Feed-ration-Start, Finance, Group, HACCP, Hedge, Hedge-Remove, Implant, Implant-Remove, Incident, Incident-Removed, Insure, Irradiate, Location, Metal Tag, Origin, Packer-In, Packer-Out, PregChk, Production_Destination, Purchase, Railer, RegNum, Retag, Retailer_Feedback, Roundup, Sell, Set Alliance, Sex, SireID, Slaughter_Date, Spay, Stocker-In, Stocker-Out, Synchronize, Tag Brand, Trailer, Transfer, Treat, Vaccinate, Visual Color, Visual ID, Wean, Weather, Weigh, Weigh-Average, Wt-Birth, Wt-Birth-Est, Wt Est, Wt Feedin, Wt-Feedout, Wt-Packerin, Wt-Packerout, Wt-Purchase, Wt-Sell, Wt-StockerIn, Wt-Stocker Out, and Wt Wean. It is desirable to utilize core events when appropriate because they update fields in the database. If none of the default events apply, the user may key in a new event.

The most efficient way to record repetitive events that occur to multiple animals is to assign animals to logical groups and to record the events to all animals in the group as "regimens" or "group events".

The form also allows for entering multiple events and details before updating the group. For instance, if every animal in a group had a change in their ration and received a group treatment in their feed, the user could select and "Add" both events, and then update the records.

When all animals being processed receive the same treatments, but do not belong to a particular group, the regimen option should be used. A regimen is an event or group of event and associated event details that is common to a group of animals. For example, the regimen could be "sex" and the event detail "heifer" for a group of females. In more sophisticated examples, an entire treatment protocol of vaccines and deworming dosages can be specified, where a vaccination dosage is a specified child event to a particular parent vaccine. Separate regimens might be specified for steers than for heifers. This feature permits the user to pre-select events for all animals. Then, as the animals are scanned, each animal's record is updated with the default events and details, until the function is turned off.

For example, a stockman operation is receiving 50 new calves from a ranch, and the stockman needs to record the origin of each animal, the vaccines given each animal, the identity of the group, and the location where the animals will be going.

One way to set up a regimem is to pre-define each input to be made as described above for a particular vaccine and dosage. Alternately, the regimen may permit the user to scan or otherwise input the data at the time of the event. For example, a regimem is specified as being a vaccination with a user specified vaccine, and a child event dosage accepts a user-specified dosage. The regimen prompts the user to input the type of vaccine and then prompts the user for the dosage given to the current animal. An identifier such as an RFID device or barcode may be placed on work card along with various dosages and various vaccines to permit the user to provide the scan inputs without keyboard entry.

Any time that different events need to be recorded on each animal, the events must be applied individually. For example, if cows are being checked for pregnancy, the results vary and need to be recorded individually. Another example is when sick animals are treated at a feedlot—different treatments are applied and recorded individually. Recording individual events is automated by using the Work Card described earlier. After an animal is scanned, the events on the card that apply are scanned and thus recorded. This method can be used in conjunction with default events—all animals receive the default events and some also receive additional individual events.

If animals are receiving new sequential visual and/or metal ear tags, they can be sequenced automatically so that the tags increment as each animal is scanned. To set the starting sequence for new tags, the user can click on the "Sequence New Ear Tags" button at the Command Center and enter a tag prefix or Starting Tag Number. A EditSequence utility is provided, which enables the user to predefine sequences such as visual id number, carcass number, or order number.

Once the starting ear tag sequences have been set, they are ready to use when the user needs them. The user may activate sequencing as a default event or with an Action Tag.

Before working cattle, the user may either verify or make changes to his Work Card through "Edit Work Card" from the start menu. In order to verify that an Action Tag is actually associated with the correct event, the user will scan the Action Tag. If the tag has been assigned as an event, the user will get a duplicate error-trapping message. By the "OK" button on the error message, or pressing the Enter key, the screen will display the event currently associated with the Action Tag.

If the event associated with the Action Tag is correct, then the user can continue scanning other Action Tags that need to be verified. If the user needs to change the event associated with the tag, the user erases the current entry and enters a new event and detail for the deleted Action Tag.

When the user is ready to work animals, which will usually be done at the working chute, the user must intentionally turn on the ApplyRegimen upon entity identification scan button. Events will not be applied unless this button is clicked. This way, the user won't set up defaults and forget to turn them on, or assign default events by mistake.

With the RFID reader cabled or wireless radio cabled to a communication port, the user is ready to start scanning animals.

For example, if the first animal scanned has existing records in the system, the display screen will show those data fields. The scroll bar may be used to view additional fields. The bottom half of the screen shows all events recorded during the animal's lifetime. If the user scans a "TREAT" Action Tag with "IVOMEC" for the detail and changes the animal's location to Pen 50, the records will be updated.

Although the user may watch the results of his scans on the screen, it's not necessary to see the screen while processing animals. A feedback acknowledgement in the form of a light or sound may be sent to the user to indicate that the scans have gone through correctly. This feedback can be in the form of a light or sound generation, or it may be directed through a serial port to an external device. Typically the user will get a positive feedback signal in the form of a burst of light and an audio acknowledgement when he reads an animal that exists. The user will also get the acknowledgement when he scans an event.

When an animal is scanned, the user is provided a confirmation. An animal may be scanned more than once, and a confirmation will be provided, but the data will only be entered once.

If all of the animals being worked are new to the system, some defaults will probably be entered into the system. For instance, if all animals have the same estimated birth date, the date can be set as a default and added automatically to the birth date field of each new animal scanned. The same default function could be used for origin, location, or group.

If, however, the animals have varying birth dates or birth years, the available birth dates can be assigned to Action Tags, using the event setup form. The user can use BIRTH-DATE as the event and the date as the detail. As each animal is scanned, the correct birth date tag is scanned and assigned to the animal.

If actual birth dates are used and there are many possible entries, the user will enter the dates individually. The user will Set up an Action Tag event with BIRTHDATE as the event and KEY as the detail. To add a specific birth date to the animal's record, the user will scan the animal and the Action Tag. The user is then prompted to key in the birth date.

Entering non-sequential visible or metal tags may be done in the same manner.

If an animal loses its RFID tag the animal can be re-tagged, and an Action Tag with "RETAG" as the event can be used to replace the old tag references. The system can be used with visual ID tags and barcode tags, but RFID transponder ear tags are the preferred identification method.

Animal body weights can be entered in several ways. First of all, there are many different types of weights that can be recorded. Periodic weights are the most common, but other specific weights such as weaning weight, stocker-in weight, feedlot-in weight, etc. can be specifically noted.

Weights can either be recorded automatically with an electronic scale, or keyed in using a keyboard or other peripheral method. If the weights are to be gathered automatically, the user should identify the port through which the weights will be entering. The user will select the appropriate weight event and select the detail, either AUTO for a scale connected to the system, or KEY if weights will be keyed in. If the event is a default to be collected on all animals on a connected scale, the weights will be collected automatically. If the default is the keyed weight, each time an animal is scanned, the user will enter a weight. If the user is not weighing all animals, the same events can be scanned as Action Tags.

In addition to setting default events at the computer, defaults can be assigned, turned on and turned off in the field such as at the working chute. For example, if the user has fifty animals being worked that receive the same events—the events can be identified and turned on while working the cattle. If the next group of animals being worked receive different regimens, then the current regimens can be appended or cleared and new ones assigned.

If the user mistakenly assigns events to an animal and wishes to delete them, he can scan the delete last event to remove events one at a time, or delete all to remove all events for a working session. Events can only be deleted for the current animal. Any events that are correct should be rescanned. This function also works well if the user is assigning default events to a majority of the animals, but wants to skip certain animals. The user can simply scan the Delete Event tag after the animal that does not receive the events is scanned.

Data can be viewed on Animal Manager. The animal record contains some basic header information, as well as an on-going list of events, weights, and animal movements. To review an individual animal, the user scans the transponder or types in the visual or metal ear tag number. The events listed on the animals record can be sorted in order of the events, the details, or by date. The user can also do a quick review of all recorded weights or locations by clicking the applicable radio button on the bottom of the form.

The information collected on all animals can be reviewed by clicking on the "Work Done" button in the Review section of the Data Collection Center. This form allows the user to query the data that has been collected by selecting the field and the criteria of the search.

Events recorded on each animal will typically be exported to a larger database. The larger database will not only store information on other animals, but will store information on one entity's animals that have been transferred to other entities. Enterprise BeefLink is typically wired or wirelessly connected to the Internet, or is run in a disconnected mode with batch updates though ShareData utility and electronic transfer such as email update. The user may click on the "Export" button at the Command Center to create the file for uploading to the larger database. The export file is in the form of an event file, with special entries for new animals added to the local database.

Many events can be identified by a single code and a single set of associated data. Other events such as an animal vaccination event require additional data. The user can read an event detail transponder, such as vaccine type, and can then read sub-detail events such as a dosage or batch that he wants appended to the main detail. This is accomplished by identifying each event detail as either a STANDARD or SUB detail. If the detail is a SUB event, then it will append to the last standard detail scanned. For instance, along with a vaccine, a dosage may be specified.

EXAMPLE

A Paper-based Embodiment

Figure 1:
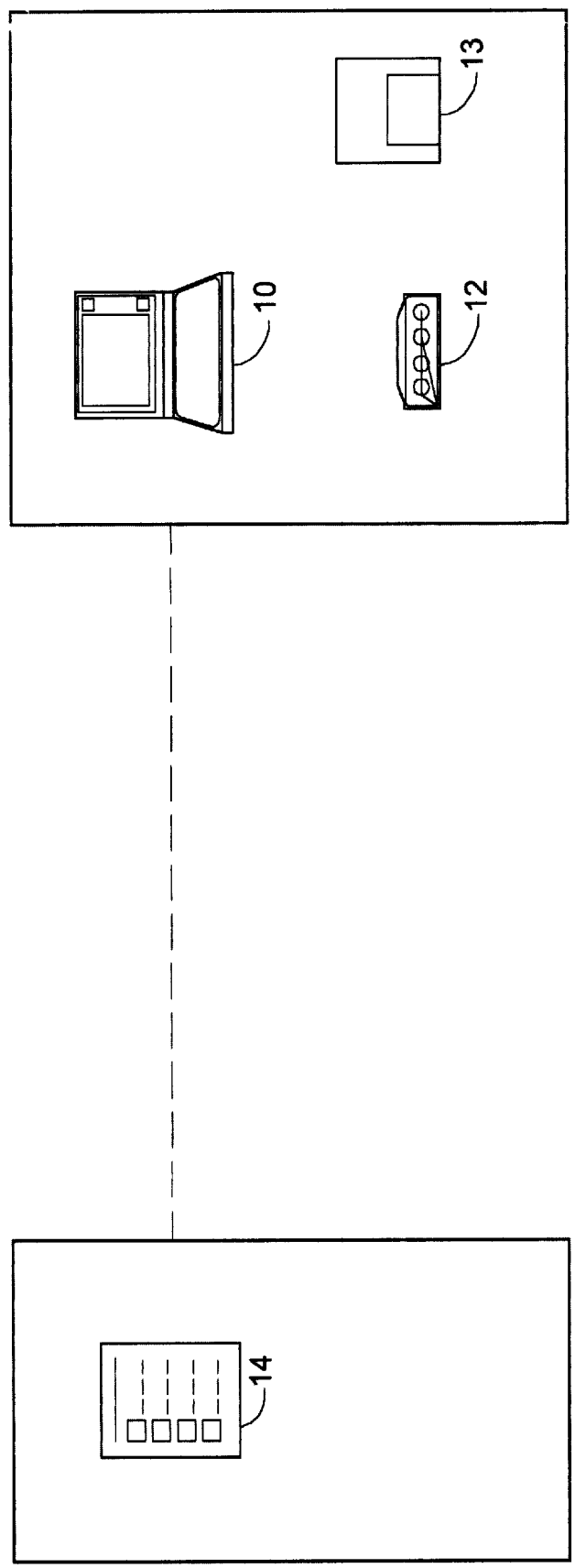
FIG. 1 is a schematic of a paper information entry embodiment of the information management system.

FIG. 1 illustrates a paper-based embodiment of the Beeflink data collection software. In this case, animal identification would be obtained from a visual tag, such as an ear tag, and that visual identification would be written on a paper log 14. All event data and measurement data would be recorded on the log sheet and then entered by keyboard or regimens or groups into the BeefLink software running on the host computer 10. The modem 12 in this embodiment permits the host computer to establish data transfer capability with other computer, and the removable disk 13 provides a data backup capability.

Although the data entry would be cumbersome for large numbers of animals, this paper system may be more affordable for smaller producers.

The producer may elect to install only visual identification or to install a tag that is both visual and RFID.

If an RFID transponder was attached to an animal, the producer would be responsible for manually entering the code to the computer, so that the code would be correlated to the visual tag identification.

Alternately, it is possible to operate the Beeflink software on the basis of the visual identification, or preferably a longer, unique identification key assigned to the animal. In that event, an RFID device may be attached downstream, and the new RFID code would be assigned to the animal.

U.S. Pat. No. 6,211,789 issued to Oldham and Curkendall describes Cattle Card™ embodiments of this invention designed to support manual data collection in the early phases of livestock production. Events common to a group of animals are typically noted on a form such as the Cattle Card envelope, so that the common events can be entered as a regimen.

EXAMPLE

A Direct Reader Embodiment

Figure 3:
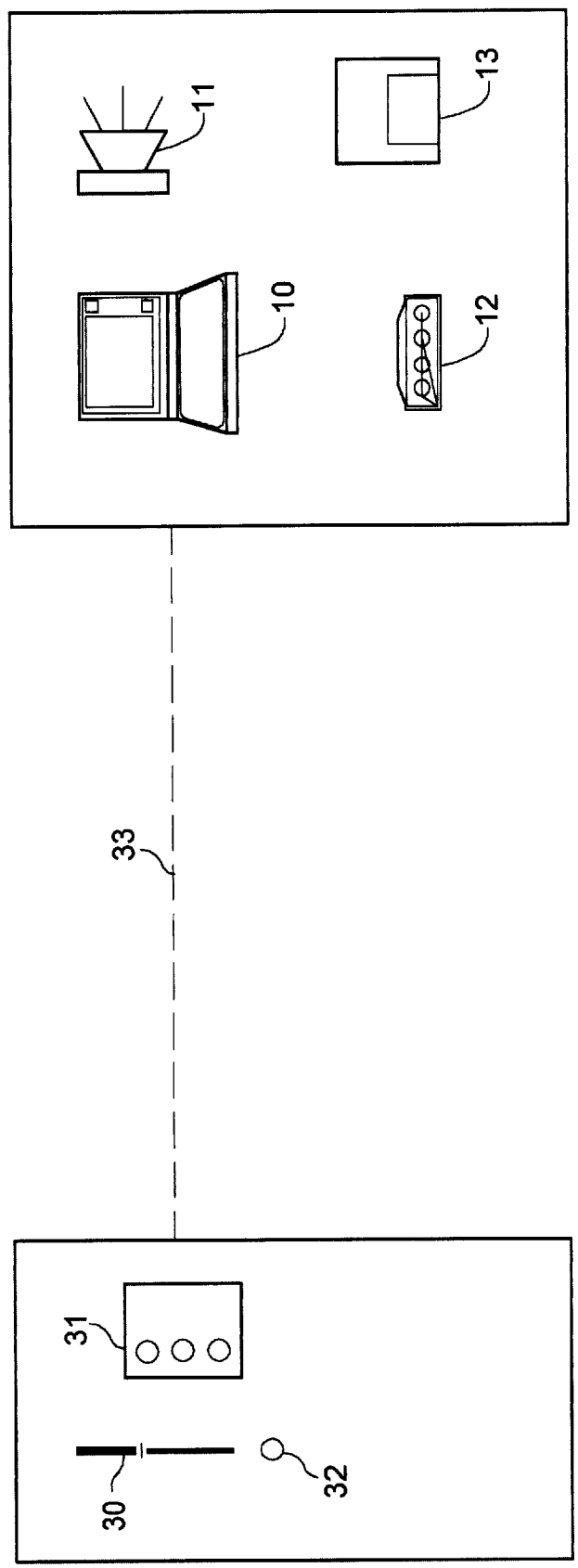
FIG. 3 is a schematic showing a wired connection between the RFID reader and a host computer.

FIG. 3 illustrates a simple embodiment of the BeefLink data collection software with an RFID reader 30, which was linked by cable 33 to a host computer 10. In this case, animal identification would be obtained from an RFID transponder 32, and Work Cards 31 where RFID event transponders are used to record events.

The speaker 11 provides a feedback means to confirm the receipt of animal and event data by the computer.

The modem 12 in this embodiment permits the host computer to establish data transfer capability with other computers, and the removable disk 13 provides a data backup capability.

This approach would typically be used by relatively small producers who could complete their livestock work sessions in a relatively short time, such as the battery life of a notebook computer.

EXAMPLE

Simple Wireless Reader Embodiment

FIG. 4 illustrates a simple embodiment of the Beeflink data collection software with a radio frequency wireless connection 40 between the RFID reader 30 and the host computer 10. In this case, animal identification would be obtained from an RFID transponder 32, and Work Cards 31 with RFID event transponders are used to record events.

The speaker 11 provides a feedback means to confirm the receipt of animal and event data by the computer.

The modem 12 in this embodiment permits the host computer to establish data transfer capability with other computers, and the removable disk 13 provides a data backup capability.

EXAMPLE

Existing System Communication

Figure 2:
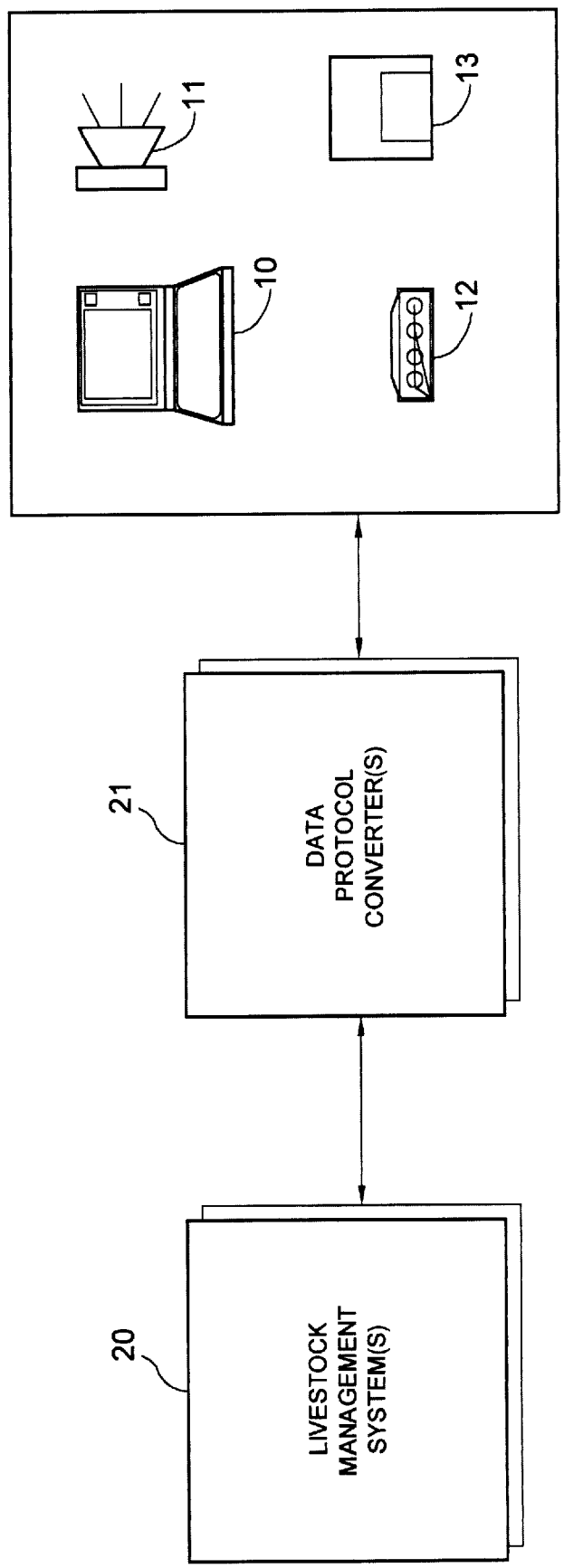
FIG. 2 is a schematic illustrating a protocol converter to exchange information with an existing livestock management software program.

FIG. 2 illustrates the ability of the Beeflink software running on a host computer 10 to accept data from an existing livestock management system 20 or to update the management system data with information from BeefLink. If the existing management system software was not running on the host computer, the host computer could establish a link to the existing management system computer by means of a modem 12 and either a direct link or an Internet connection. An event import tool converts columnar data to an event database.

Figure 9:
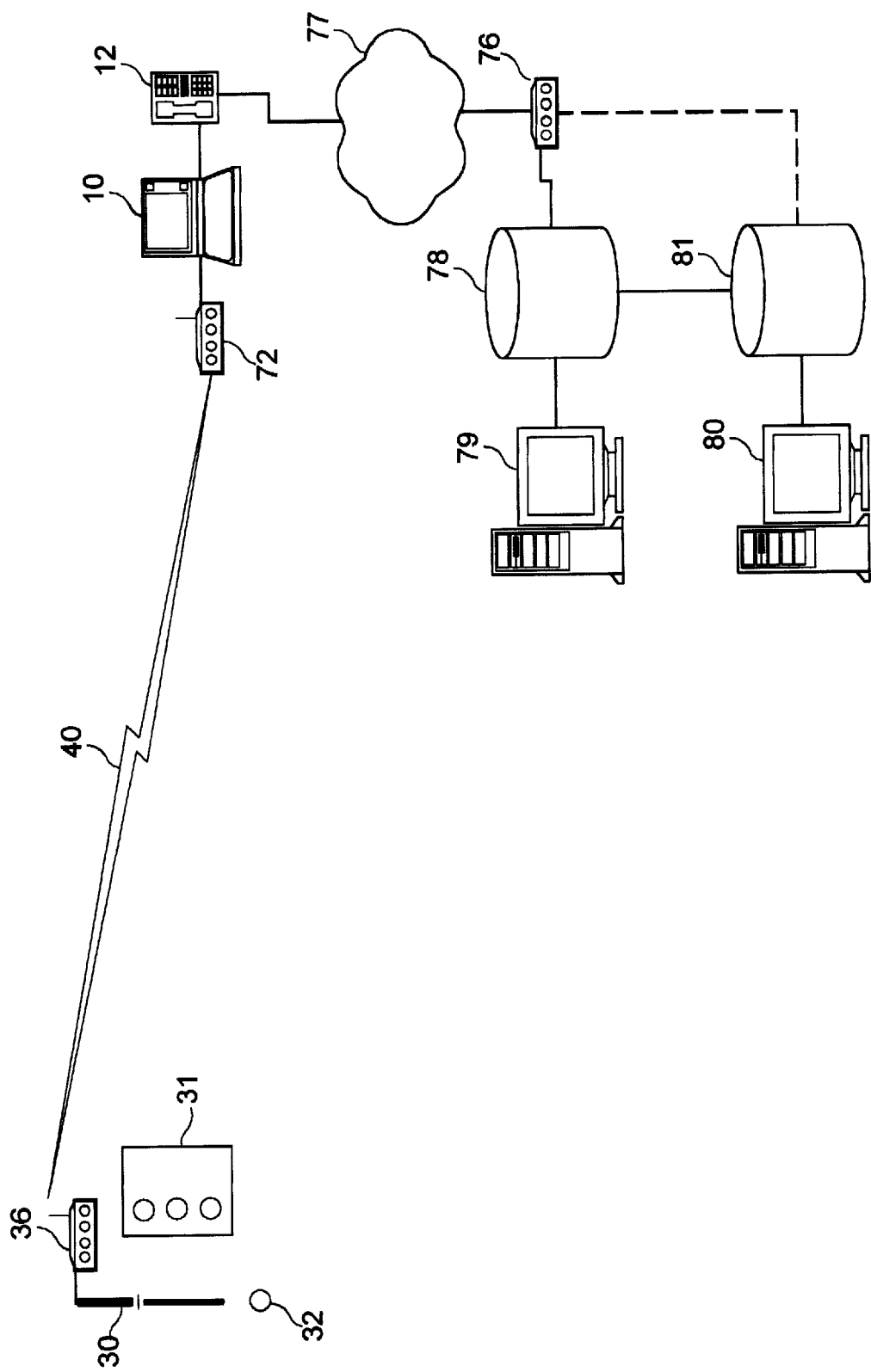
FIG. 9 is a schematic showing a wireless radio frequency data communication (RFDC) connection between the RFID reader and a host computer and additional livestock databases.

FIG. 9 illustrates this existing system or existing database communication in a wireless reader embodiment. The RFID reader 30 communicates through RFDC transmitter/receivers 36 and 71.

Existing or downstream database 78 or existing management system software running on a computer 79 may be accessed through the host computer modem 12 by either Internet transfer 77 or by direct modem connection between the computers.

Figure 6A:
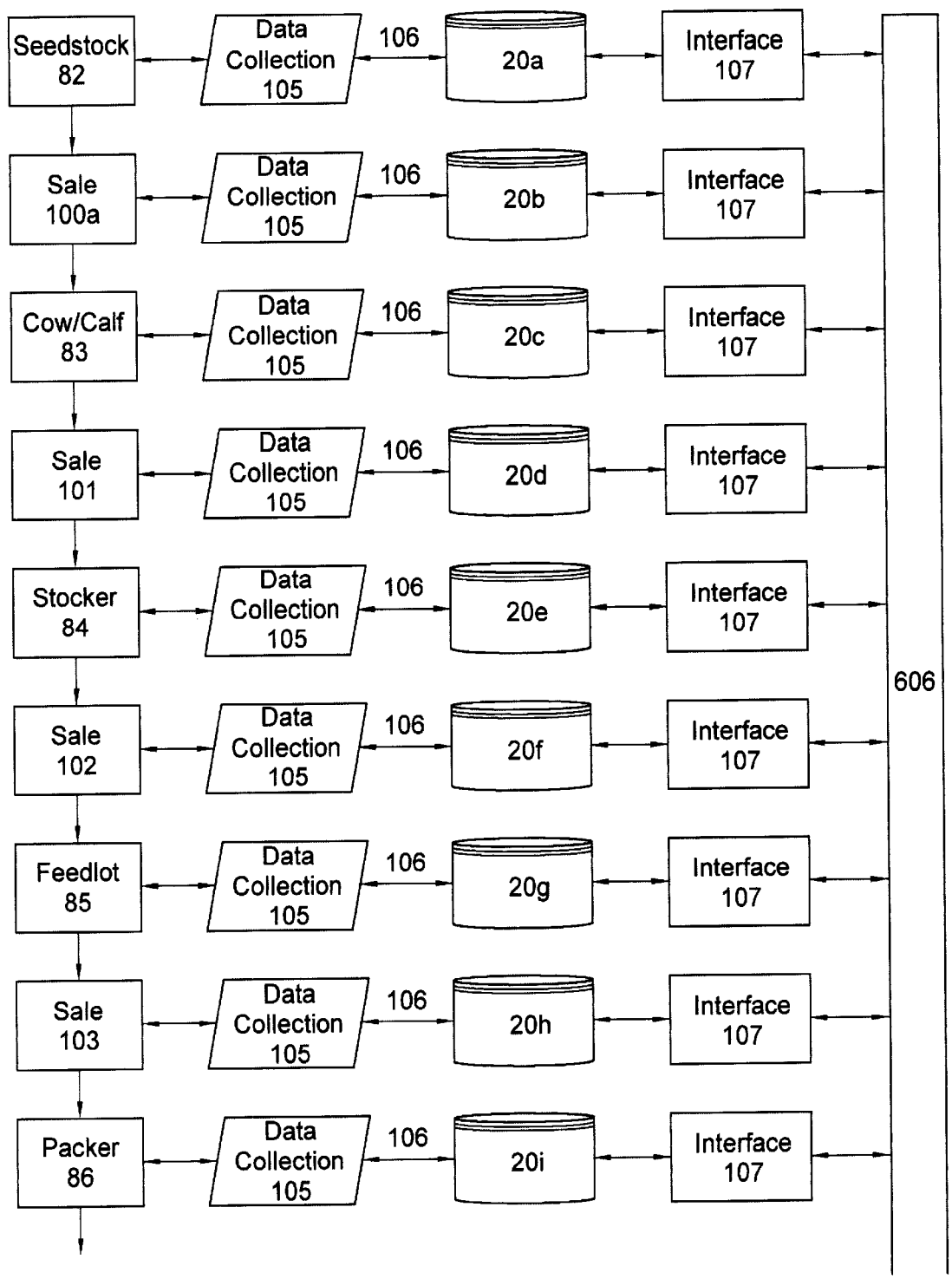
FIG. 6 represents a schematic of the physical flow of cattle and the information flow for the beef cattle supply chain.
Figure 6B:
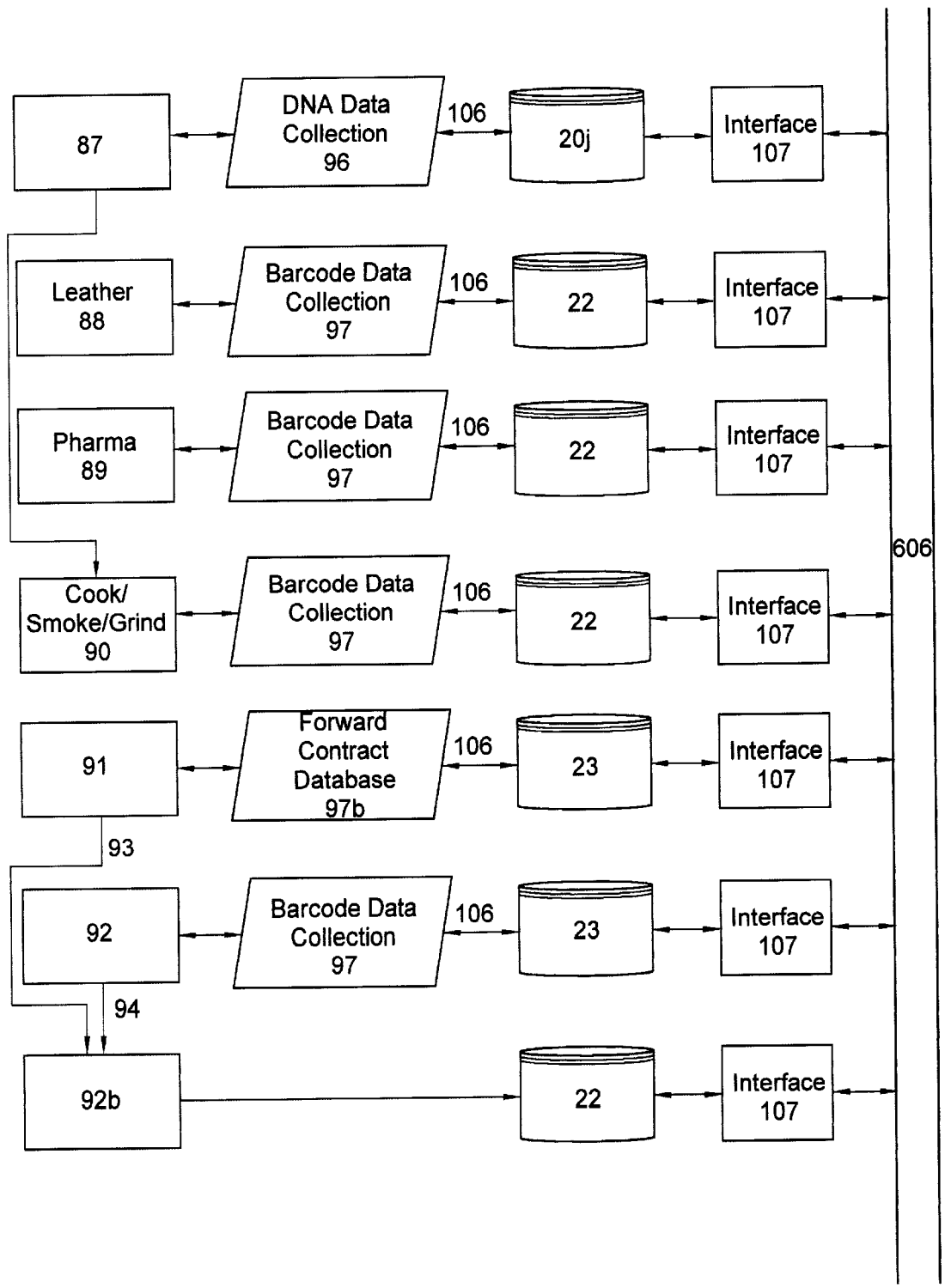
Figure 6C:
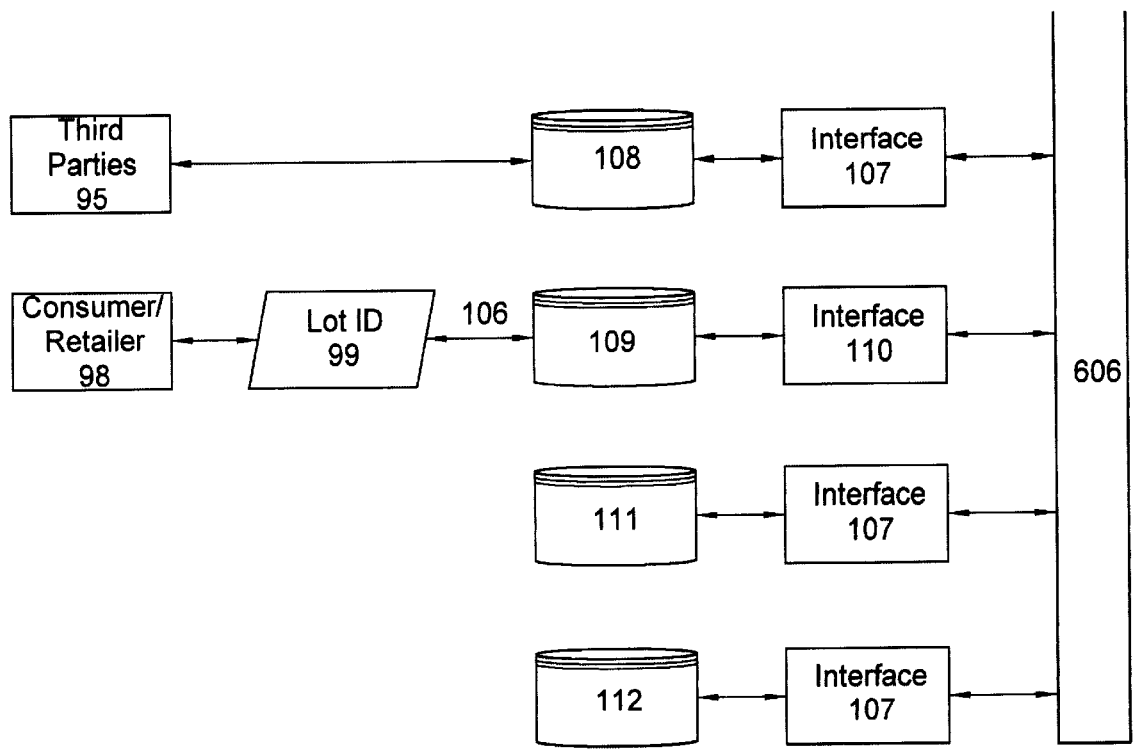

FIG. 6 is a schematic of the physical flow of cattle and the information flow for the beef cattle supply chain. The current invention permits the capturing and sharing of information from each step in the supply chain, and establishes interfaces with existing third party software packages 20*a*–20*i*, third party ERP software packages 22, and third party business to business software packages 23. In the supply chain, seedstock 82 is typically sold to cow-calf producers 83 through auction facilities or e-commerce at step 100. The cow-calf producers typically sell calves to stockers 84 or feedlots through auction facilities or e-commerce at step 101. The stocker typically adds weight to those calves and sells them to a feedlot 85, through direct sale, auction facilities or e-commerce at step 102. In some cases, the stocker or cow-calf operator may retain ownership of the calves at the feedlot, so that there is not a sale at that point. The feedlot continues to add weight to the calves and sells them to a packer 86 at step 103. The packer may produce packages of beef 87, leather products 88, pharmaceutical products 89, and processed beef products 90 such as cooked, smoked, or ground beef. The beef products 87 and 90 are typically sold to food brokers, distributors, cutters, supermarkets, or food service companies 91 and 92 in forward contract arrangements 93 or on the spot market 94 to customers 92*b*. Throughout the supply chain, third parties 95 such as banks, pharmaceutical companies, veterinarians, and livestock marketing associations have an interest in portions of the information.

The current invention includes hardware and software data collection tools 105 to capture information at the seedstock stage 82 and to share that information with one or more third party seedstock software package 20. The Pony Express Relay Database™ (PERD) 606, which functions as a data backbone, provides access to information collected at all stages in the supply chain, and provides an interface 107 to the third party seedstock software package 20 to permit information to be shared from the third party software to PERD, and from PERD to the third party software. Similarly, at each of the other steps in the supply chain, the invention provides data collection interfaces 107 to third party software packages 20 and interfaces between those packages and PERD 606. The system also supports the collection of DNA information 96, including at the packer 86, and barcode information systems 97 such as in the leather 88, pharmaceutical 89, and cook/smoke/grind 90 operations.

The system also provides interfaces 107 to reporting and viewing utilities 108 so that the data and information can be monitored by third parties including banks, insurance companies, animal health companies, veterinarians, cattle procurement, and livestock marketing associations.

In order to link the individual animal or animals to the consumer or retailer 98, the system accepts a packer lot number identification 99 and generates a request 109 to run a DNA sequence for a specified lot, and interfaces that request to PERD at step 110. PERD then interfaces 107 to the tracking software which generates the specific test requests for a lot 111 or animal 112.

The data collection components typically include data collection hardware such as rfid readers, electronic scales, and ultrasound; Beeflink™ data collection software, real-time feedback components; and utilities to format the data according to desired third party software formats. When the user does not have a computer, a manual input system such as Cattle Card™ is used to collect the data, which is subsequently input into the BeefLink software.

The data conversion interfaces typically include authentication and certification software components to validate data; extraction, transfer, and loading tools to support data marts for specific reporting needs; reporting tools for generating reports not provided by the third party software; and data mining and data mart tools.

These middle-ware components, data collection and data conversion, and ETL tools permit sharing by importing or exporting individual management information.

Figure 7:
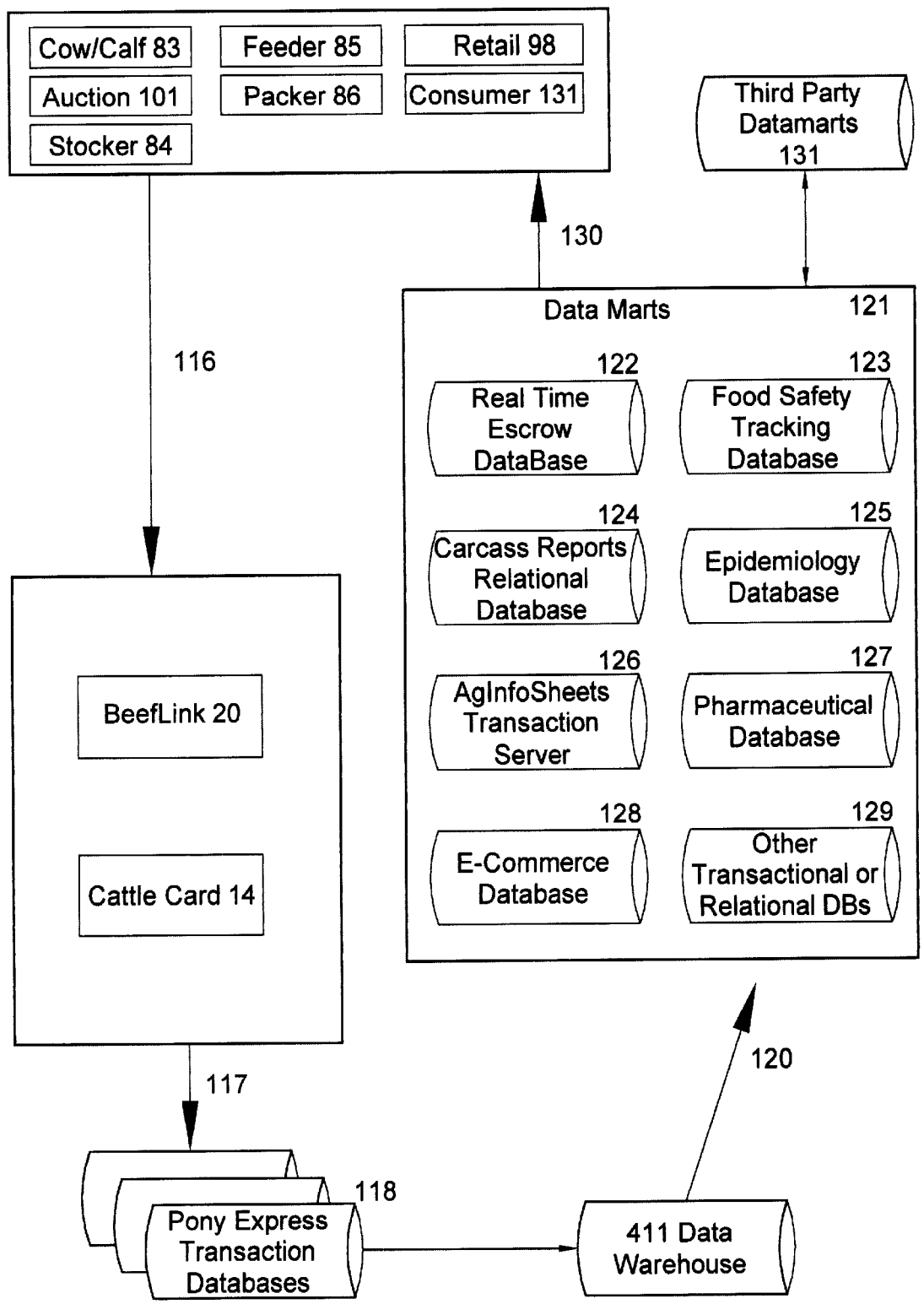
FIG. 7 is a schematic showing data movement and storage.

Referring now to FIG. 7, which is a schematic showing data movement and storage, data is collected at step 116 from entities such as cow/calf operations 83, auction sales 101, stockers 84, feeders 85, packers 86, and retailers or consumers 98. The data collection may be through BeefLink software, data cards 14 such as Cattle Card™, or third party software 20. The data is pushed at step 117 to PERD transaction databases 118 and "411" data warehouses 119. The "411" data warehouses monitors the location of individual animal data. Data is extracted at step 120 into data marts 121 such as real-time escrow transaction database 122, food safety tracking database 123, carcass reports relational database 124, epidemiology database 125, AgInfoSheets transaction server 126, pharmaceutical database 127, e-commerce database 128, or other transaction or relational database 129, including third party software applications 131. Data may be pulled from the data marts at step 130 by the processing supply chain entities that collected the data or by third parties, and third party databases that are provided security clearance to access that data

EXAMPLE

Multiple Reader Locations

Figure 11:
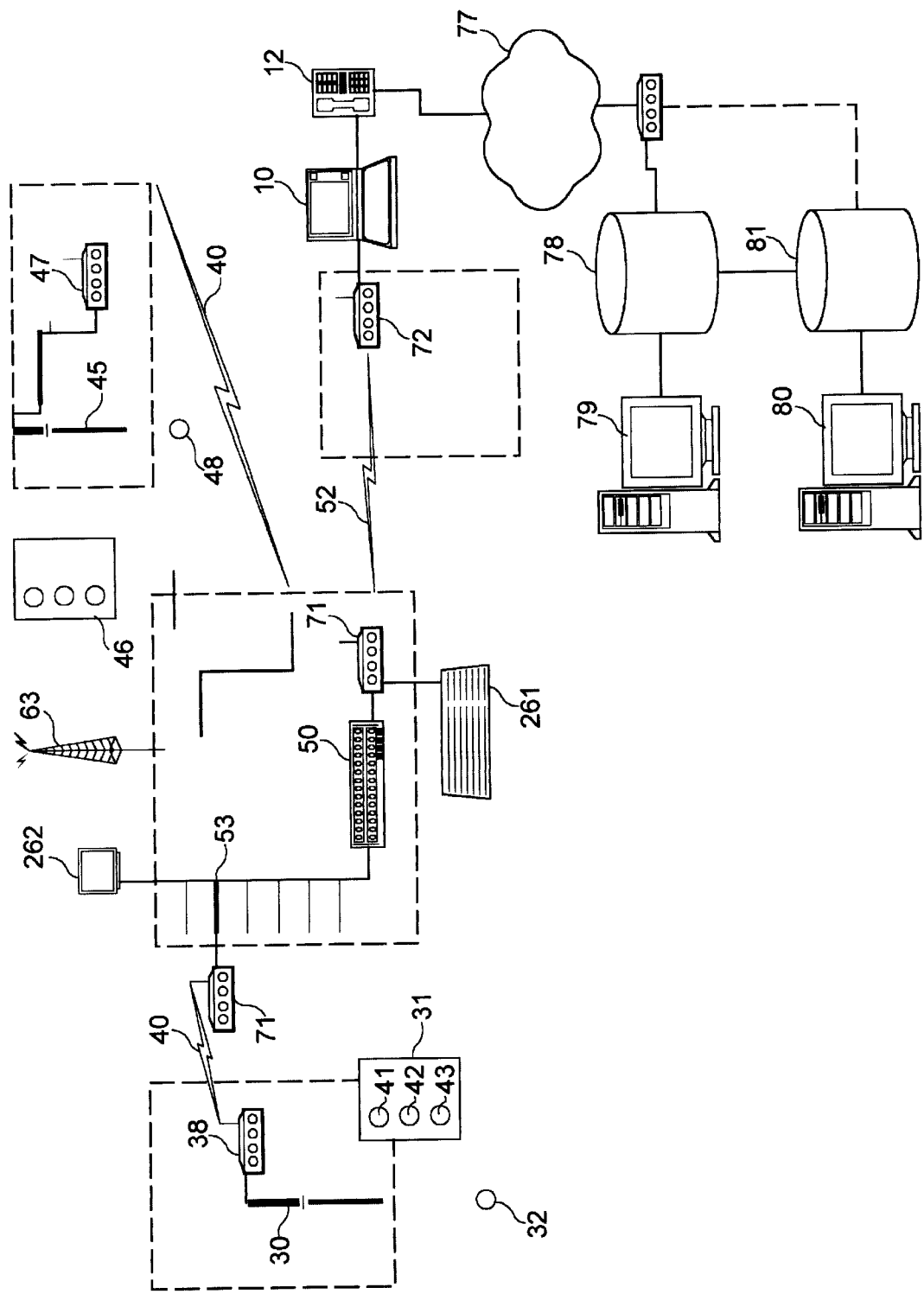
FIG. 11 is a schematic showing a wireless radio frequency data communication (RFDC) connection between multiple RFID readers and a data concentrator device and a wireless connection to a host computer and additional livestock databases.

FIG. 11 illustrates a wireless reader configuration where the data concentrator 50 receives data from multiple RFID readers indicated by readers 30 and 45. This type of configuration is desirable in larger operations where there may be more than one livestock working area at a given time. In this case, a larger antenna 63 may be necessary at the data concentrator, and it may be desirable to have a keyboard 261 and monitor 262 connected to the data concentrator.

EXAMPLE

Description of Embodiment

Figure 12:
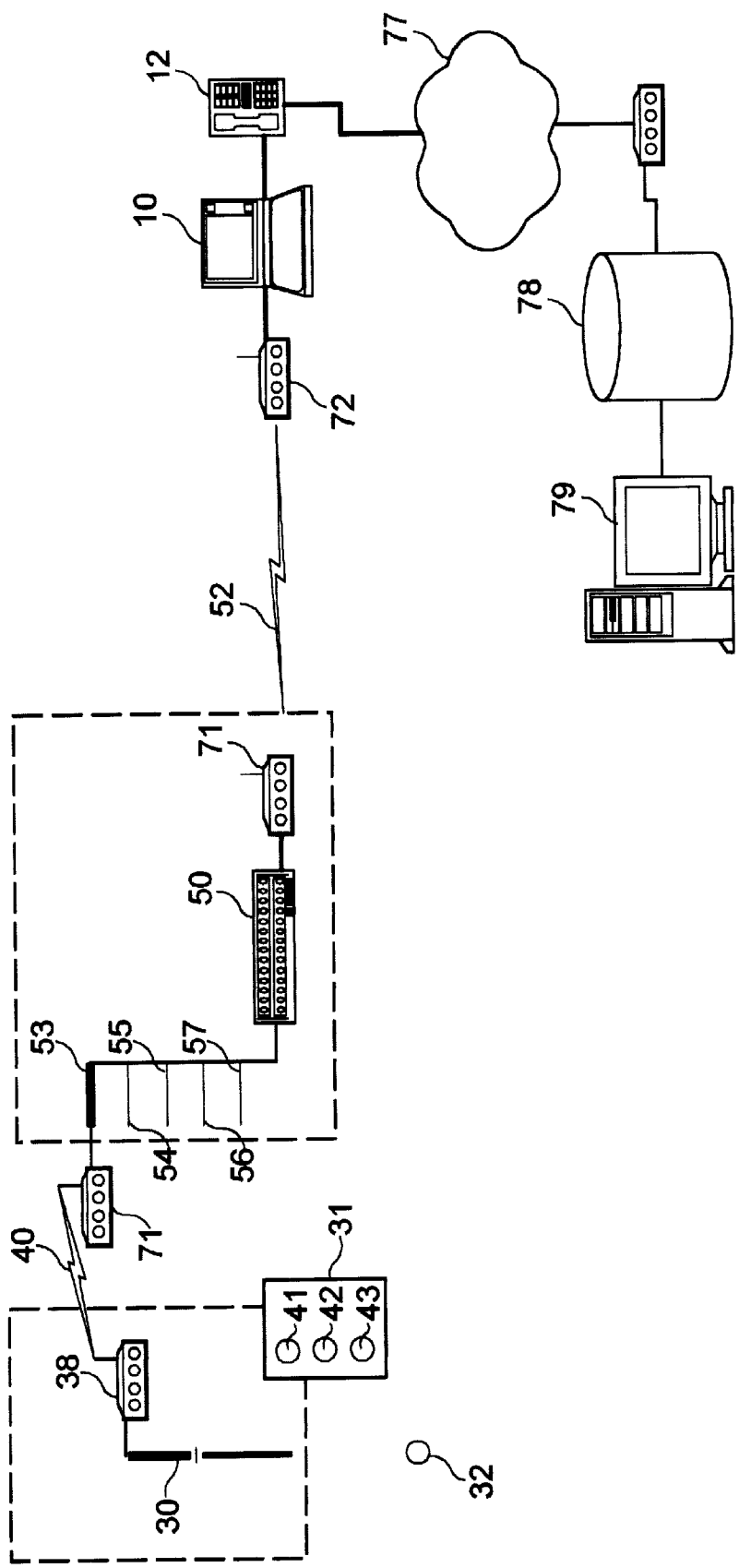
FIG. 12 is a schematic of an embodiment.

Referring now to FIG. 12, in this embodiment the components of the data collection and management system include unique Radio Frequency Identification (RFID) transponders for each animal; a Work Card of RFID transponders to identify livestock events, an RFID Reader that can identify the animal and event RFID transponders; a wireless RFDC communication between the reader and a base station; wired or wireless connections to a scale, a thermometer, an ultrasound measurement device, and an output device, a wireless RFDC communication between the data concentrator unit and the host computer, Beeflink™ Data Collection Software; and etl interfaces.

Radio Frequency Identification (RFID) Transponders

Although the data collection system can operate manually with visual animal identification, the preferred operation is with Radio Frequency Identification (RFID) transponders 32 in the form of electronic ear tags, implants, boli or neck or leg collars to provide unique identification for each animal. Although ear tags and implants are the most common devices, a bolus transponder has been used successfully as a tamper-proof means of identification of cattle. The bolus transponder has the potential capability of measuring temperature and pH within the animal. The RFID transponders contain a small antenna attached to an integrated circuit that stores a unique identification number. Unlike bar codes, RFID transponders do not require line-of-sight to be read, the transponder simply needs to come into the proximity of an RFID reader.

RFID Reader

The RFID reader 30 will typically be stationary reader at high volume at the packer or feedlot operations and portable readers at the processing points. Stationary readers will be typically be connected to a host computer by means of a cable, but a wireless connection may also be used for stationary readers. The portable readers will typically use a wireless connection to the computer. The Readers emit a low radio frequency, typically a 134.2 kHz signal that excites the passive transponder in the event or animal identification tag and the device responds at a second frequency. Once excited, the transponder responds back to the reader via radio frequency with a digital signal representing its unique identification. The reader decodes the signal, displays the identification, and sends the identification to the computer.

Work Card and Event Action Tags

A Work Card 31 with RFID transponders 41, 42 and 43 provide livestock event identification so that events can be read by the RFID reader rather than entered by keyboard. The user may select one or more event cards for the anticipated work session. Other event tags may be affixed at other convenient locations in the work area, such as around the processing chute. The tags on the work card have the name or symbol label for the corresponding events so that the person working the cattle can quickly scan the appropriate event when it occurs.

BeefLink™ Data Collection Software

The BeefLink™ software running on the computer 10 validates inputs from the various devices, notifies the user of the data received, stores the results, and converts the data into meaningful information. In addition, the software manages the transfers of the local data via modem to regional and national databases for storage and further analysis, and manages the access to downstream processing, performance, and quality data.

Database Architecture and Data Transfer

Data collected at the local level can provide only limited management information to the producer because the producer needs to know the performance results in order to manage accurately for the future. As the data is transferred to a regional or national database, indicated in as 78, it can become more powerful. In many cases, the animals change hands during the production cycle. In order to get results back to the producers and growers of the livestock, these upstream participants must have the ability to pull information about the animals that the downstream participants enter into the system. Likewise, the downstream participants such as feedlots and packers need to review information on the animals that they are receiving. It is also these large databases that allow for the source verification for food safety issues.

The local software at each participant's facility routinely sends file updates to an alliance or national database using modem transfer through the Internet. With the proper security clearance, users can query the data on their own cattle even after they have been transferred or sold, and this is the information useful for future management decisions. Producers are also able to purchase reports that benchmark their animals against a compilation of blind data from other producers. For example, producers may compare their operations with operations of a similar size, geographic region, or breed for quality characteristics such as the tenderness score.

Once the animal reaches the slaughter plant, the same RFID transponder is used for identification. Stationary readers or handheld readers are used to read the transponders and to identify and sequence the carcasses. Data such as carcass weight, grade, and yield are collected and added to packer's management system, and that data can be accessed through the animal's identification.

Authorization Levels

In the preferred embodiment, authorization levels are provided for various entities such as a consultant, veterinarian, nutritionist, insurance agent, or banker, can access information according to that entity's authorization level.

Source Verification/Performance Tracking

In the preferred embodiment, the RFID tags, and visual identification tags are correlated so that at any point in the livestock cycle, historical data is available to any entity in the chain of title for the livestock.

At the packing plant, the animal's identification is used to record actual carcass quality data for the animal. The data can include overall evaluation of the carcass as well as information about the amount and quality of particular cuts or products derived from the carcass. This correlation of individual animal identification to actual carcass and product quality data permits the packer to compensate the producer or feedlot according to the actual quality of the product.

The producer benefits both by having the potential to receive a greater return for higher quality livestock, and by obtaining information which will permit more-informed decisions on herd management. For instance, bulls or cows that produce calves with good yields and quality will be preferred for retention in the herd over bulls or cows that produce calves with lower yields or lower quality.

Whereas the prior art requires transmission of packer information back to the feedlot or to producers, the present invention permits entities in the chain of ownership to have access to the data associated with an animal. An additional objective of the invention is to provide Source Verification by making historical data for the animal available to the packer. This Source Verification will preferably include certified quality control programs such as HACCP plans.

DESCRIPTION OF EMBODIMENTS

Software Components

One aspect of the Beeflink software is a transaction focus, rather than a relational database orientation. Although, in some applications, working relational databases may be constructed by utilities from distributed transactional databases, the BeefLink architecture also supports decentralized, transactional databases. Transactional data are the building blocks of the information system.

Figure 13:
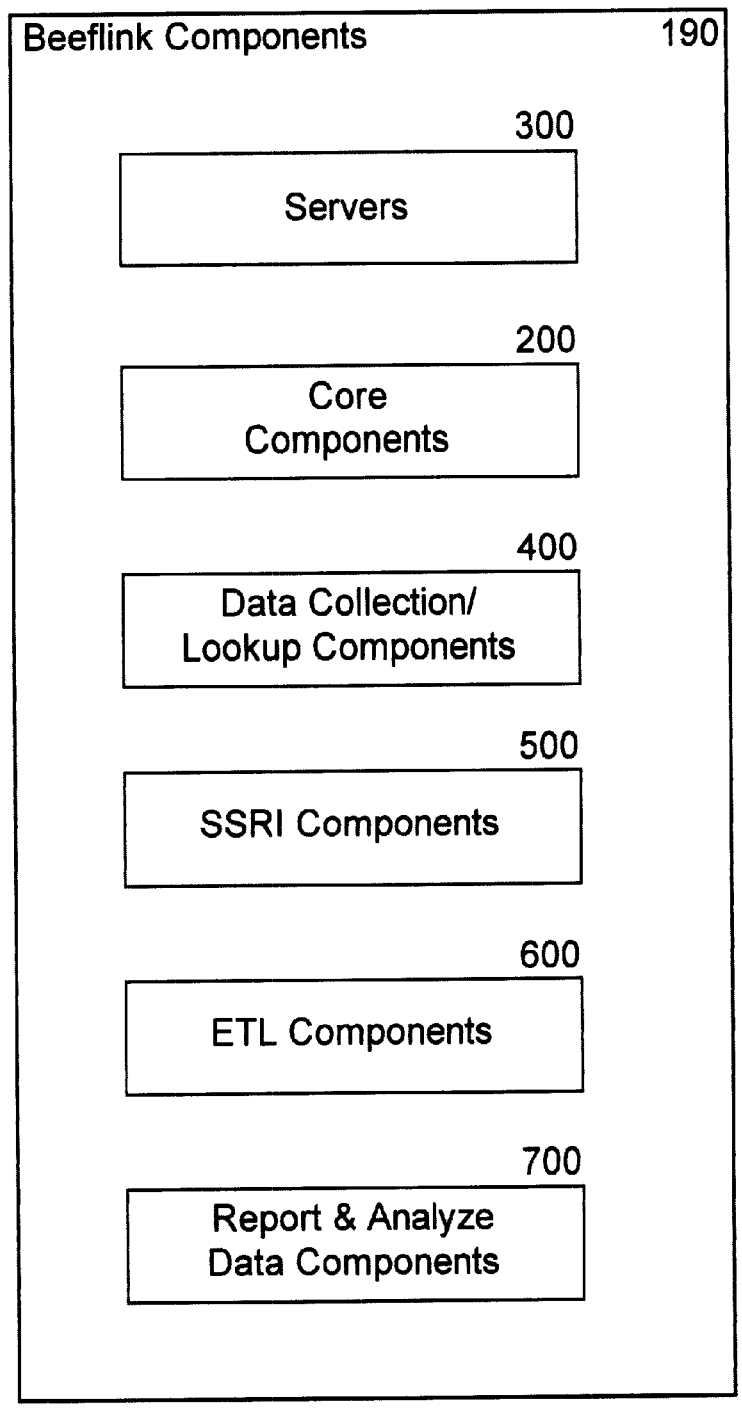
FIG. 13 is a schematic overview of the components in an embodiment of the BeefLink program.

In this embodiment, the software has an object-oriented architecture, and is comprised of blocks of code called components. The components provide a building block framework for various software applications, so that the components may be re-used from one application to the next. Sub-components are blocks of code that may be incorporated into multiple components. The discussion below describes these components and sub-components by their functional task. Referring to FIG. 13, which is a schematic overview of the components of this embodiment of the BeefLink program 190, the components are grouped, for discussion purposes, into common core components 200; Data Collection/Real-Time Data Lookup components 400; Share, Switch, Route, Interface ("SSRI") components 500; Extract, Transform, Load ("ETL") components 600; and Report & Analyze Data components 700. The components are typically connected to a plurality of hardware or software servers 300. Many of these components are used in more than one of these categories.

In this discussion, the events relate to animals. In other embodiments, an event may be an item, commodity, or concept, and these components and architecture are appropriate for a variety of applications where the objects, the actions on the objects, and the database entries and queries, are distributed over time and geography. In these applications, an event-based architecture is robust and practical.

Servers

Figure 14:
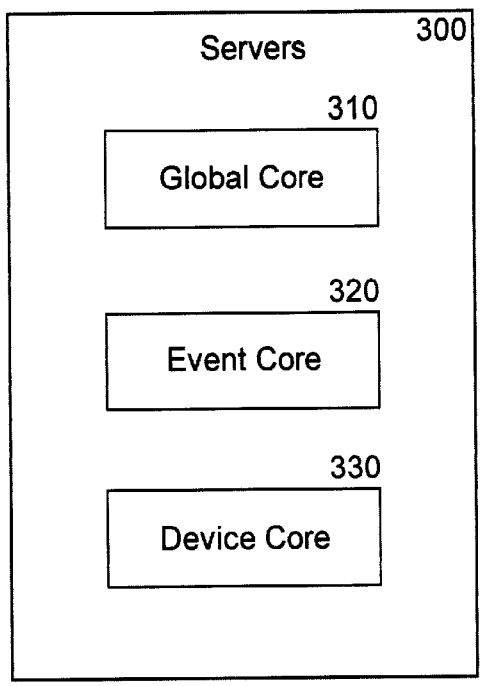
FIG. 14 illustrates the use of multiple servers in the embodiment of FIG. 13.

FIG. 14 illustrates the use of multiple servers 300 in this embodiment. In other embodiments, these functions may be performed on one or more servers.

GlobalCore 310 is a Windows-based client side Active-X server responsible for managing connections to local or networked component information. It provides the language-specific data needed for user interfaces, text messages, database connection information, and user-configurable settings. The server provides a centralized location for component messages, and allows distinct business components to inter-operate. The server provides standardized methods for creating and manipulating information that is global to all components on the system; and notifies connected business components of any changes made to the global information.

Figure 15:
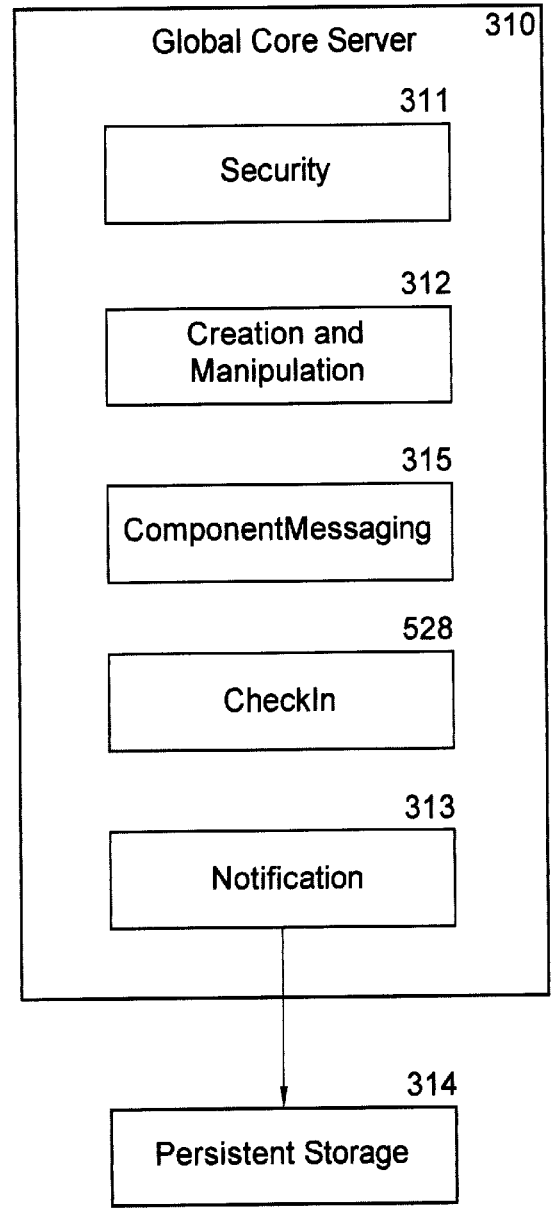
FIG. 15 illustrates the GlobalCore server in the embodiment of FIG. 13.

Referring now to FIG. 15, the GlobalCore server 310 performs security 311 to validate connection authorization and to confirm communication encryption; creation and manipulation 312 to provide standardized methods for creating and modifying global data; and notification 313 to ensure that business components are notified before, during, and after any creation or modification of global information. The notification updates persistent storage 314, which may reside elsewhere, to abstract the physical storage methods from component applications including DBMS, ODBMS, or flat file format on either the client-side or the server-side. The global server permits component messaging 315 to send messages to other components and to log important processes. The component messaging provides a common messaging interface, global process completion logging, and error logging.

Referring again to FIG. 14, EventCore 320 is a Windows-based client side Active-X server responsible for creation, manipulation, storage, notification and access to collections of events. All business components that use, or need knowledge of, event-oriented data do so by establishing a connection to the EventCore. The server provides standardized methods for creating and modifying events; and ensures that events can be translated and represented by user-configurable languages. The server ensures that transactions, especially those representing quantifiable data, are normalized to a world-common standard. It enforces data to be created with acceptable values, limits, ranges and/or formats; and sends both synchronous and asynchronous messages to connected business components, allowing them to modify events before they are created, and respond to modified events.

Figure 16:
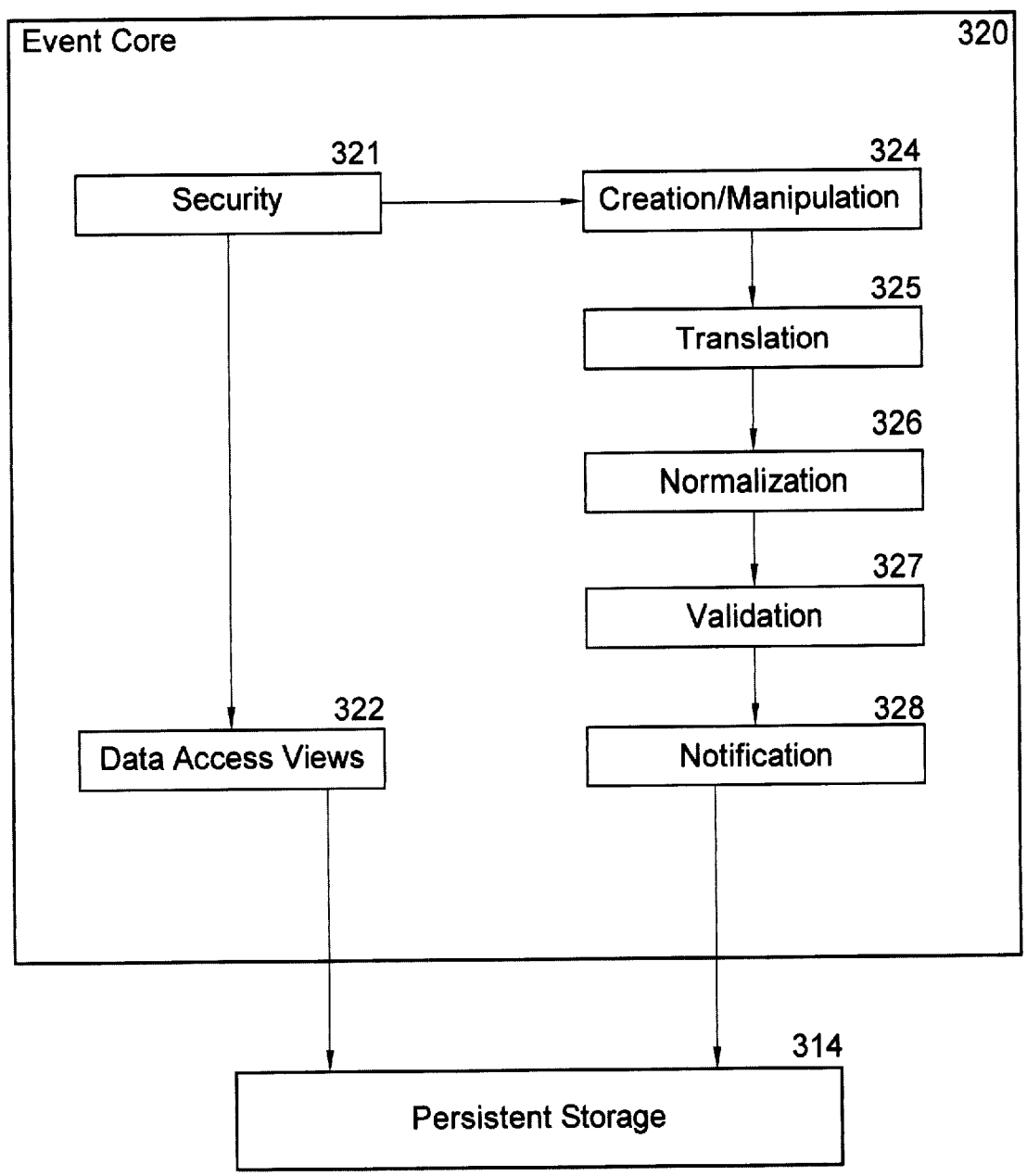
FIG. 16 illustrates the EventCore server in the embodiment of FIG. 13.

Referring now to FIG. 16, the EventCore 320 performs security 321 to validate connection authorization and to confirm communication encryption; creation and manipulation 324 to provide standardized methods for creating and modifying global data, specifically event data; translation 325 to permit representation in user-configurable languages and storage in a core language; normalization 326 to ensure that transactions such as measurement, quantities, and values are created in a standardized and normalized format to permit functional and accurate processing by business rules; validation 327 to ensure that objects of each type are created within acceptable values, limits, ranges, or formats; and notification 328 to ensure that business components are notified before, during, and after any creation or modification of event information. Persisitent storage 314 is updated during the notification process. The event;server also includes data access views 322 to provide connected or disconnected views into subsets of event data. The data access views also access the persistent storage. The component messaging provides a common messaging interface, process completion logging, and error logging.

Referring again to FIG. 14, DeviceCore 330 is a client side Active-X Windows-based server responsible for managing connections to local or networked hardware devices. All business components that use, or need knowledge of, hardware devices connected to the system do so by establishing a connection to this server. It provides standardized methods for creating and modifying device data, and sends both synchronous and asynchronous messages to connected business components, allowing them to modify device messages before other components respond to their information.

Figure 17:
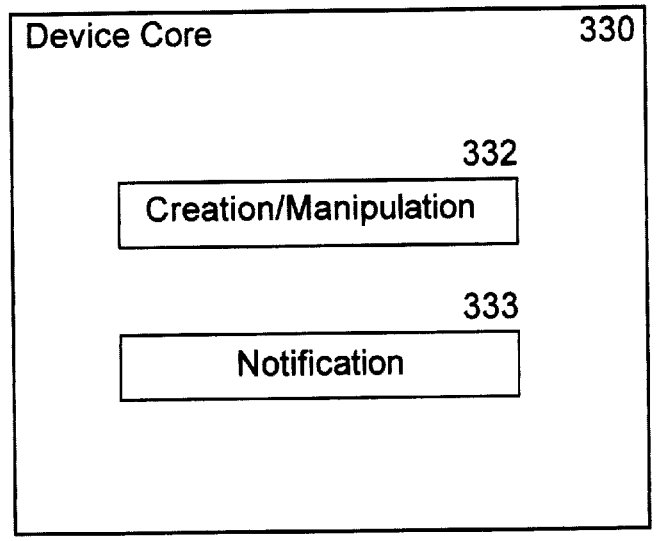
FIG. 17 illustrates the DeviceCore server in the embodiment of FIG. 13.

Referring now to FIG. 17, the DeviceCore 330 includes creation and manipulation 332 to provide standardized methods for creating and modifying data; and notification 333.

Figure 18:
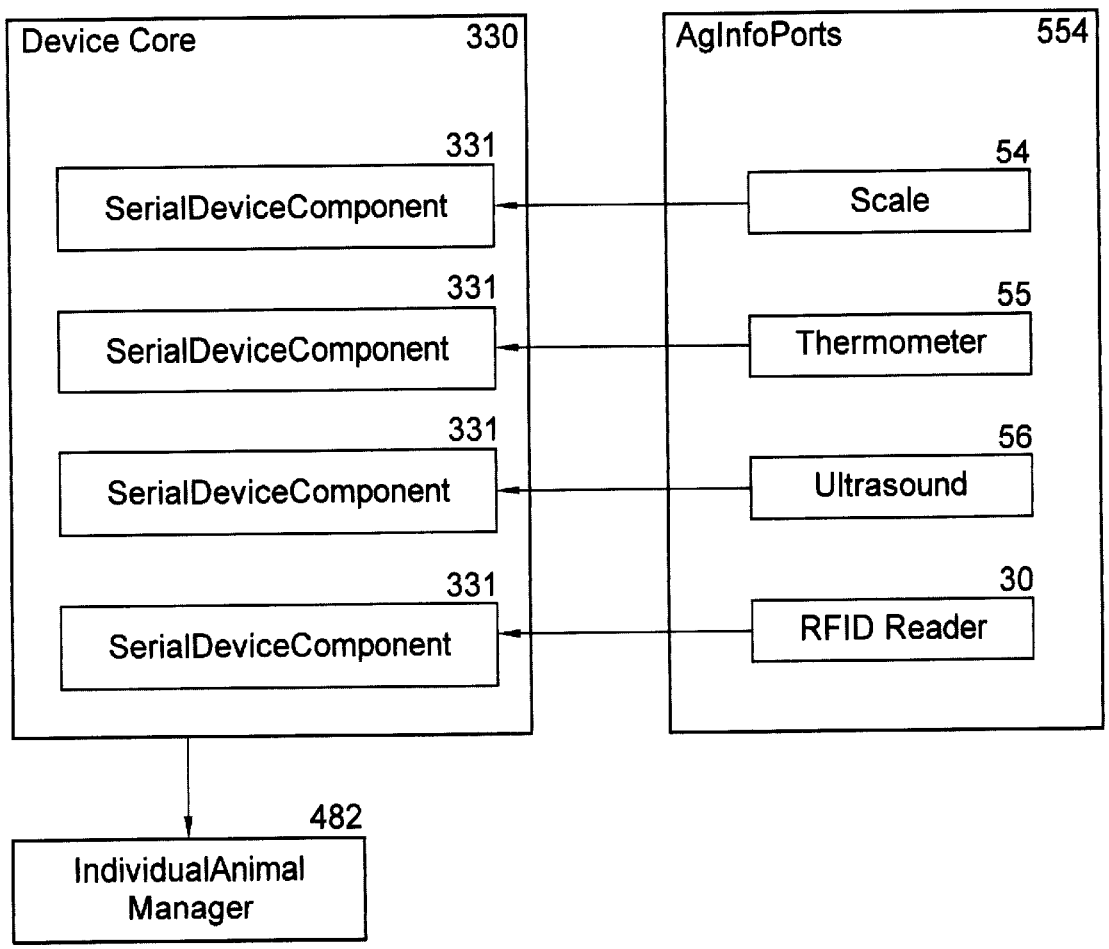
FIG. 18 illustrates the DeviceCore and AgInfoPorts components in the embodiment of FIG. 13.

Referring now to FIG. 18, the DeviceCore 330 includes SerialDeviceComponents 331 which interface with AgInfoPorts 554 to manage the connection to local or networked devices such as an RFID reader 30, scale 54, or ultrasound 56. The DeviceCore performs manipulation, and notification functions and allows AgInfoPorts 554 to send data to the IndividualAnimalManager 482 component and other third party components.

The Core Components

Figure 19:
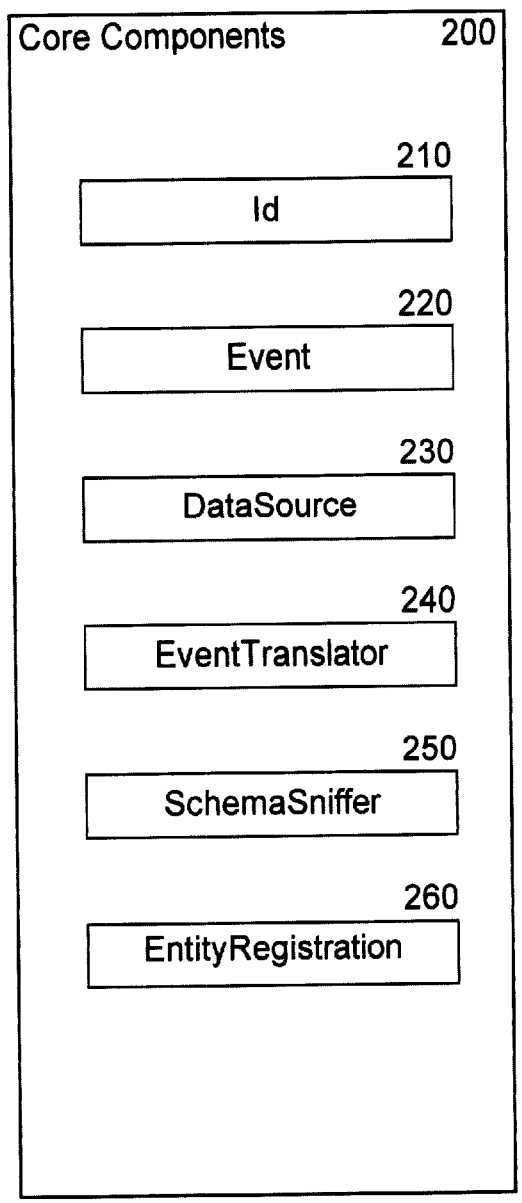
FIG. 19 illustrates the core components in the embodiment of FIG. 13.

Referring to FIG. 19, the following core components are used throughout the data collection, SSRI, ETL, and reporting functions. Id 210 is a unique identification number used to identify events, animals, regimens, images, and other entities. In one embodiment, the identification is a combination of machine identification and universal time that is created using the Microsoft GUID (Globally Unique Identifier) data type which allows for any machine in the world to create 1000 unique identifiers per second.

In this embodiment of an event database, an Event 220 is a group of data used to represent a discrete transaction against an animal. The event structure allows for any type of data, including binary data, to be attached to an animal or item, and allows for that data to be uniquely identified, classified, time-stamped, audited, and related to other data for that animal or item.

Figure 20:
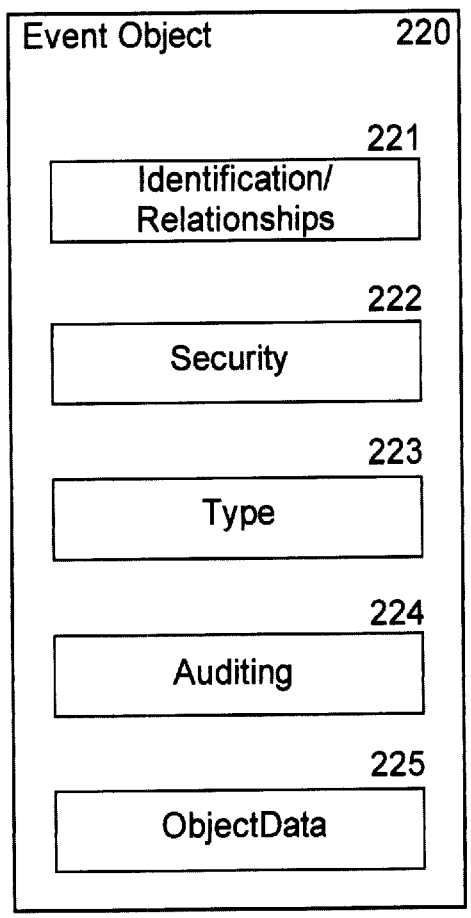
FIG. 20 illustrates the dynamic event object in the embodiment of FIG. 13.

Referring now to FIG. 20, the dynamic event object 220 includes unique identification 221 of the event with respect to parent, child, or sibling relationships to other event objects; security 222 which validates all data stored within the event object; type 223 which specifies the classification of the commodity such as animal, grain, or fruit; auditing 224 which includes the date and time of the transaction, the date and time of creating the event, the transaction creation method, and the transaction origin; and object data 225 which identifies the transaction type and supports the storage of any serializable data such as strings, numeric, data, time, or a binary stream or file. In this embodiment, a dynamic event object is a transaction-based data element that can be related to an animal, person, place, group, or object. Some examples of events include animal data such as weight or breed; group data such as ranch or shipping date; and customer information such as address or purchase order. The event representation permits description of a series of processing steps which result in the completion of a specific function or activity, so that a set of actions may be treated as a single unit of work.

Referring again to FIG. 19, DataSource 230 abstracts a data source such as a comma-delimited file, an ISAM database, a Client/Server SQL database, or other data source. All data manipulation requests, such as queries and manipulations, are routed through this component. In this embodiment, MicroSoft Data Access Objects™ and MicroSoft Active Data Objects™ are encapsulated to provide this level of abstraction.

The EventTranslator 240 allows users or administrators to provide alternative language-specific representations for event types and details. This capability allows component interfaces to display information using the preferred language of the end user, while preserving the standardized/normalized value of the event information stored in the database. All events are stored in the database using a "Core" language. When these events, and their values, are displayed in a user interface, they are translated into the native language of the target user. The EventCore uses this component to translate user- or language-specific events back into their "Core" values.

As systems expand, so do their storage needs. SchemaSniffer 250 is a sub-component which validates existing storage capabilities, and scales those capabilities as required by the system components. SchemaSniffer provides for the automated scalability of database structures by ensuring that storage will be available for storing the minimum requirements of all components. Components using SchemaSniffer have the ability to create and enhance their storage specifications without worrying about the effects it will have on other system components—even those using the same storage location.

Entity Registration 260 connects to the GlobalCore to configure the dynamic database connections used by other components and the EventCore. This includes managing user information such as entity id, password, and language; and the connection properties for the Events Database, component database, sound file, and report templates.

Data Collection/Real-Time Data Lookup Components

Figure 21:
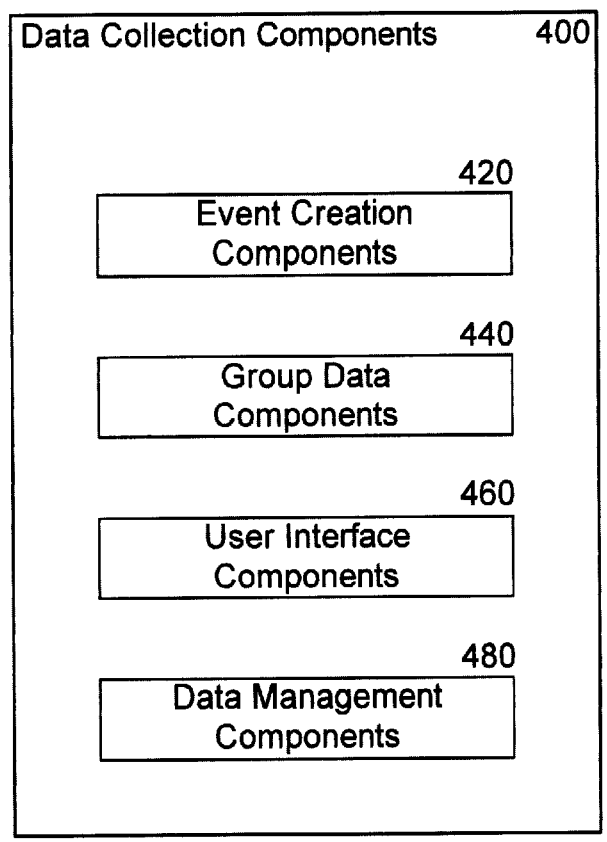
FIG. 21 illustrates the data collection and real time data lookup components in the embodiment of FIG. 13.
Figure 22:
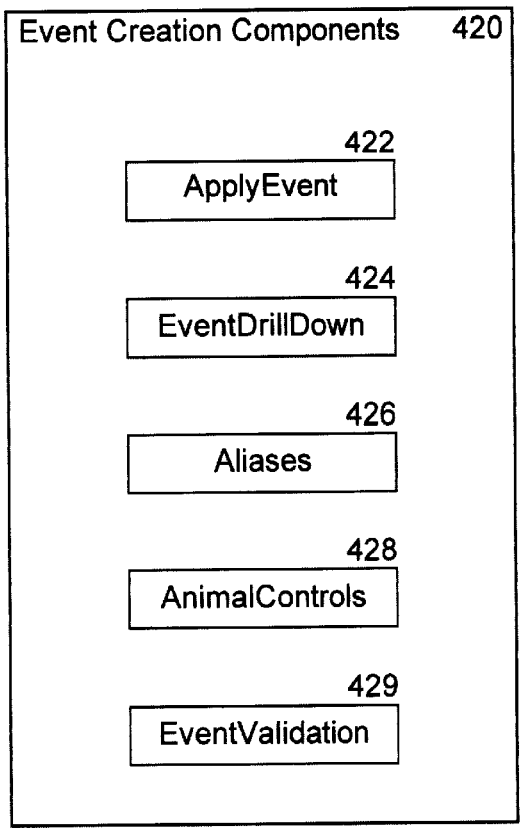
FIG. 22 illustrates event creation in the embodiment of FIG. 13.
Figure 23:
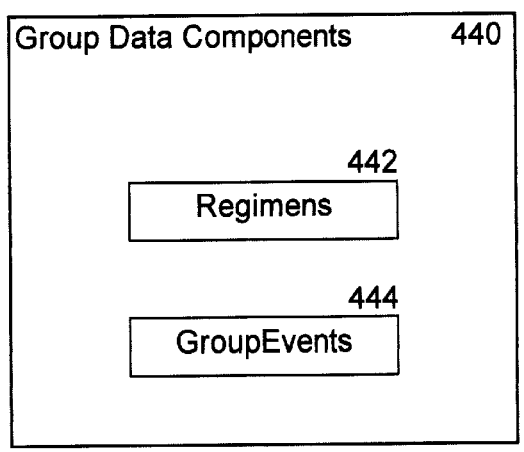
FIG. 23 illustrates group data creation in the embodiment of FIG. 13.
Figure 24:
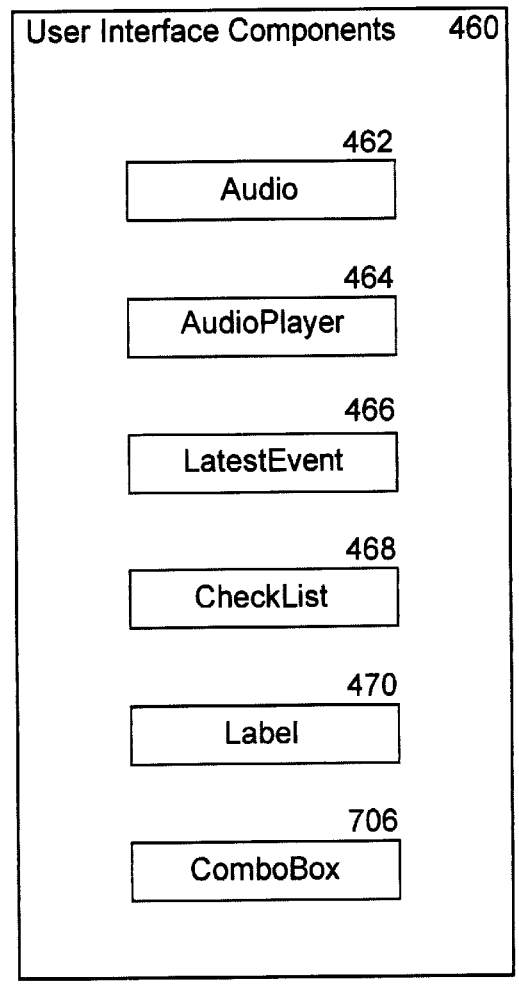
FIG. 24 illustrates user interface in the embodiment of FIG. 13.
Figure 25:
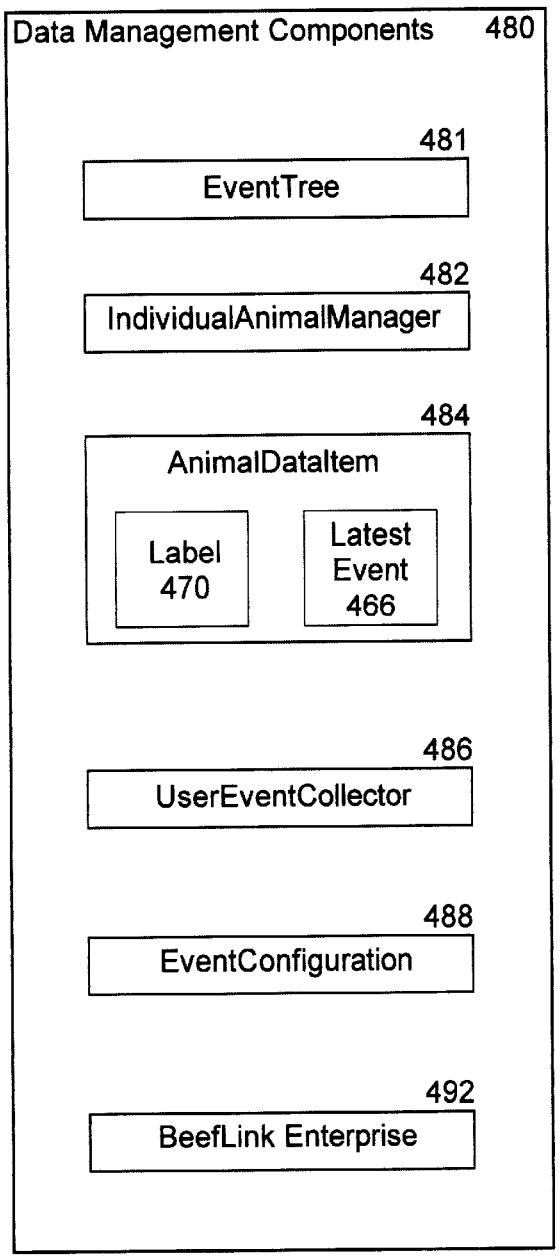
FIG. 25 illustrates data management functions in the embodiment of FIG. 13.

The data collection and real time data lookup components are illustrated in FIG. 21, and discussed below in terms of event creation 420 as shown in FIG. 22; group data creation 440 as shown in FIG. 23, user interface 460 as shown in FIG. 24, and data management 480 functions as shown in FIG. 25.

Referring now to FIG. 22, ApplyEvent 422 is an ActiveX control that uses the EventCore to create events, and through EventCore notification support the creation of special events, which are those events that require device information, keyboard input, or work card scans to complete the gathering of event information. Special events also include handling automatic sequences; transaction rollbacks such as "undo all events"; and animal processing such as "select previous animal". This is the primary event creation component used by the Individual Animal Manager.

EventDrillDown 424 is an ActiveX control used to show, in detail, a specific individual animal/commodity event, and to display image events. If used to view a new event created against the Active Animal, which is the animal currently being processed, it will allow for the event to be altered or deleted.

Aliases 426 allows aliases to be created for specific Events or Regimens. An alias can be a RFID or barcode value, such as those of a work cards, or may be any combination of user- or system-defined word, phrase, or number. Before events are created, or identification devices processed, the information is analyzed against the event aliases defined in the system to determine if they represent alternative events that should be applied to an animal. Numerous configurations can be created for each list of Event Aliases, and their real event types and details.

AnimalControls 428 is an internal ActiveX control that provides event data for individual animals. EventValidation 429 is used to check event data.

Referring now to FIG. 23, the GroupEvents 444 component permits any event or one or more regimen to be applied to a group of animals and to create individual event transactions for each animal in that group. This ability to enter data common to many animals greatly simplifies the data entry process. The component accesses existing groups in the database and presents them in drop-down menus for user selection. It also integrates the FilterAnimals and WhichAnimals components to provide both easy-to-use and complex methods of selecting a group of animals. The component also allows the user to set the date that the assigned events took place.

Regimens 442 is an ActiveX tree-view control used to create and manipulate groups of events that should be applied to an animal. It allows for the end-user or administrator to create any number of regimens that contain specific events. Each event can further describe itself by having child events created that attach themselves to it. One or more regimens can be selected to be applied to an animal. This allows for the specification and organization of events to be created based on the process that is occurring, such as animals being calved, or animals being received by a feedlot.

Referring now to FIG. 24, Audio 462 is an ActiveX grid control used to configure audio feedback for different permutations of Event types and Event details. It allows for the differentiation between identical event details for different event types, or a method to override the default audio feedback.

The AudioPlayer 464 sub-component provides standardized audio feedback to the user. It is responsible for providing specific audio feedback for event type and event detail permutations as configured through Audio or by system defaults. It is also responsible for the "intelligent playback" of audio strings like numbers such as "one-hundred twenty-one" rather than "one-two-one".

The LatestEvent 464 component, retrieves and stores specific events. It is used in forms to allow users to decide what event they want displayed and is used in AgInfoChutes to monitor cells in MicroSoft Excel worksheets.

CheckList 468 is an ActiveX control that allows for user- or system-specific checklists to be created. It provides consistent checklist functionality across components. List items can be added, removed, or modified by the end user as needs change.

Label 470 is an ActiveX control that hooks to the GlobalCore to allow for language-specific or user-configured labels in the components. All labels and text items in the components will allow for their values to be changed dynamically by the end-user. This allows for complete language-customization of user interfaces.

ComboBox 706 provides consistent functionality across components by automatically extracting Event types, details, or other properties as they currently exist in the events database or as configured through the EventConfiguration component. It also provides pattern matching as the user types, and search features.

Referring now to FIG. 25, EventTree 481 is an ActiveX tree-view control that hooks to an Animal control 428 to display all the event information, in real time, that exists on an animal. It organizes events by the dates that they were applied, and by their hierarchical relationships with other events. It uses the EventDrillDown component 424 to provide a method for drilling-down into the specific event information including images, which allows for modification of the event during the working session of an Active Animal.

Figure 26:
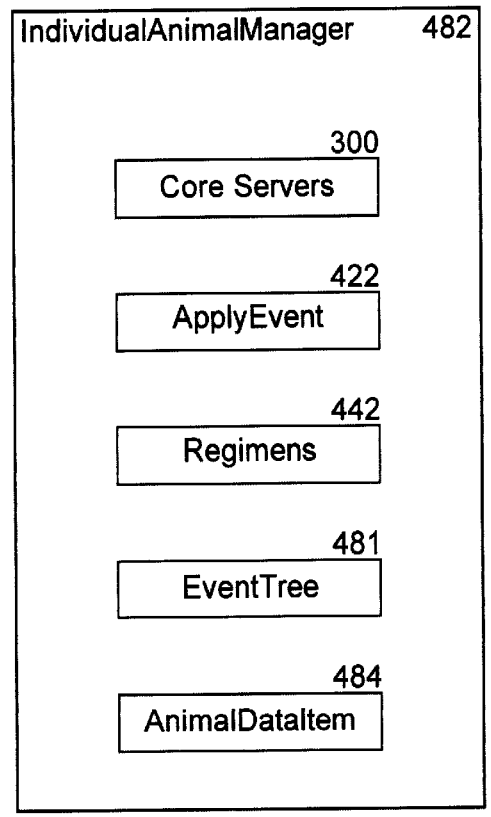
FIG. 26 illustrates the Individual Animal Manager in the embodiment of FIG. 13.

Referring now to FIG. 26, the Individual Animal Manager (IAM) 482 component is the container that incorporates all three core servers 300, the Animal 428, ApplyEvent 422, Regimens 442, EventTree 481, and numerous AnimalDataItem 484 components for collecting and viewing transaction-based data. As the data is created by its subcomponents, it is saved to an Animal's record and displayed along with any historic data. In this embodiment, the data is displayed in a chronological format using the EventTree 481 component, complete with multi-tier parent/child relationships.

Referring again to FIG. 25, AnimalDataItem 484 is an ActiveX control that hooks to the EventCore and extracts specific animal data from the transactional information. It allows the end-user to select specific event data to be displayed, such as BIRTHDATE, the last weight, or the first OWNER for the "Active Animal", which is the animal that is currently being worked. The control allows for VB Script to be used to aggregate or summarize data, such as by calculating "Age in months" using the BIRTHDATE. The AnimalDataItem 484 is a combination of LatestEvent 464 and Label 470.

The UserEventCollector 486 scans an Events database and extracts all the distinct Event Types and Event Details that currently exist on the animals. This information is loaded into the components database and used by all instances of the ComboBox control 706.

EventConfiguration 488 is used in conjunction with the EventValidation 429 component to validate existing data and to ensure that system and user-defined guidelines are being applied to data as they are collected.

BeefLink Enterprise 492 is a combination of data collection components that utilize a LAN or Internet-based network to retrieve and store event information in a client/server environment. This system can use any OLE-DB or ODBC-compliant database for event information storage, including SQL Server and Oracle. With events stored in a networked server, animal information is immediately consolidated and available across all feedlot chutes or enterprise business centers.

Share, Switch, Route, Interface ("SSRI") Components

Figure 27:
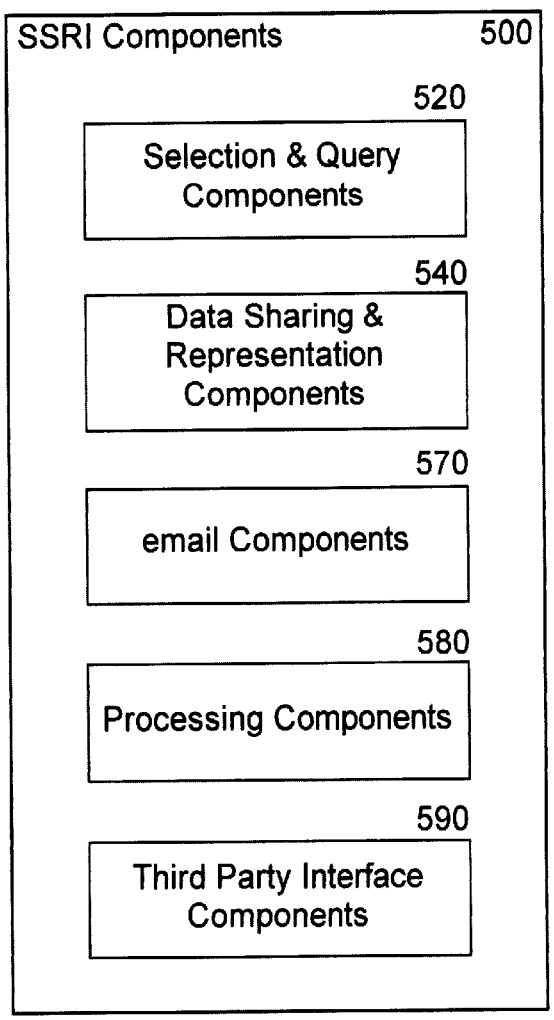
FIG. 27 illustrates the Share, Switch, Route, and Interface components in the embodiment of FIG. 13.

The SSRI components 500 are summarized in FIG. 27 and discussed below according to selection and query functions 520 which operate on transactional data; data sharing and reformatting of data representation 540; email capabilities 570; processing of data 580; and interfacing to third party software 590.

Figure 28:
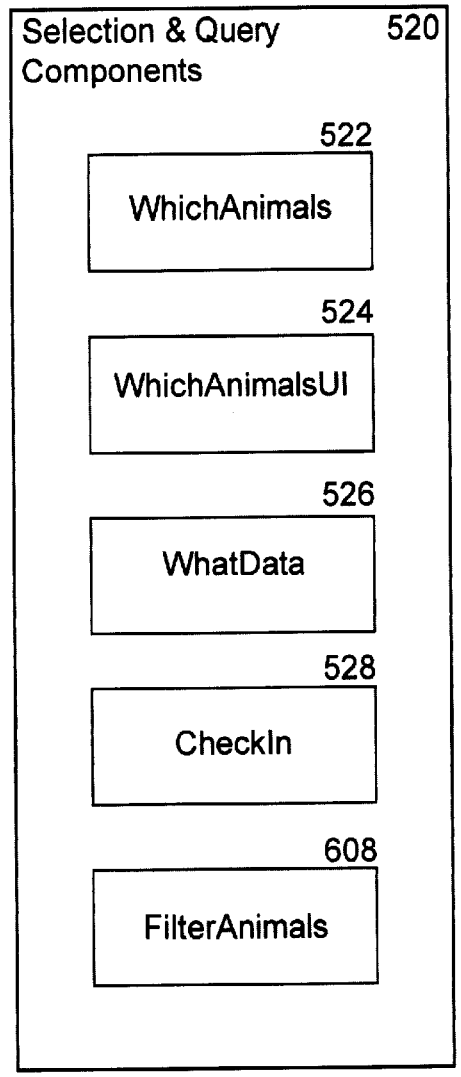
FIG. 28 illustrates selection and query components in the embodiment of FIG. 13.

Referring to FIG. 28, WhichAnimals 522 is a set of ActiveX controls with user interfaces to provide a means of isolating the animals, if any, that fulfill user- or system-definable criteria. Providing animal or commodity information to data marts, data mines, and general reporting tools first identifying which subset of animals or commodities in the data warehouse need to have information extracted. Since there may be millions of animals or commodities, segregating the data before migrating or transforming it is enables efficient processing. The resulting group of animals or commodities can be fed directly into the WhatData 526 components.

WhichAnimalsUI 524 is a user interface that allows the user or administrator to create, delete, or alter the WhichAnimal items that are used for identifying the criteria for selecting animals. It simplifies the process of selecting animals by presenting a checklist of WhichAnimal criteria.

WhatData 526 is a set of ActiveX controls, with user interfaces, that provide a means of extracting specific transactional data for one or more animals commodities and providing it in a relational format that is typical for spreadsheets, data marts and data mines. The controls can process, aggregate, and summarize the transactional data and provide both atomic and list-oriented data for every type of event, or event property, that is associated with an animal or animal group.

CheckIn 528 is a component used by copy-protection and event registration components to gather "411" and billing information from Beeflink and Pony Express stations. This DLL searches a system for all events databases, gathers pertinent information, and delivers it to an Internet-based information server.

Figures 29, 31:
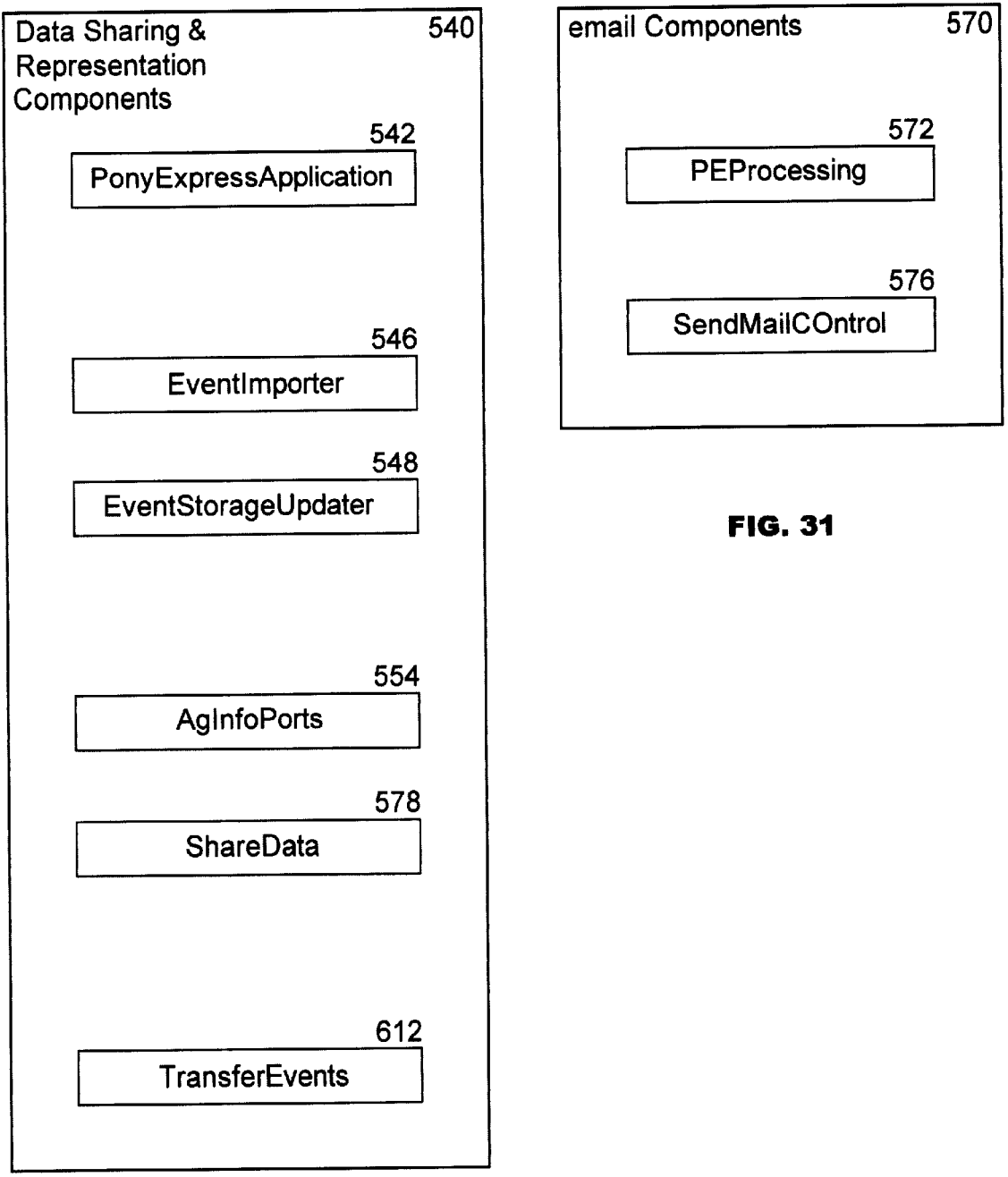
FIG. 29 illustrates the data sharing and representation components in the embodiment of FIG. 13.
FIG. 31 illustrates the electronic file transfer components in the embodiment of FIG. 13.

Referring to FIG. 29, which illustrates data sharing and representation components, the PonyExpressApplication 542 server application accepts files from BeefLink databases, stores the data, and sends it out to other parties that have the authority and interest in getting the data. It encapsulates the ShareDate 578 component for creating proprietary AGIL files containing update information necessary for each producer. It automatically creates these update files, and emails them to the producer or Pony Express recipient, and allows including or excluding individual event types from the oputput file by the entity receiving the data.

EventImporter 546 is an application used to import relational data, in the form of one animal per row with animal attributes in each column of the row, from any databases and tables. The application will convert relational data into transaction-based data, allowing event attributes such as Animal Id, Date/Time, Entity Id, etc. to be extracted from the relational data. In this embodiment, the application is used to import most packing plant data.

The EventStorageUpdater 548 application utilizes the Schema Sniffer 250 to verify the Events database structure, and to modify it if necessary. It will also provide the ability to make a backup of the database.

AgInfoPorts 554 is a user interface to all serial devices used to collect data with the components. It allows for connecting any number of serial devices (one for each port), all with unique filtering, validation, device triggers, and min/max values. The user may set a port's serial parameters and view raw data in the port buffer for trouble-shooting purposes.

ShareData 578 allows users to easily save and move their data. The functions include both disk storage and automatic email capabilities, ftp, and a compacted XML file structure. Data that has already been sent is tracked and not sent again, providing incremental update files. Events can also be included or excluded from being sent with the AGIL file. ShareData incorporates WhichANimals 522 and FilterAnimals 608 for selecting specific animals.

Figure 30:
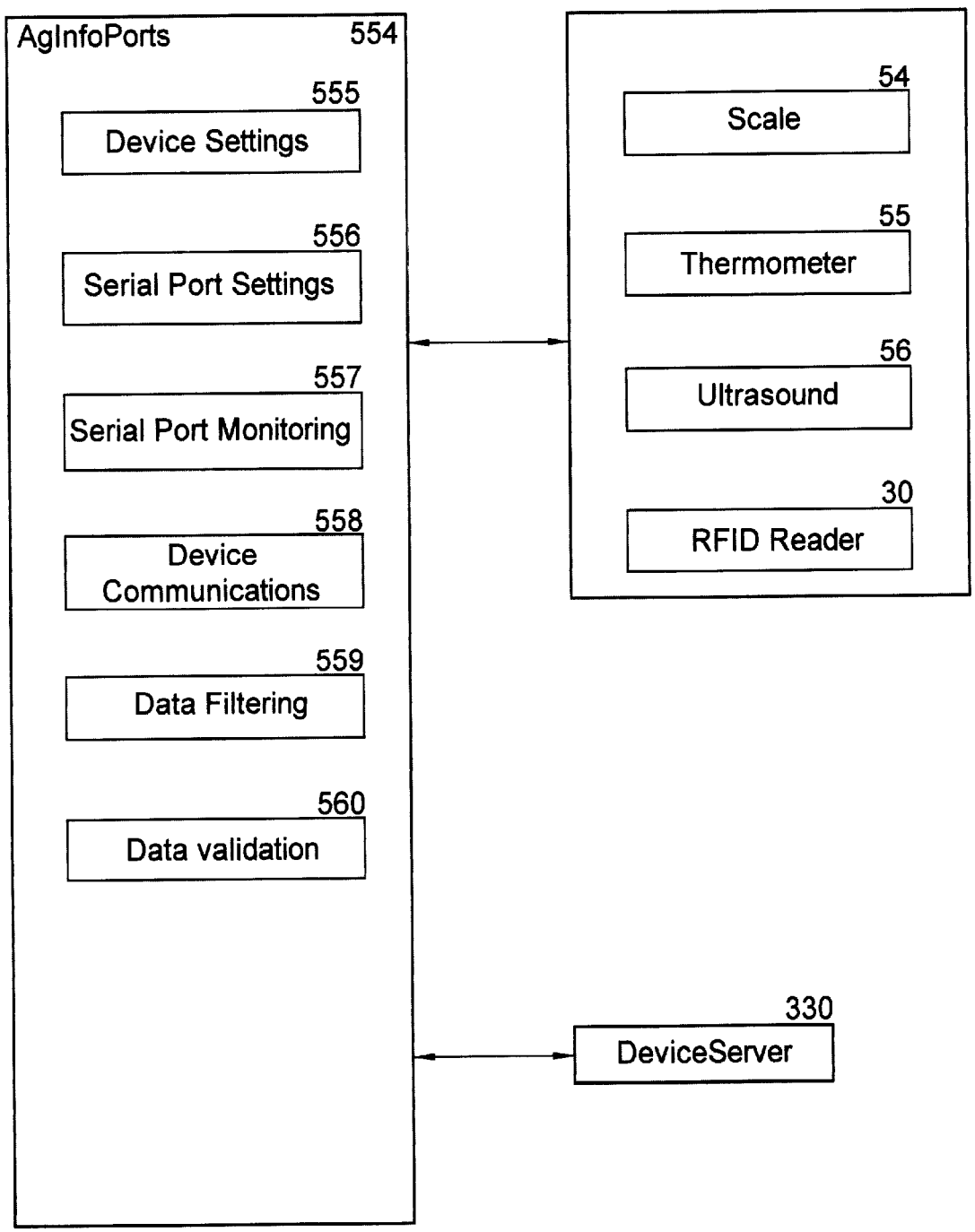
FIG. 30 illustrates the AgInfoPorts component in the embodiment of FIG. 13.

Referring now to FIG. 30, the AgInfoPort 554 component connects physical hardware, such as scales 54, thermometers 55, Ultrasound 56, RFID readers 30, bar code readers, and other monitoring devices to the device server 330. The component includes device settings 555 including logical device names and default settings for know devices; serial port settings 556 including user configurable port assignment and baud rate; serial port monitoring 557 to display data received through a specified port and logging of that data to a file; user configurable device communications 558 including data to configure the device and to trigger the device to send information; user configurable data filtering 559 for noise elimination, string matching, and data stripping; and data validation 560 to specify ranges or lists of values for filtered data and to create indicators of data stability. The component provides a graphical display showing COM port status, current data, and auditing information.

Referring now to FIG. 31, PEProcessing 572 automatically searches email attachments and extracts the entity information such as sender, recipient, time sent, time received, and attachments, and prepares it for the ETL Engine 630. The data is converted to transaction-based events as well as a user-specific data mart.

SendMailControl 576 bundles email messages into a specific format such as subject field, message text, sender, etc. and ensure proper formatting for email-based disconnected networking solutions where automated message processing is desired.

Figure 32:
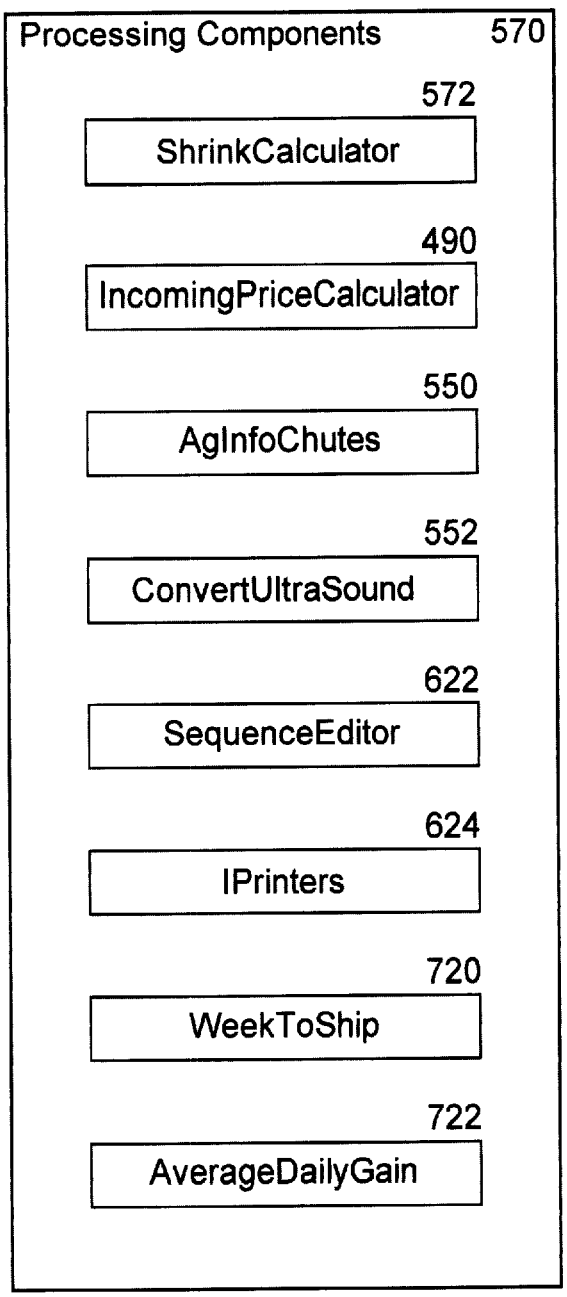
FIG. 32 illustrates the ShrinkCalculator processing component in the embodiment of FIG. 13.

Referring now to FIG. 32, ShrinkCalculator 582 is an example of a processing component. This application runs simultaneously with the Animal Manager and other real-time components. During the day, animals are losing water weight as they wait, under stress, to be processed. The result is a weight that is lower than what it should be. This shrink can be represented as a percentage, with respect to time, of the total animal's weight. The ShrinkCalculator component calculates this shrink, and creates an adjusted weight event that describes the animal's true weight, as if shrink not been a factor. This adjustment can be used in conjunction with AverageDailyGain 722 and WeekToShip 720 to provide more accurate finishing weights and information.

The IncomingPriceCalculator 490 component is typically used at chute-side to calculate incoming animal prices by comparing current weight with a base weight, base price, and value slide.

AgInfoChutes 550 is a real-time extension of the AgInfoSheets technology. WhatData items are used to populate Excel™ spreadsheets in real-time as animals are processed. The component allows for complex templates to be created with Microsoft Excel that extract Active Animal information and notifications from the Event Core. Information can be automatically used by charts, graphs, equations, macros, and VBA functions. In this embodiment, AgInfoChutes has two modes: Single-Animal and Multiple-Animals. Single-Animal mode refreshes the spreadsheet for each animal as it is processed, allowing for operation similar to the Individual Animal Manager. Multiple-Animals operation streams in a row of data for each animal processed, inserting rows for formulas, graphs, charts, and macros as necessary. Embedding AnimalDataItem into worksheets allows for new events to be created by the worksheets.

AgInfoConvertUltrasound 552 is a specific component written to convert metric units for ultrasound measurements into English units. The component establishes a connected with the AgInfoEventCore and monitors for any ultrasound events, which it modifies.

EventSort 620 establishes a connection to the EventCore and allows the user to trap for specific event types and values as they are being created against an animal. Any number of events and values, including ranges of values, can be trapped, and specific audio feedback can be specified for each. Events may be created in response to this feedback from the Event Core. This component supports fully customizable decision support systems that operate in real-time.

SequenceEditor 622 allows the user or system administrator to configure automated sequences to be used for event data during animal processing. When an event requests a sequence be used, a user-defined prefix, suffix, and numeric value are concatenated to produce an alphanumeric value. The numeric value is then incremented by a user-specified amount. Any number of sequences can be created and configured in this manner.

IPrinters 624 runs concurrently with the Animal Manager or Group Events to establish a connection to the Event Core to monitor for PRINTER or VISUALID events being created. When these events are created, a barcode label for the Animal Id and Visual Id is printed on a label printer.

Processing controls including WeektoShip 720 and AverageDailyGain 722 establish a connection to the Event Core and monitor weight events that are being recorded against an animal. They run simultaneously with the Animal Manager to provide value-added data gathered during animal processing. WeektoShip draws on historic data such as sex and previous weight, and current data such as target weight and current weight, to calculate the week of the year the animal is to be shipped or slaughtered. The result is displayed and spoken back to the user in real time as well as written to the database. AverageDailyGain calculates an animal's gain over the last period for weights collected. It displays the gain, speaks it back, and writes it to the database, if desired, and may graph the history of each animal's weight as the animal is scanned.

Figure 33:
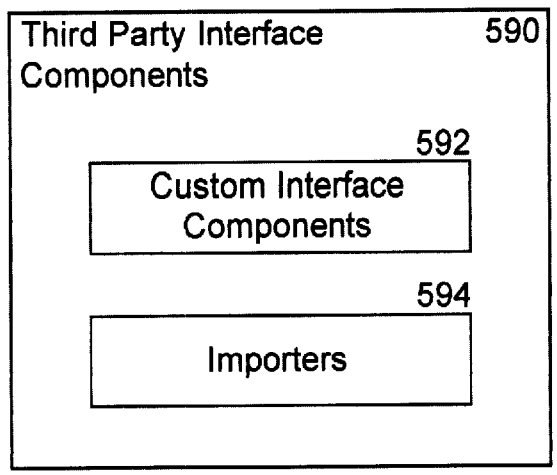
FIG. 33 illustrates interfaces to third party software in the embodiment of FIG. 13.

Referring now to FIG. 33, interfaces to third party software is accomplished by both general components and custom interface components 592 that are developed for providing specific post-processing file formats of the third party software.

Importers 594 is an ActiveX control used to extract information from fixed-width files into an Excel spreadsheet. Data location within the file is specified in various spreadsheet cells, and the component is responsible for extracting the data from the file and populating those cells.

Extract, Transform, Load ("ETL") Components

Figure 34:
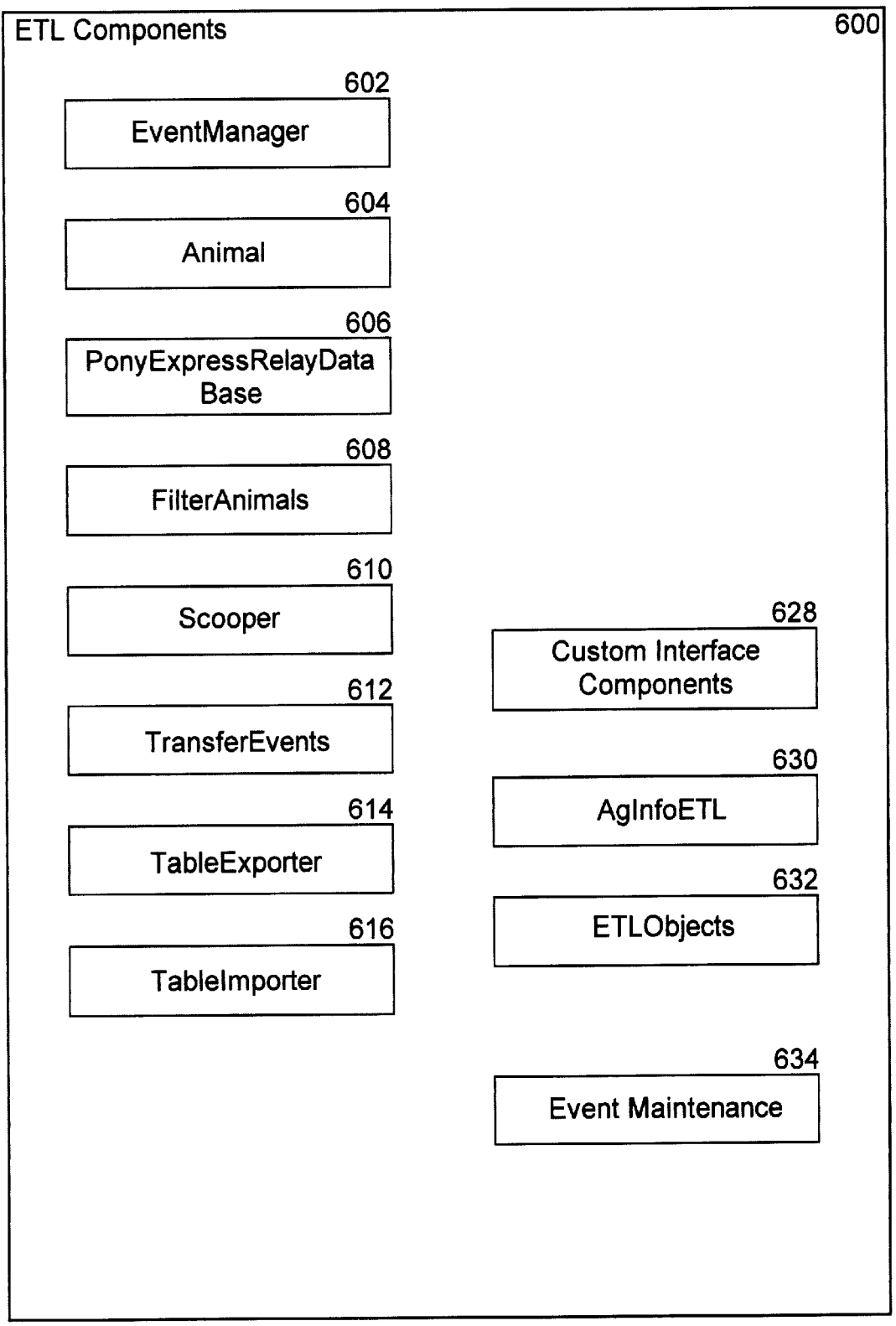
FIG. 34 illustrates the ETL components in the embodiment of FIG. 13.

FIG. 34 summarizes the ETL components. EventManager 602 archives animals based on events and allows for electronic id tag reuse and scrubs data based upon user or system definable criteria.

Figure 61:
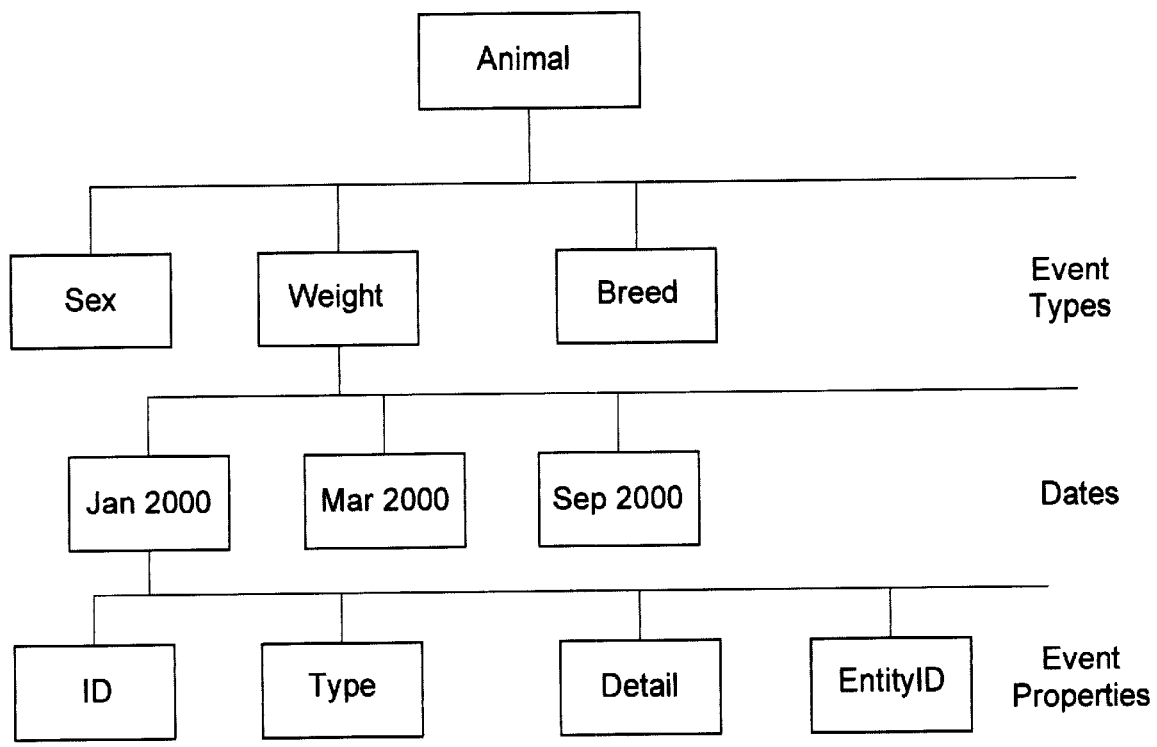
FIG. 61 illustrates an Animal event tree-structure.

Animal 604 is used to bulk-load all Events for a specific animal. Events are loaded directly from the transactional database structure and organized into a sorted tree structure collection as illustrated in FIG. 61. In this example, specific weight event properties are quickly retrievable according to the date of a weight. The control provides standardized methods for extracting specific animal data for business processing, aggregation or summarization. Pony Express Relay Database™ 606 identifies the ownership of animal data based on the event properties of the events that exist in the data warehouse. In this embodiment, data ownership is defined as any data that exists on an animal that had events applied to it by the specific owner in question. The component will also extract, compress, and encrypt the specific animal data so that it can be propagated to other systems via disk or network connections such as email, web, LAN, or WAN. This is commonly referred to as an AGIL file. A version of the component utilizes any OLE-DB or ODBC-compliant database, including SQL Server and Oracle.

FilterAnimals 608 is a control, similar to WhichAnimals, but provides a more simplified method for the user to select groups of animals based on specific event values. A combination of up to five of any event, and values for each of those events, can be selected by the user in order to capture the appropriate animals.

Scooper 610 is a set of components that can be used to share database information between two or more databases or systems. The components allow applications to access a database and to isolate specific information from one or more tables. This information is extracted, compressed, and encrypted so that it can be propagated to other databases/systems via disk or network such as web, email, LAN, or WAN. These files, called AGILPS files, are then decrypted, decompressed, and imported into a target database. Scooper differs from Pony Express Relay Database™ in that it is focused on general component information, rather than event information.

TransferEvents 612 loads data into the target Events database from a source database or AGIL file created by ShareData or AgInfoPonyExpress that is received by another user or by PERD. By double-clicking on an AGIL file, this application automatically starts, checks to ensure the Events database is properly configured, and imports the data into the database. TransferEvents 612 loads data into the target Events database from a source database or AGIL file created by ShareData or AgInfoPonyExpress that is received by another user or by PERD. By double-clicking on an AGIL file, this application automatically starts, checks to ensure the Events database is properly configured, and imports the data into the database.

TableExporter 614 uses the Scooper 610 to allow the user to select component information stored in a database to share with another system. The information from each desired component table is extracted, compressed, and encrypted so that it can be propagated to other databases/systems via disk or network (web, email, LAN, WAN, etc). The output is a proprietary AGILPS file.

TableImporter 616 loads the data found in an AGILPS file created by the Table Exporter into the components database. These files are decrypted, decompressed, and imported using this product. This product allows for default information, specific to a target market, to be configured, exported via the Table Exporter, and propagated across multiple target machines. The Table Importer also supports a "silent mode" which can be used by an installation application or CD to load default component information specific to that target machine.

Custom interface components 628 provide specific interfaces to customer systems.

AgInfoETL 630 is an extraction, transformation, and loading server that continually monitors the system for carcass information that needs to be processed. Information that is received, via email, by the PEProcessing engine is placed within a processing queue monitored by an AgInfoETL service. Information is extracted from the queue, transformed into Events and CISData, then loaded into the carcass data mart, the AgInfoSheets server, and the Pony Express system. Configuration of the server queue and monitoring settings allows the component to be scaled into a multiple server environment for distributed processing. Log files for each transformation attempt are created and stored to an FTP server.

ETLObjects 632 is a set of objects used for data transformation for ISFF (Industry Standard File Format), and customer output files into CISData and Events.

EventMaintenance 634 modifies and scrubs data in an CISData mart and Pony Express server. The component is used to create data validation and modification rules on the data contained within the mart. Each type of event can be assigned default values, as well as locating and correcting errors in existing data.

Report & Analyze Data Components

Figure 35:
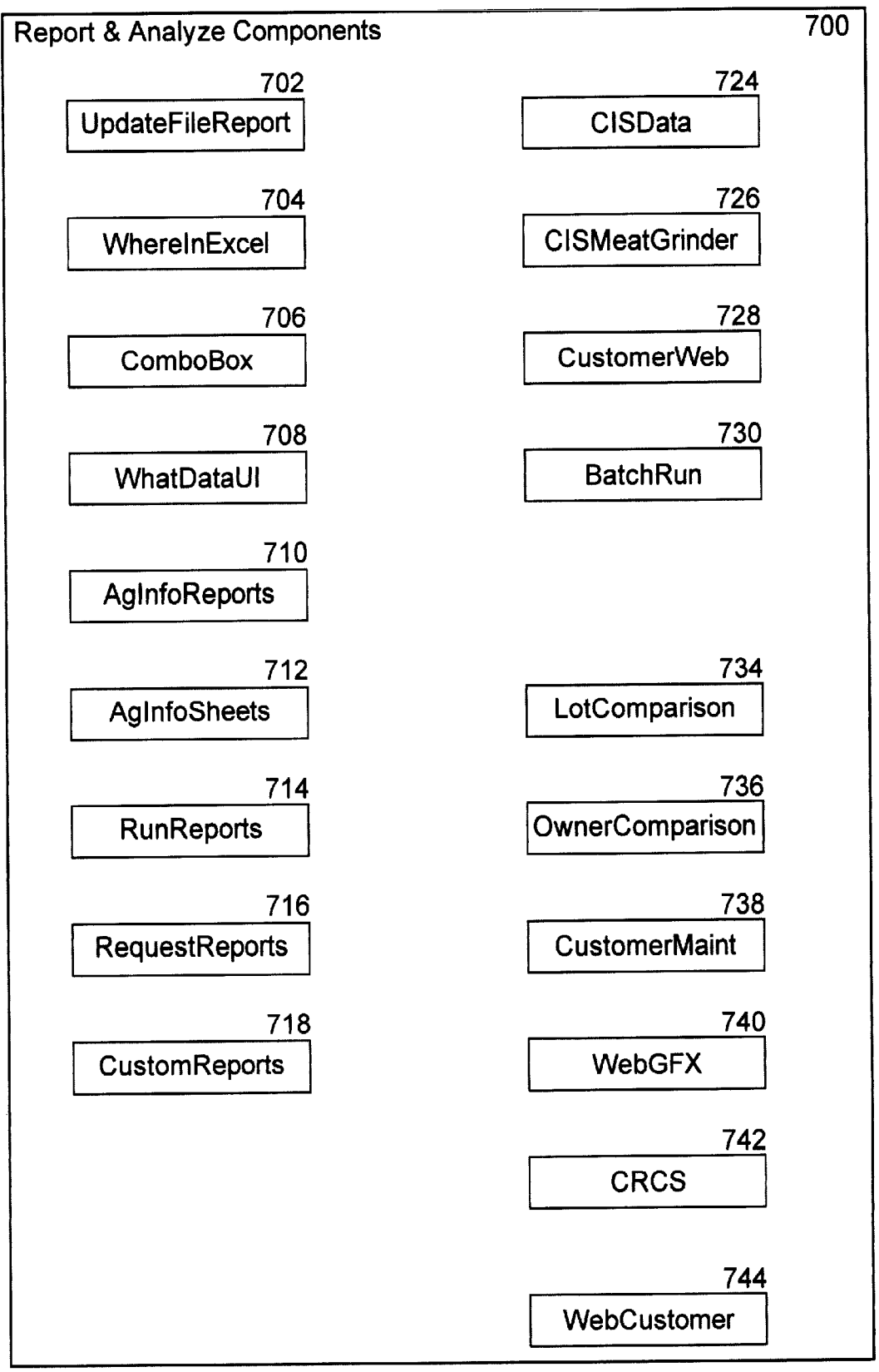
FIG. 35 illustrates the report and analyze components in the embodiment of FIG. 13.

FIG. 35 summarizes the report and analyze components 700. UpdateFileReport 702 is a Dynamic-HTML engine that creates an HTML report that describes and analyzes the event data found in a file created by Pony Express Relay Database™. Each report is integrated with the Individual Animal Manager for individual animal drill-down; and with the generate reports utility of AgInfoSheets for group animal drill-down. This component allows large producers, or data distribution centers, to report on the information being received, and to process the information accordingly; such as generating certain reports for the producer when packing plant data is received.

WhereInExcel 704 places WhatData items in a MicroSoft Excel spreadsheet template.

WhatDataUI 708 allows for the user or administrator to create, delete, or alter the WhatData items that are used for extracting specific transactional data. The interface simplifies the process of selecting data for animals by presenting a checklist of available WhatData items.

AgInfoReports 710 is an Access-based reporting engine that allows for reports based on the last occurrence of specific events to be quickly created using Access' reporting features. Canned reports are shipped with AgInfoReports, and many customizations have been made for specific clients. AgInfoReports supports filtering and sorting operations based on specific event fields used in each report. Variations of this engine allow for specific fields to be created, and exported as a comma-delimited-file.

AgInfoSheets 712 is a reporting tool that complements AgInfoReports by combining WhichAnimals, WhatData, and the WhereInExcel components as a single embedded ActiveX control that resides in an MS-Excel spreadsheet. This allows the user to inject any data from an events database anywhere into an Excel template. Templates that include summary formulas and charts can be designed, saved, and deployed. With the click of a button, event-oriented data, dates, etc. fill the spreadsheet. AgInfoSheets allows transaction-oriented data to be queried and presented in an easy-to-understand form.

RunReports 714 is the primary front-end for producing AgInfoSheets reports. It provides a tree-view checklist to select the reports and automates the process of creating each of those reports. It also provides a front-end method of "overriding" the animals that are used in each report by providing both FilterAnimals and WhichAnimals components for selecting the animals to use.

RequestReports 716 is a client-side application specifically for a CIS data item 724 that presents available animals by lot, packer, sex, market category, etc. in a concise, user-configurable format before requesting AgInfoSheets reports from a Server over the Internet.

Custom reports 718 may be developed for specific customers.

The CISData 724 is a carcass information data mart installed on Microsoft SQL Server. The Data mart has been standardized for use by more than one customer. Multiple servers/data marts are currently housing information gathered from customer packing plants.

The CISMeatGrinder 726 component loads dynamic HTML templates with carcass information. It connects to a CISData mart and extracts information based upon user-chosen packing plants, kill dates, producers, and market categories; then constructs final HTML output that is sent to the end browser. Group data is constructed by analyzing the individual animal data. The component can be used to create HTML reports based upon carcass dentition, fat analysis, carcass weights, and group compliance.

CustomerWeb 728 is a secured web-based reporting system used for benchmarking a customer's carcass information. The component is used by alliance administrators, as well as producers contributing product/services to the alliance, and provides group-based reporting that can drill-down to individual animal information. The component allows for benchmarking between specific producers, kill dates, and lots; and features a security system that filters content based upon user login and security level. The component is implemented using Active Server Pages, and utilizes a CISData mart specific to the customer's animals.

BatchRun 730 is a server application that monitors requests for AgInfoSheets reports. The RequestReports application is used by the client to create a request, which this server component uses to generate and email AgInfoSheets reports. Reports are typically sent to each producer, but are also consolidated on an FTP server for alliance administrators.

LotComparison 734 is an HTML based web service used to extract information from a CISData mart. The component extracts, and presents, information specific to a packing plant, one or more producer, a range of kill dates, or a specific kill lot. The component acepts user selectable date ranges provided through pop-up calendar controls. The component is used by the IQBSN project as described in an embodiment below.

OwnerComparison 736 is an extension of the LotComparison control that allows for end-user selection to not only select a kill date range, but also a specific producer. The component allows for benchmarking between producers.

CustomerMaint 738 is an application used by a data administrator to search a CISData mart for information specific to a packer, market category, producer, kill date, lot, or animal sex. The component can then be used to modify the values for the packer, market category, producer, or animal sex. These modifications are also applied to a Pony Express server.

WebGFX 740 is a web-based search engine used for finding animals based upon results from a genetics trial. The component allows for quick drill-down of individual animals based upon gender, breed, ID, and/or marbling results., and provides ability to add, remove, and edit animal data on-line.

CRCS 742 is a web-based product registration system used to track customer information and activate deployed software. The component supports third-party licensing of InfoPorts; and requires user registration for product to function. The component records customer information for each installed platform, and supplies activation codes to end-users or support personnel.

WebCustomer 744 is a secured web-based reporting engine that consolidates individual carcass information for accounting and benchmarking purposes. Utilizing a PEProcessing and AgInfoETL server, carcass files delivered from several customer packing plants are automatically transformed and loaded into an CISData mart. When data is loaded, it is immediately available for on-line reporting. The system can drill down based upon packing plant, producer, kill dates, and market categories. The component supports what-if comparisons between market categories.

DESCRIPTION OF EMBODIMENTS

Component Based Computer Program Product

In this example, the BEEFLINK™ data collection software is a collection of components written primarily in VISUAL BASIC™ 6.0 programming language and ACTIVE X™ programming methodologies. Most of the components of the computer program product are incorporated into software commercially available under the name BEEFLINK™, produced by AgInfoLink USA Inc. of Longmont, Colo. The software is an event-based beef cattle data collection and data management system which is easily adaptable to other livestock species by changing the definition of industry-specific default events.

Within the computer program product, an event uniquely identifies the data to which the event relates. The event identifies the person, place or thing to which the event applies, as well as any parent, child or sibling relations to other data. The classification type assigned to the event is also specified, such as the type of data that has been entered. The computer program product also contains auditing functionality that identifies the creation of the event transaction. The data is audited according to the date and time of the transaction, the transaction creation method and the origin of the transaction. Any serializable data is stored in the database, including strings, numeric data, date/time data, and binary/stream file data.

Figure 36:
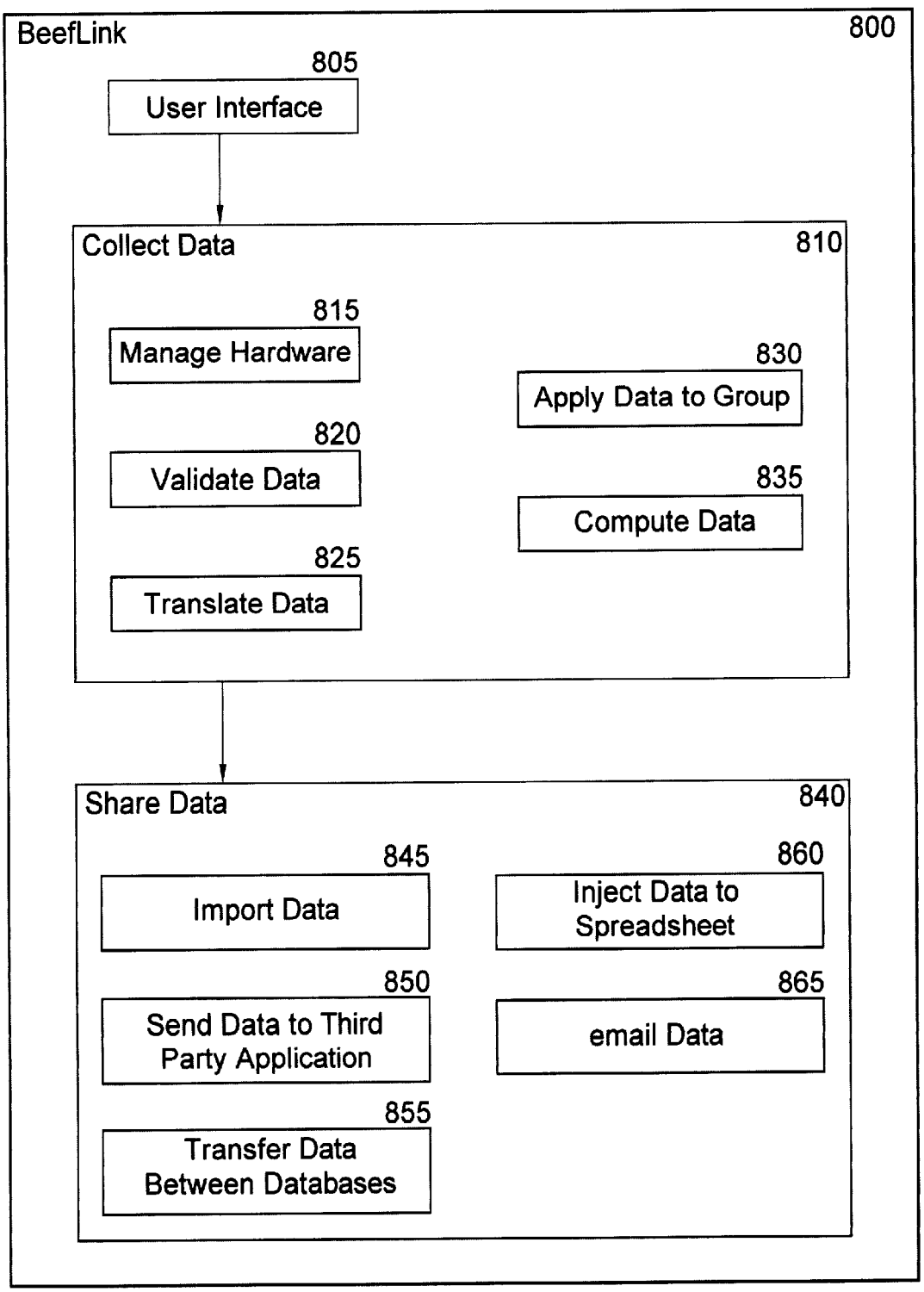
FIG. 36 summarizes user interface, data collection, and data sharing functions of an embodiment.

Referring now to FIG. 36, the functions of the BeefLink software 800 include user interface and basic functions 805; data collection functions 810 including managing hardware devices that support automated entry of animal identification and data associated with that animal 815, validating data 820, translating data 825, applying data to a group 830, and computing data 835 such as calculating average daily weight gain and determining the best time for an animal to go to slaughter based on target weight; and sharing and reporting data functions 840 including importing data 845, sending data to third party applications 850, transferring data from one database to another on the same machine or within a network 855, injecting data into a spreadsheet 860, and email transfer of data 865. The data collection and sharing and reporting functions apply throughout the supply chain illustrated in FIG. 6.

Figure 37:
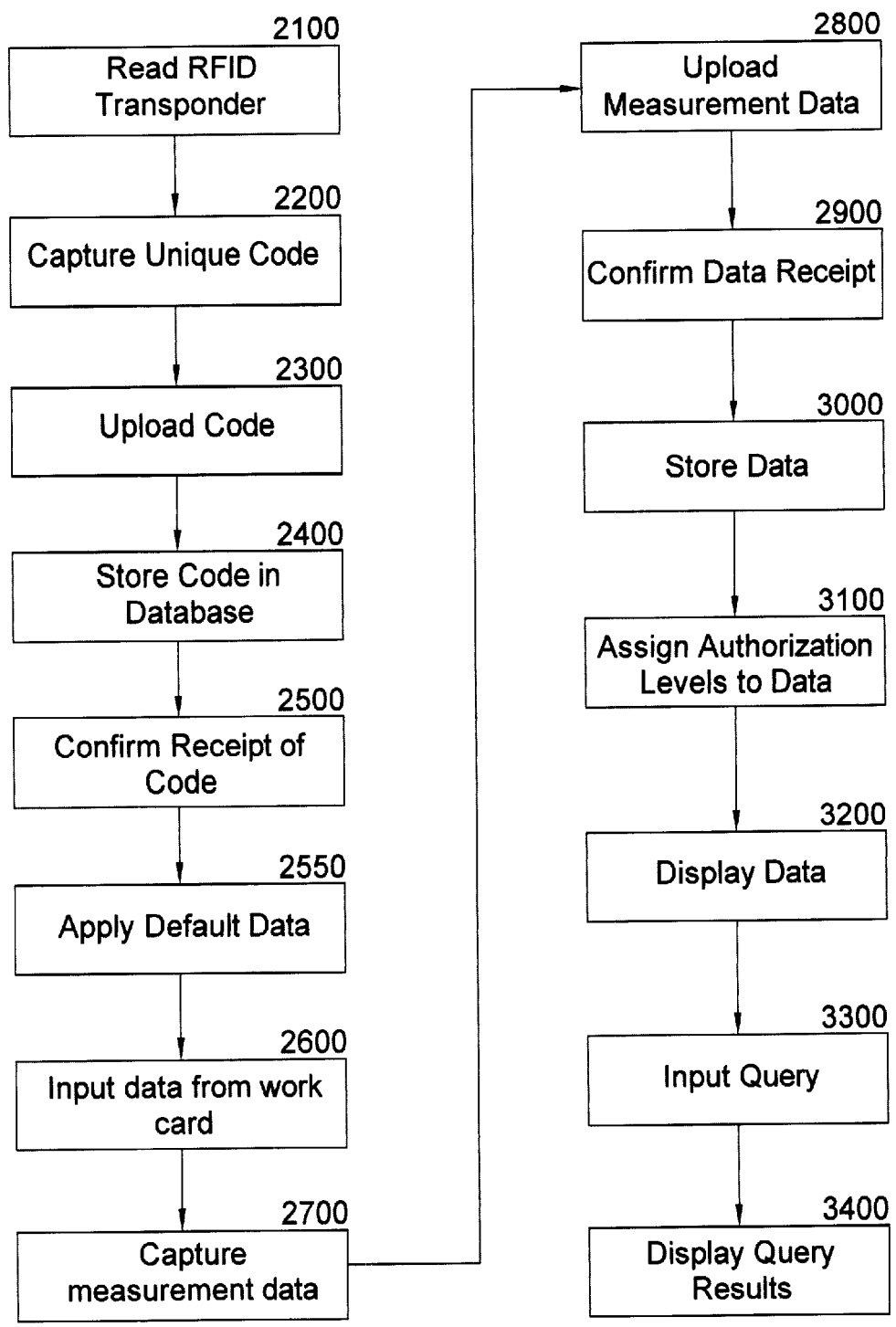
FIG. 37 is a flowchart for data collection in the embodiment of FIG. 36.

Referring now to FIG. 37, which is a flowchart demonstrating an example data collection for cattle, an animal RFID transponder is read using an RFID reader at step 2100. The unique animal code is parsed from the transponder identification from reader software at step 2200. The unique animal code is uploaded to the host computer at step 2300 and stored in the computer database at step 2400. At step 2500, the host computer confirms the receipt of the unique animal code, typically through headphones or a speaker in the vicinity of the reader. Default animal event data that is common to the animals is applied by the host computer at step 2550. Animal event data is input using an RFID Work Card and the RFID reader at step 2600. Measurement data, such as weight are captured through multiple input/output devices at step 2700 and uploaded to a host computer at step 2800. Data may be maintained on more than one database or on more than one computer. Measurement data receipt is confirmed at step 2900, typically through a speaker; and the animal data is then stored in the host computer database at step 3000. Authorization levels are assigned to the data at step 3100. The user may elect to display the history of the animal data at step 3200. The user may elect to input one or more queries on data associated with a particular animal at step 3300, and the data represented the results of the query are displayed at step 3400.

When the data collection software receives an animal unique code and transaction or event data for an animal, the software server writes the event to a BEEFLINK database. The event data is also sent to other applications such as a third party herd management program. The herd management program can be in the foreground and visible while BEEFLINK™ data collection software collects data, or it can sit in the background, simply storing data that BEEFLINK collects. The event server notifies all applications that are in connected to it, and the notification occurs for each event created. The event server sends both synchronous and asynchronous messages to other components before, during, and after any object creation or modification. It also allows for verification, modification or cancellation of the event.

Figure 38:
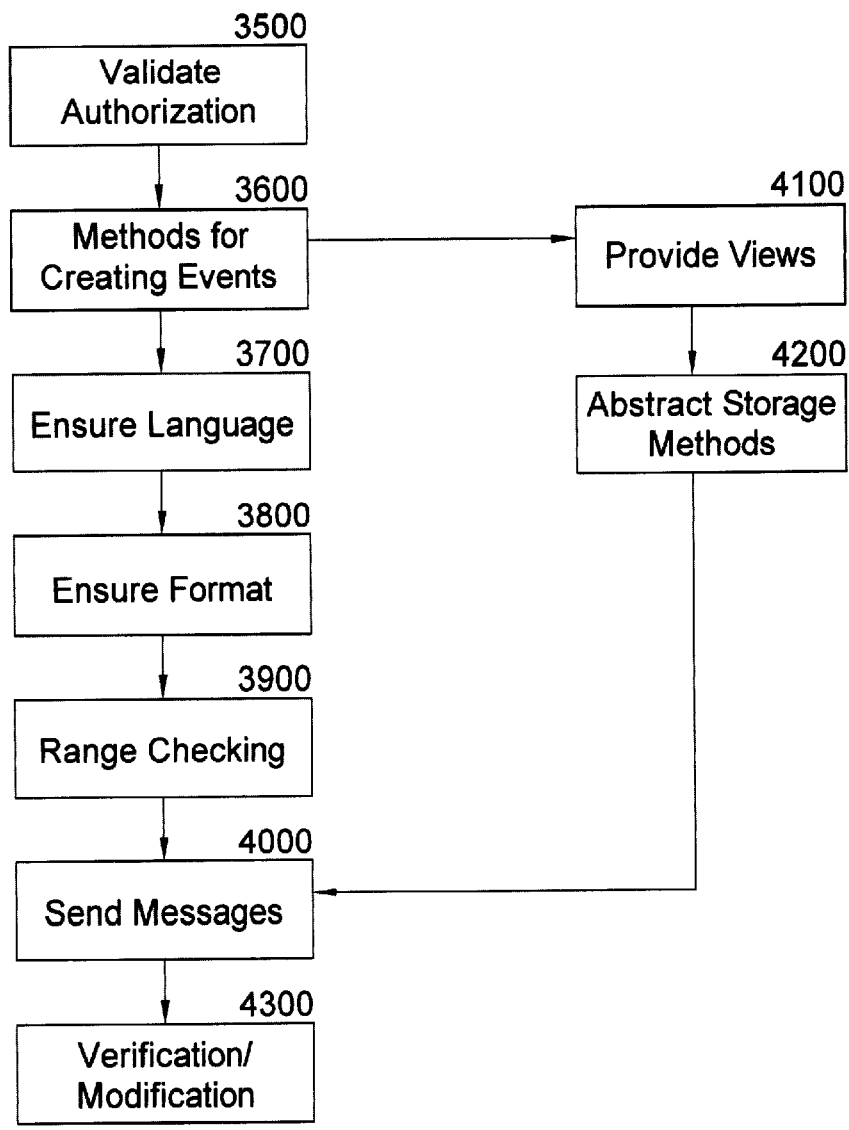
FIG. 38 is a flowchart for the event server in the embodiment of FIG. 36.

Referring now to FIG. 38, which is a flow chart illustration of the preferred methodology implemented by the event server, the software validates the connection authorization and communication encryption by user, group and component at step 3500, provides standardized methods for creating and modifying events at step 3600; ensuring that events can be represented by user-configurable language at step 3700; ensures that transactions are created in a standardized and normalized format that enables accurate functional processing at step 3800; ensures that event objects of each type are created within acceptable values, ranges and formats at step 3900; and at step 4000 sends both synchronous and asynchronous messages to connected components before, during and after any event object creation or modification. Alternatively, the event server may validate connection authorization and communication encryption by user, group and component at step 3500, provide connected or disconnected views into subsets of event data at step 4100; abstract the physical storage methods from the components at step 4200; send synchronous and asynchronous messages to connected components before, during and after any event object creation or modification at step 4000, and then allows for verification, modification and/or cancellation of the event by connected software at step 4300.

A transfer event component permits the transfer of animal data from one database to another on the same machine or within a network. Referring now to FIG. 39, the user selects a source database from which the user would like the events to be transferred at step 4400 and selects the destination database at step 4500. The user may review the event data being transferred at step 4600. Information designating that the events will be transferred is written to the database, and the transfer is executed at step 4800.

The software also provides a component for transferring animal data from one entity to another. Referring now to FIG. 40, the user specifies the entity to which the animal records are to be transferred at step 4800; and the component determines the number of animals in a group and the number of animals to be transferred at step 4900. A new event may be applied to the animal records showing that records were transferred to one entity from another at step 5000.

Figure 41:
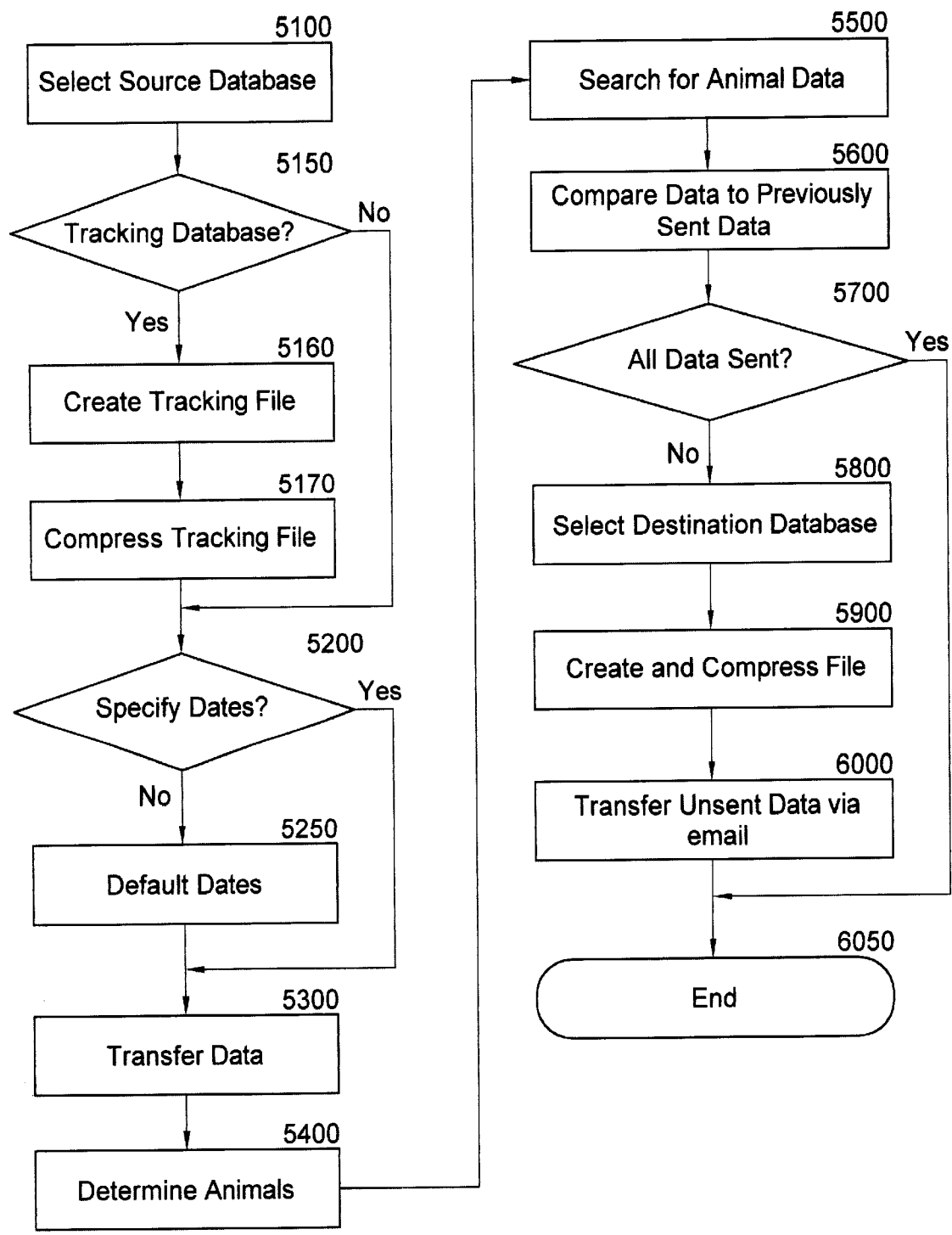
FIG. 41 is a flowchart for updating a database in the embodiment of FIG. 36.

The software permits the user to transfer animal data to a network database, a diskette or CD, or PONY EXPRESS RELAY DATABASE™ (PERD) electronic transfer application, so that the data can be shared. Data is typically transferred by electronic mail to a server database with PERD, and the server database may update the user database by sending the user all data to which the user is entitled. The server database will respond to the user by sending only data that was not previously sent to the user. Referring now to FIG. 41, at step 5100 the user selects the source database for animal data to be transferred.

At step 5150, if a tracking database is used to keep a record of animal data sent to another database or a PERD application, the user will not need to select a start date or an end date for the data to be transferred. In that case, a tracking file will be created in the tracking database at step 5160 and may be compressed at step 5170. The tracking database will allow only unsent data to be created in the update file which will be transferred back to the user. At step 5200, the user may specify the start and end dates for unsent animal data to be transferred back to the user. If a tracking database is being used, default dates will be determined at step 5250.

The transfer is preferably executed by electronic mail as in step 5300. Alternately, the data may be transferred to within a network or to another storage medium such as a floppy disk. If the data is being transferred to a network or a disk, the user does the following: selects a destination database, a tracking database to keep a record of the data sent, views the number of events to be transferred; and creates a file in which the data will be transferred. When the data is transferred by electronic mail to a PERD application's server database, the computer program product uses an unmatched query method to determine other data to which the user is entitled and shares that data with the user. Work performed at the server database may be manually executed by a system administrator. The information shared with the user is determined by the user's entity identification number. The user may have an agreement with others involved in the production/processing cycle to share information only on particular animals, or to share information on all animals with another entity.

At step 5400 the software searches the server database for all animals for which the entity using the source database has sent data. At step 5500, the software searches the server database for all animal data to which the entity is entitled according to the entity identification number. The computer program product compares all animal data at the server database to all data that has not been previously sent to the entity and to which the entity is entitled at step 5600. If the entity has received all the data to which it is entitled at step 5700, then the user is not sent any data and the component effectively ends its work. If the user is entitled to additional data, then the server or system administrator selects the user database for transferring this information at step 5800. A file is created for transferring the data at step 5900, and the file may be compressed. The unsent data is transferred to the user via electronic mail at step 6000, and the file transfer procedure ends at step 6050.

Figure 42:
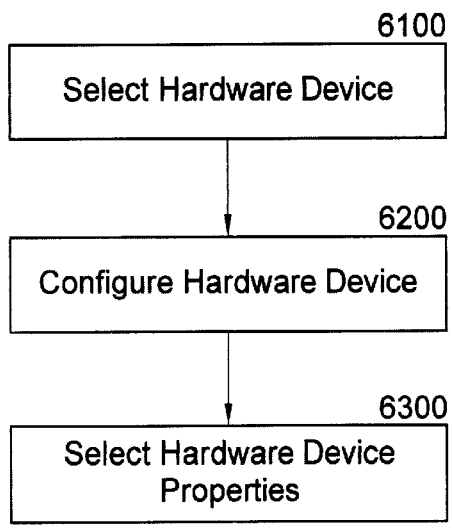
FIG. 42 is a flowchart for hardware interface in the embodiment of FIG. 36.

Referring now to FIG. 42, at step 6100 the user may select one or more hardware devices including multiple RFID readers, electronic scales, digital thermometers, and ultra sound equipment, as well as data buffering and monitoring devices. The user may configure the hardware device at step 6200 by selecting settings for communicating with the hardware device such as to initialize the device, to open or close the device, or to trigger the device to send information. User-configurable filters are applied to incoming data in order to eliminate noise or bad data caused by interference or device inaccuracies; to allow for substring matching that identifies acceptable input; to allow for capturing only specific data from the serial port; or to allow extraneous data such as prefixes, suffixes, or substrings to be stripped from final output. Data validation may be specified such that filtered data is has acceptable values, ranges, limits and timing. The data validation permits specification of a range or list of values for filtered data; and creation of "stable indicators", ensuring that incoming data conforms to the range of value, or is the same value, over a specified period of time. At step 6300, the user may select hardware properties by selecting the port number, baud rate, parity, stop bits and flow control at step 6800. Since there are a number of different device manufacturers, the user may set acceptable input criteria to ensure only accurate data strings are accepted.

Regimens permit the user to create multiple events that will be applied to all the animals processed within a given period. With cattle, that period is typically a morning or a day. Regimens allow the user to save a set of events that may be are used repeatedly for a particular group type. For instance, steer of a certain age might be worked identically, therefore the user would be collecting the same data.

Figure 43:
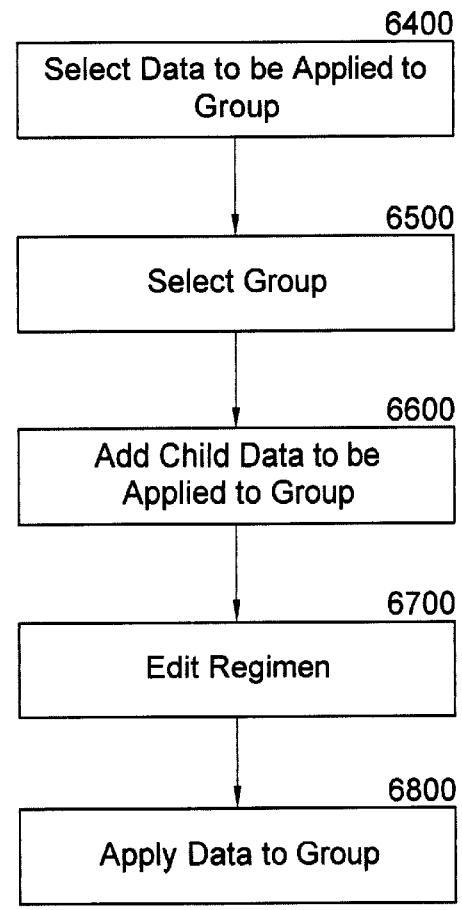
FIG. 43 is a flowchart for defining a regimen in the embodiment of FIG. 36.

Setting up a new regimen is a simple process. A new regimen folder will be created and the user preferably names the new regimen something that is easy to recognize. Referring now to FIG. 43, which is a flow chart for defining a regimen, at step 6400 the user selects the data to be applied to the group, and specifies the group at step 6500. Where the regimen has already been created, the user has the option of adding child events to the data at step 6600. For instance, "Dose" may be a child event of a "Vaccinate" event to identify what dose was given of a particular vaccine. At step 6700, the regimen man be edited such as adding one or more event to the regimen; adding child events; changing event details through a drop-down menu, such as change of vaccine dosage; or deleting one or more events or child events. The user regimen application is executed at step 6800.

Figure 44:
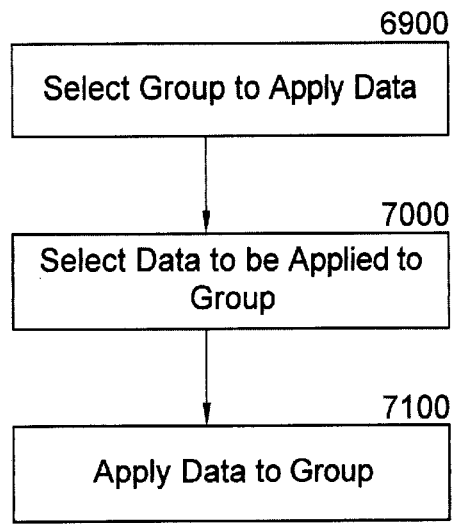
FIG. 44 is a flowchart for applying data to a group in the embodiment of FIG. 36.

The computer program also enables the user to apply individual events to an entire group of animal records, and to apply a regimen to an entire group of animal records. Referring now to FIG. 44, a group is selected at step 6900. The data to be applied to the group is selected at step 7000, and the group data is applied at step 7100.

Figure 45:
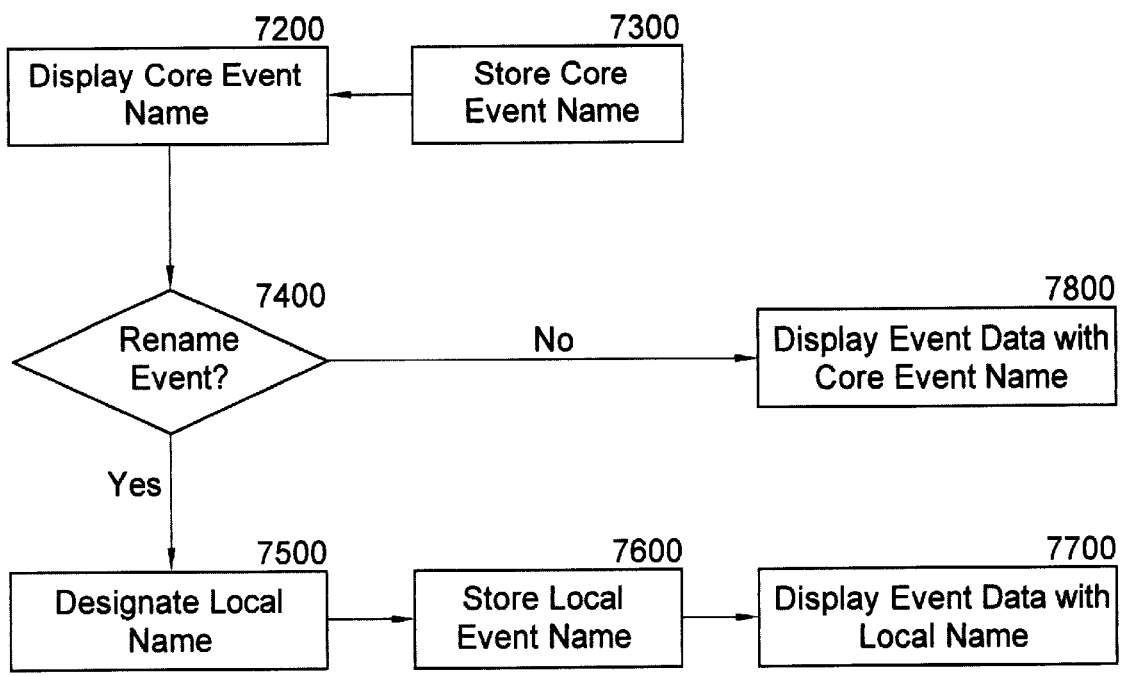
FIG. 45 is a flowchart for translation in the embodiment of FIG. 36.

The computer program product supports standardized core events, and allows the user the flexibility to use local or language terminology when applying events to an animal's record. The core events do not change, but the user may rename them for local use. Referring now to FIG. 45, for example, there is a stored core event at step 7200 which is displayed with its core event name such as "MetalTag" at step 7300. At step 7400, the user may elect to rename the event, and at step 7500, may rename the event "Bangs Tag" in Montana, or "Caravana" in Mexico. Once the user designates a new name, the name is stored at step 7600, and the user will always see the local name displayed at step 7700 for the event. At the main database, however, the event is still stored as the core event, MetalTag, and if no local name has been specified, the core event name will be displayed at step 7800. A second user, with different local names can access the event data and have it displayed with his designated local event names. This feature allows data to be normalized around the world, and a user can translate events to a new language in a short period of time. This process applies to both events and event details.

Figure 46:
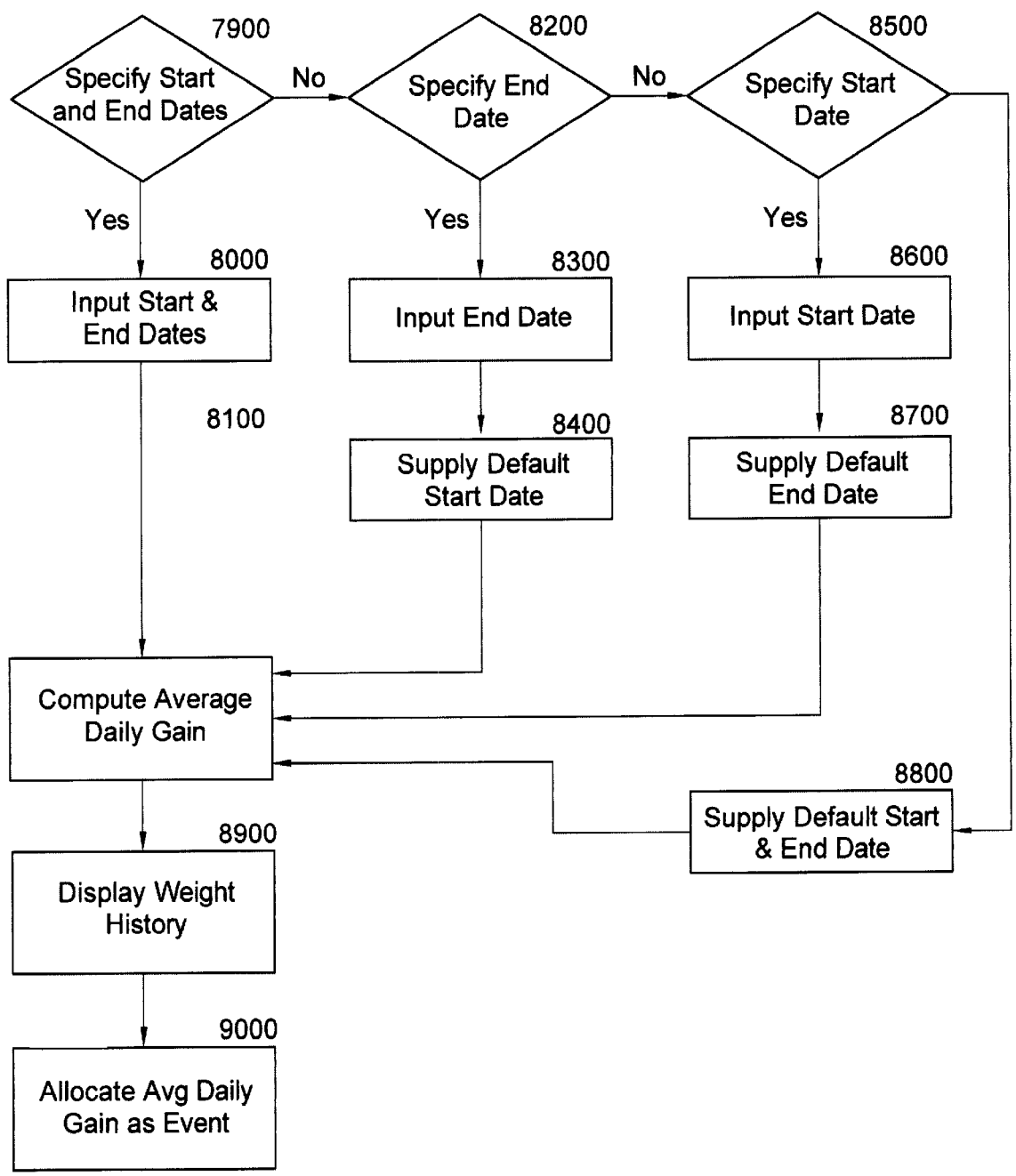
FIG. 46 is a flowchart for average daily gain determination in the embodiment of FIG. 36.
Figure 47:
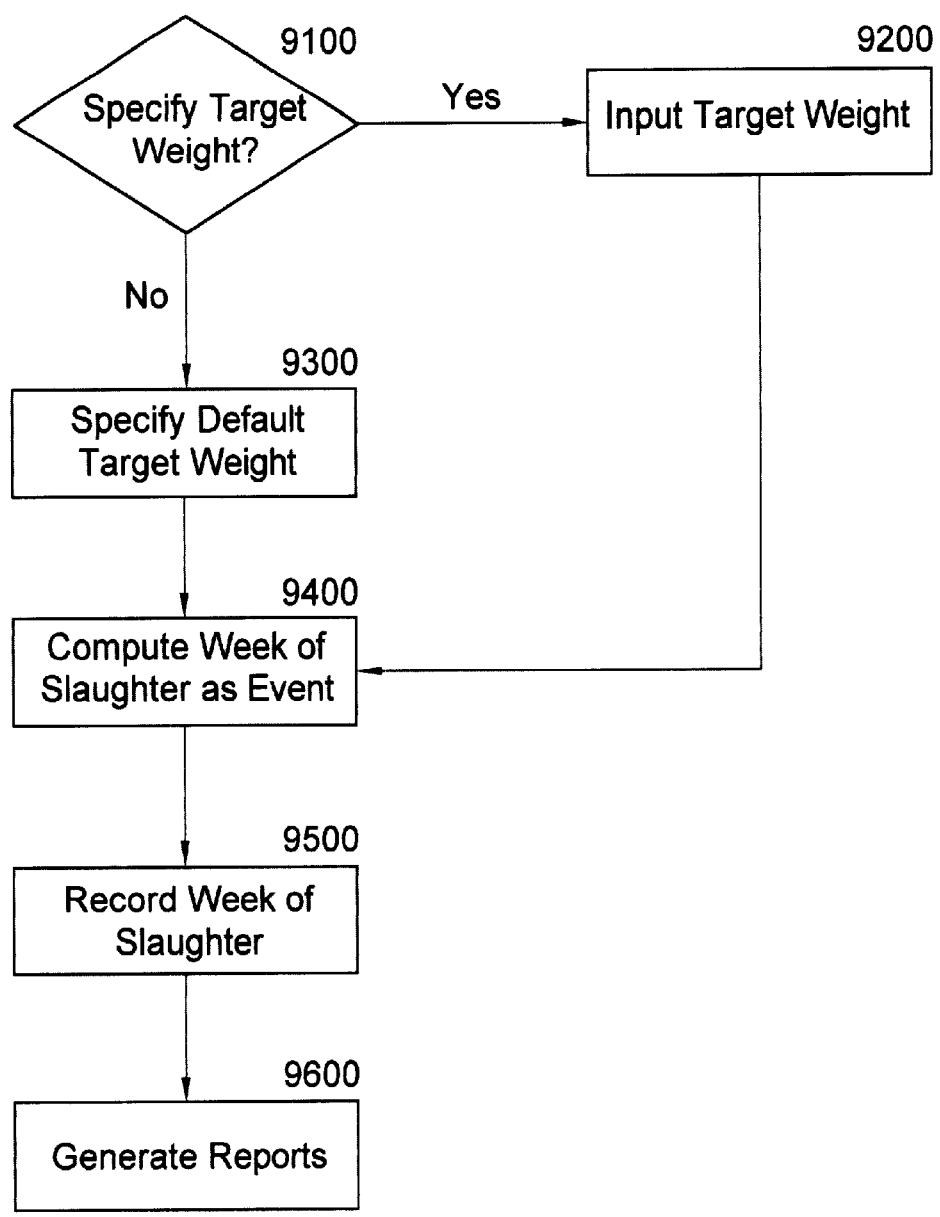
FIG. 47 is a flowchart for week to slaughter determination in the embodiment of FIG. 36.

Referring now to FIGS. 46 and 47, the user may predict how long it will take an animal to reach a target weight for slaughter based on the average weight gain per day. The daily gain component determines the average weight gain of an animal between the specified dates set by the user, or if nothing is set, from the last weight event. The ability of the user to select the date range of the weight events allows for longer periods to determine the average daily gain. The user can use this function in conjunction with the week of slaughter component to determine when the animal will be ready for the packer, or to simply gauge the progress of the animal.

Referring now to FIG. 46, at step 7900 the user is given the option of specifying both a start and an end date for average daily gain computation, and those dates may be input at step 8000. If both dates are specified, the last weight event nearest to the end date that occurs between the dates will be used. If there is no weight event that falls between the specified dates, then the first weight event that occurs following the end date will be used. Alternately at steps 8200 or 8500, the user may specify only a start or end date, and default dates will be set at steps 8300 and 8600. If no dates are specified, both default dates will be set at step 8800. Average daily gain is computed at step 8800. External speakers or another output device typically allow the user to hear the average daily gain when displayed, particularly if the user does not have a computer on the chute-side. The animal's entire weight history is displayed at step 8900. The user has the option of allocating the average daily gain as an event at step 9000.

The software contains a component for determining the best time for an animal to go to slaughter based on a target weight. Since the target week is stored in each animal's record, an inventory-type report can easily be generated, showing the number of animals expected to be ready for each week. "Default target weights" are desired weights for an animal at time of slaughter based on the sex of the animal. A default target weight will be used for setting the target weight for an animal unless a target weight is specified for individual animals.

Referring now to FIG. 47, the user is given the option of specifying a target weight at step 9100. The user may enter this target weight by keying it in as one of the predefined events at step 9200. This function can be used in several ways. If all the animals being worked will be assigned target weights individually, the predefined event for target weight can be set as part of a regimen. If the user wishes to enter the target weight event individually for each animal, but only wants to use 4 or 5 choices for target weights, then the predefined target weight event and the various details can be assigned to a WorkCard. If the user does not wish to specify a target weight at step 9100, then a default target weight is set for the animal at step 9300. The week of slaughter is computed at step 9400. The user may record as an event the best time for an animal to go to slaughter at step 9500. The user may generate reports for animals ready for slaughter each week at step 9600.

Figure 48:
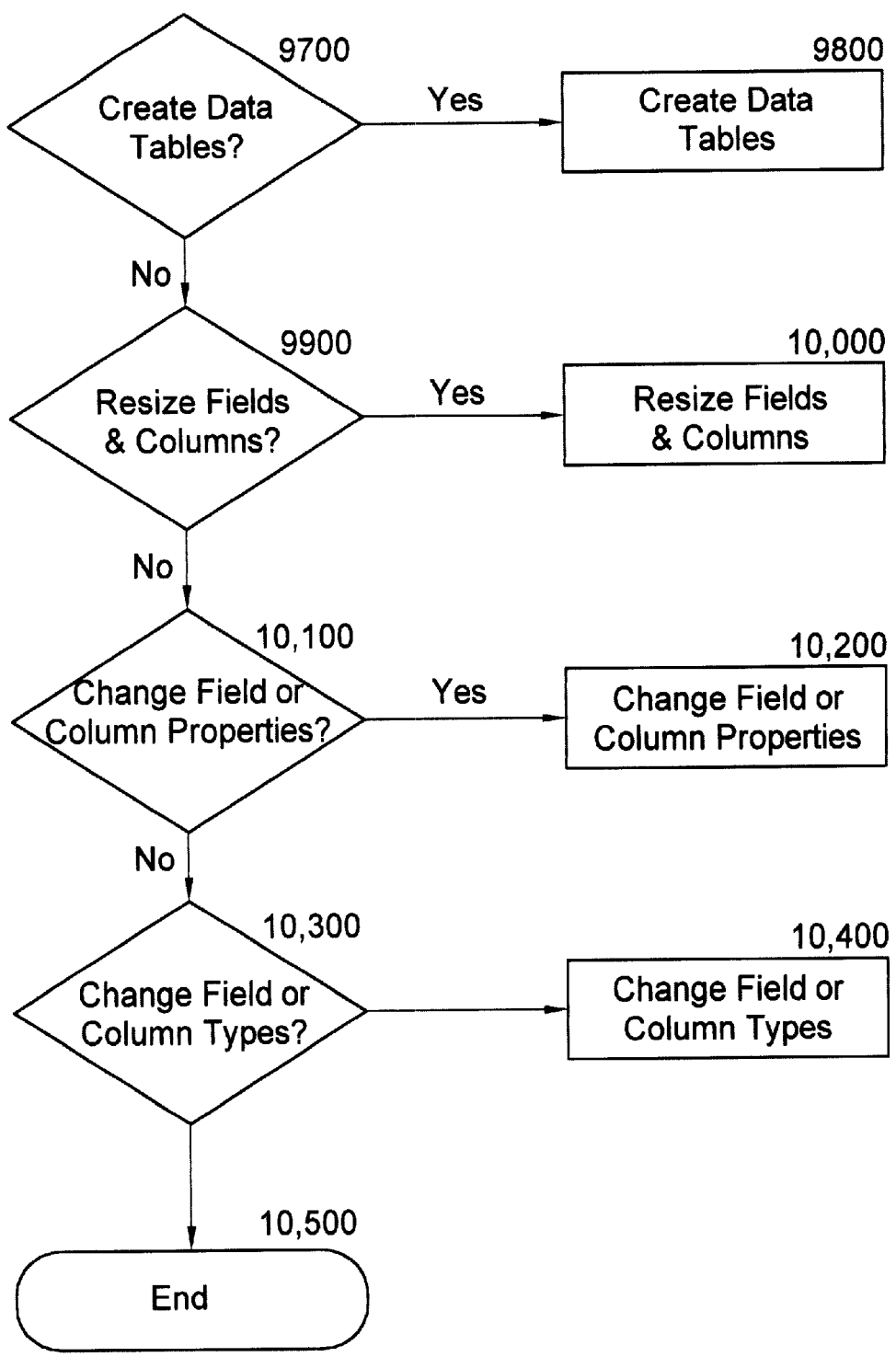
FIG. 48 is a flowchart for data formatting in the embodiment of FIG. 36.

Referring now to FIG. 48, the software supports data checking and the adjustment of the databases to fit the data. The user has the option of creating data tables at step 9700 if they do not exist; enlarging field or column sizes at step 9900 if necessary; changing field or column properties at step 10,100 if necessary; and changing field or column types at step 10,300 if possible. These modifications are executed at steps 9800, 10,000, 10,200 and step 10,400 respectively. The software modifies and enhances database schemas to ensure that data can be stored correctly; allows components to be distributed without dependent databases or tables; dynamically creates persistent storage space.

For applications that are not able to connect to the computer program product in real time, a utility helps import data after collection. The data import can be used to import a variety of data types into computer program product's database. It allows the user to add specific data like dates and entity identification codes while turning typical columnar data files into data that can be used with a transaction-style database. Imported data is modified such that it can be used with a transaction-type database.

Figure 49:
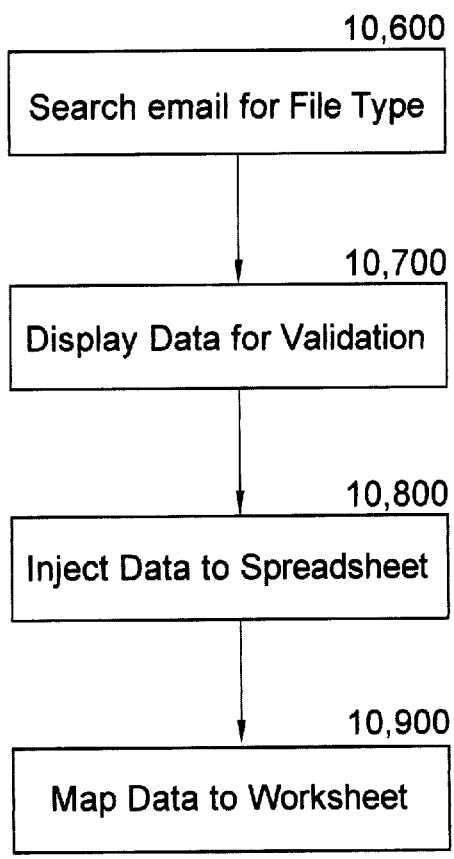
FIG. 49 is a flowchart for email transfer in the embodiment of FIG. 36.

Referring now to FIG. 49, a first data injector component includes program code for injecting the data into a spreadsheet for presentation, storage, and reporting. This tool may be used to bring together group data from feedlot management programs along with carcass data from packing plants and inject the results into a proprietary feedlot closeout spreadsheet. The program begins by searching electronic mail for files of a particular type at step 10,600 and displaying some of the data for validation at step 10,700. The data is then injected into the spreadsheet itself at step 10,800. As data flows into the spreadsheets, the data is mapped to specific worksheets and cells within the spreadsheet at step 10,900.

Figure 50:
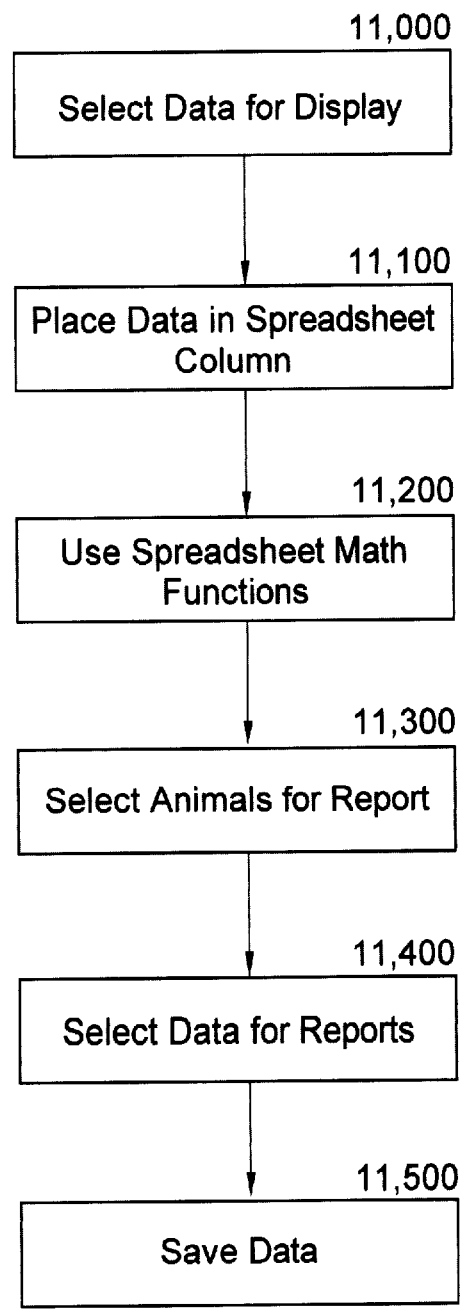
FIG. 50 is a flowchart for spreadsheet data injection in the embodiment of FIG. 36.

Referring now to FIG. 50, a user may access the data in BEEFLINK data collection software and inject it into a MICROSOFT EXCEL™ spreadsheet. The reporting tool is in the form of an ActiveX control and is sited directly in the spreadsheet. The user selects the data to be displayed at step 11,000, and places the label for that data in a spreadsheet column at step 11,100. The user can also use any mathematical functions already available in Excel such as sum or average, to perform calculations on the data at step 11,200. In order to select and filter animals and data, the user hat determines which animals will be in the report by selecting those animals at step 11,300. The animals can be selected in any combination in which the user is interested. For example, perhaps all Angus steers that were slaughtered in the last six months with an origin of a particular ranch. After the animals have been selected, the user decides what data will be displayed, such as the weaning weight, feedlot-out weight, carcass weight, carcass grade and yield and implant history. The user selects the data desired for reporting at step 11,400. Once the data is selected, the report is run and saved with a particular name at step 11,500 and can be used at any time with the current data in the database.

This architecture permits the user to adopt an appropriate technology for data collection ranging from the manual collection of the Cattle Card™ to Personal digital assistant (PDA) devices, to laptop computers, to enterprise fully on-line computing. The user may adopt thick or thin client solutions as appropriate, so that the system allows real-time computation for on the spot-decision making where appropriate. The passive data collection reduces training requirements and data errors. Distributed, cascading databases address producer privacy concerns and scaling issues, and provide a mechanism for consolidation, filtering, and benchmarking of large amounts of data.

The transaction based data structure permits new data elements to be collected by a customer without underlying change of data existing schema. The data schema can be changed at the data mart level, thereby providing more flexible and more expandable data. Each transaction is date and time stamped in order to create an inherent audit trail, higher security, and a more tamper resistant database. All records are tamper-evident.

The data can move from the transactional to a relational database in cases where the relational database is appropriate for some data processing.

The inherent parent-child relationships for each event enable the creation of many to many relationships within the database. The event translator allows a producer to use familiar familiar nomenclature.

The open system architecture supports and encourages the use of third party software for value added applications and permits Beeflink to be used with minimum disruption. Reusable architectural components permit the rapid creation of semi-custom solutions. Standard tools such as Microsoft Excel may be used for data analysis.

Real time web applications may be employed; or near-real-time web reporting reduces infrastructure cost compared to true real-time system and allows the system to become self-balancing. The system leverages Internet email by delivering updates to and from the system automatically or semi-automatically using an email system.

Top level data coordination via "Agil 411" provides network coordination while still maintaining data privacy.

The data structure and components permit an easy expansion of the system to any agricultural commodity; and to rapidly upgrade the applications due to the robustness of the transaction data structure.

EXAMPLE

Aginfolink.Net System

Referring now to FIGS. 51–58 which are screens from a web-based information system for a beef marketing alliance, shareowners in the Iowa Quality Beef Supply Network (IQBSN) may access a web site (http://www.AgInfoLink.net/IQBSN) to obtain secure harvest data through on-line reporting capabilities. IQBSN is a management tracking division of the Iowa Cattlemen's Association. The division offers producers opportunities to learn more about the quality and consistency of the beef they are producing through the creation of a database which tracks calves from birth to box.

Users visit the site for access to harvest and production data from their cattle marketing. The site provides each password-protected user an overview of harvest lot information including quality grade, yield grade, and carcass weight. Ribeye area and backfat measurements are available for measured cattle. The data is displayed in an easy to read matrix format that can be sorted, filtered, and exported to Microsoft Excel or a herd management program for further analysis. The site also offers individual animal reporting that presents IQBSN grid premiums or discounts for each animal, allowing producers almost immediate feedback on individual animal performance. The harvest data is matched with live animal production data, and the online system even allows for online addition and editing of production information.

The IQBSN harvest data is calculated on a proprietary IQB grid, negotiated by the Iowa Cattlemen's Association for their members, with Excel Corporation at their Schuyler, Nebraska plant.

The site gives the user the ability to compare a selected harvest lot to the rest of his cattle harvested within a user-specified date range. The harvest lot may also be compared to the cattle from all owners within a user-specified date range. Users benefit from the ability to benchmark their cattle performance to other cattle they have marketed and to cattle marketed by other IQBSN shareowners. System Administrators have the added ability to compare selected harvest lots or cattle within a specified date range for any owner.

Figure 51:
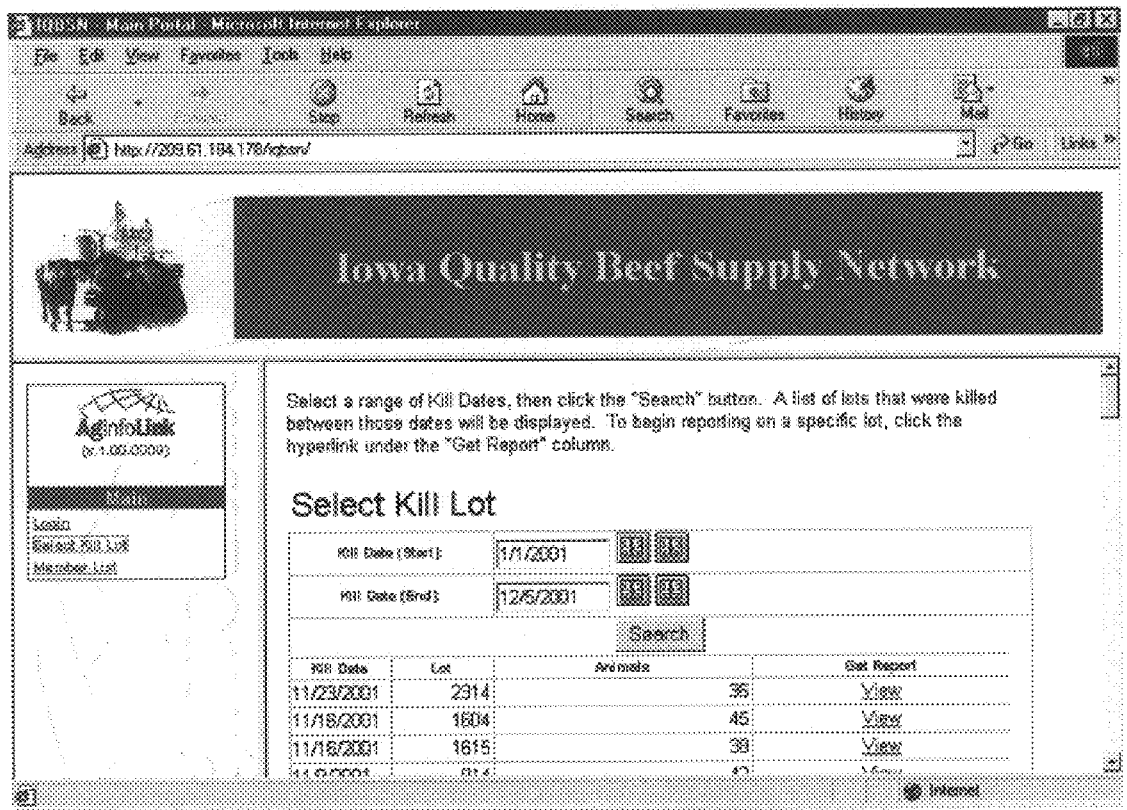
FIG. 51 is a sample Select Kill Lot screen for an example AgInfoLink.net system.

Referring now to FIG. 51, after logging on, users enter a "Select Kill Lot" for selecting animal lots for reporting. The user may select the date range of kill dates, and then click the search button. A list of lots that were killed between those dates will be displayed in reverse chronological order. Alternately, a single lot report may be directly accessed. A consolidated view of all lot reports is also available. A member is restricted from accessing lots other than those associated with his member number, while an administrator has the added ability to select kill lots for any of the members.

Figure 52:
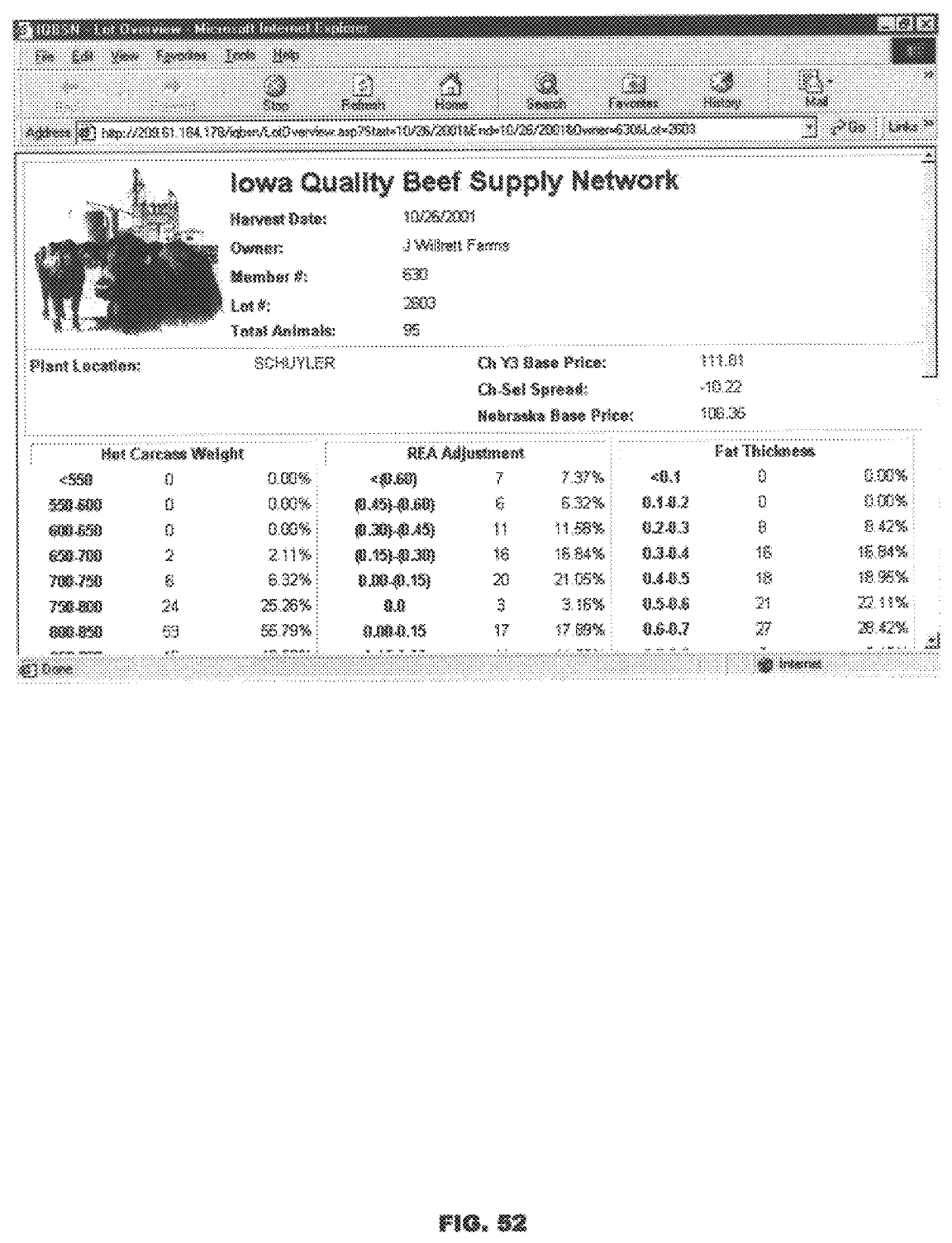

Referring now to FIG. 52, a lot overview page includes header information for the specific lot including Harvest Date, Owner, Member #, Lot #, Total Animals, Packing Plant, Base Price, Cost spread, etc.; distribution tables for the Hot Carcass Weight, REA Adjustment, Fat Thickness, and a Carcass Matrix that describes where all the animals fell along the pay grid. In this example, Lot #2630 comprised 95 animals owned by J. Wilhett Farms.

Figure 53:
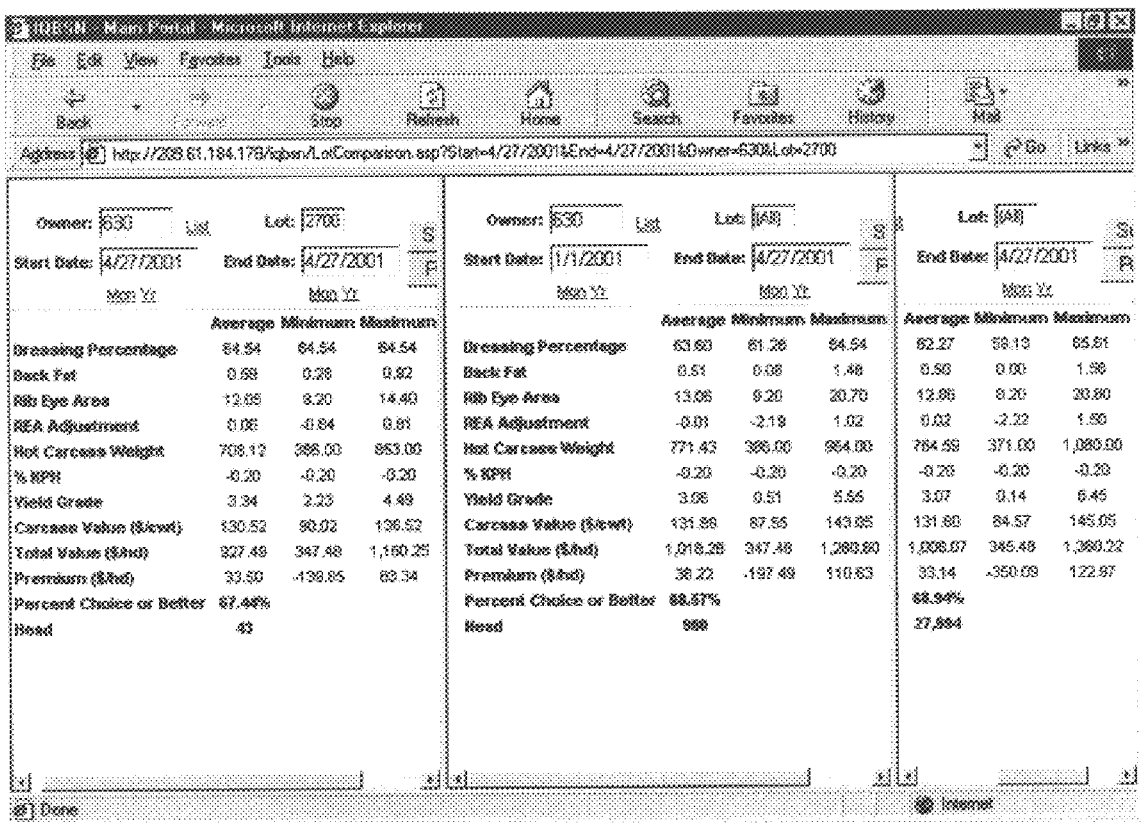
FIG. 53 is a sample Lot Comparison screen for an example AgInfoLink.net system.

Referring now to FIG. 53, a lot comparison screen permits analysis of a specific lot against all the owner's lots, as well as all other owners' lots in the data set. The date range for finding specific lots for comparison is user-selectable, but defaults to the date range selected in the "Select Kill Lot" screen. The start and end dates can be changed, and the user may select either his member number or "ALL". Using "ALL" will compare all cattle from all members in the given date range. The data includes distributions for Dressing Percentage, Back Fat, Rib Eye Area (REA), REA Adjustment, Hot Carcass weight, %KPH (Kidney/Pelvic/Heart fat), Yield Grade, Carcass Value per hundred weight, Total Value, Premium per head; as well as values for Percent Choice or Better, and Number of Head in the selected lot.

Figure 54:
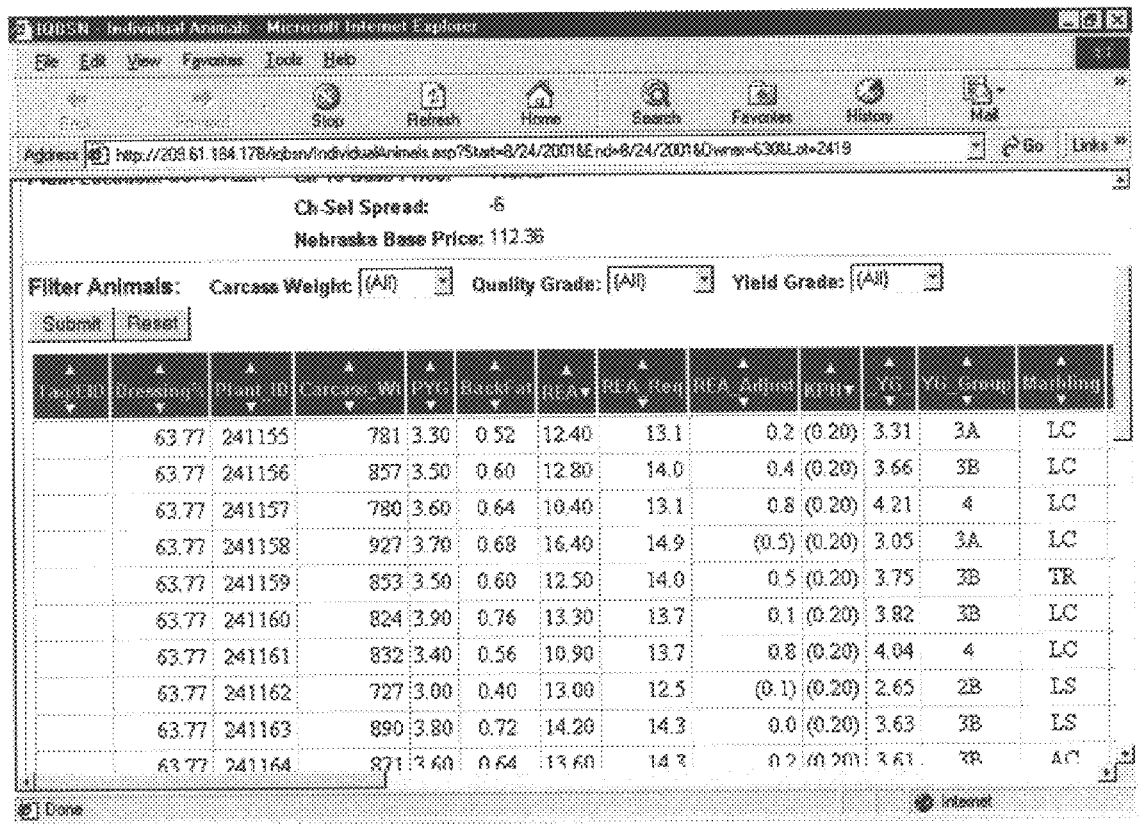
FIG. 54 is a sample Individual Animal Report screen for an example AgInfoLink.net system.

Referring now to FIG. 54, a report may be generated to show information for each animal. This report allows members to filter, sort, and edit animal data. This reports not only includes the carcass data, but also 16 points of individual live animal data that can be reviewed and/or edited at the member level. Those 16 points include the Visual ID, Dam ID, Sire ID, Sex, Calving Ease, Birth Date, Birth Weight, Weaning Weight, Age of Dam, Color, Group, Origin, Date Weaned, Feedlot In Date, Feedlot In Weight, and Average Daily Gain. The system has been designed to support any live-animal data collected at the producer, however, these 16 items support the current reporting needs of the IQBSN to track animal origin, genetics and production information.

Figure 55:
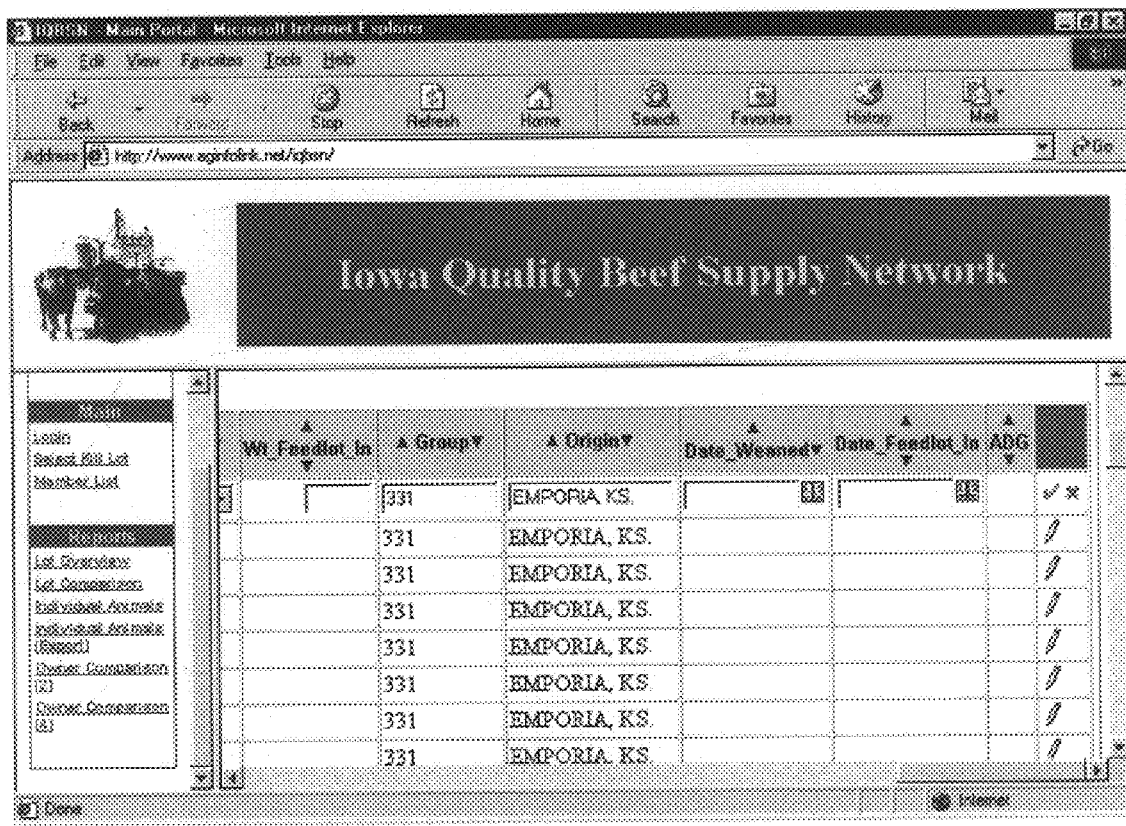
FIG. 55 is a sample Microsoft Excel Data Export screen for an example AgInfoLink.net system.

Referring now to FIG. 55, live animal data which was collected by the producer or feedlot is accessible and the user may manually add live animal data by scrolling to the right hand side of the screen, clicking on the "edit row" button, and filling in or editing the cells.

Referring now to FIG. 56, which is an example of the individual animals table without graphics, the user may click a button to export the data to MicroSoft Excel for further analysis and graphing. The file is saved as a Web Page (*.htm, *. html). MicroSoft Excel is then opened, and the saved file is opened into Excel where the user can use Excel functions to sort, filter, graph, etc. the data.

Figure 57:
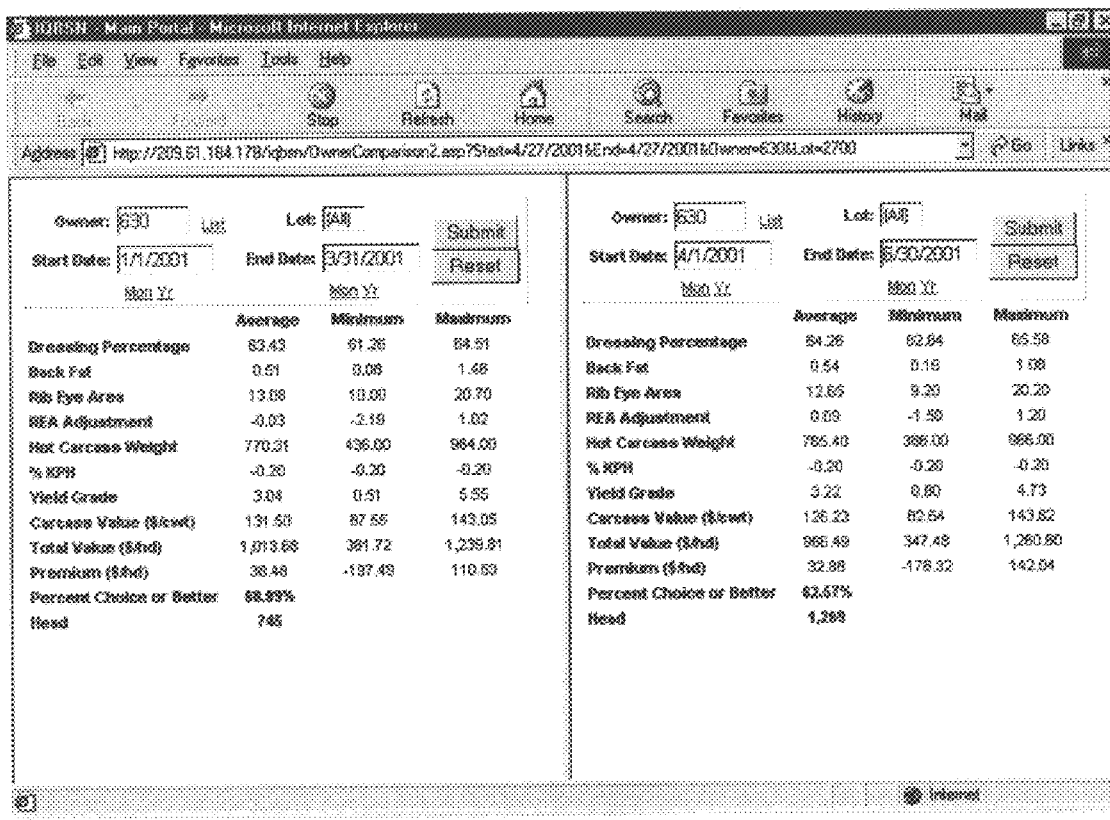
FIG. 57 is a sample 2-View Comparison screen for an example AgInfoLink.net system.
Figure 58:
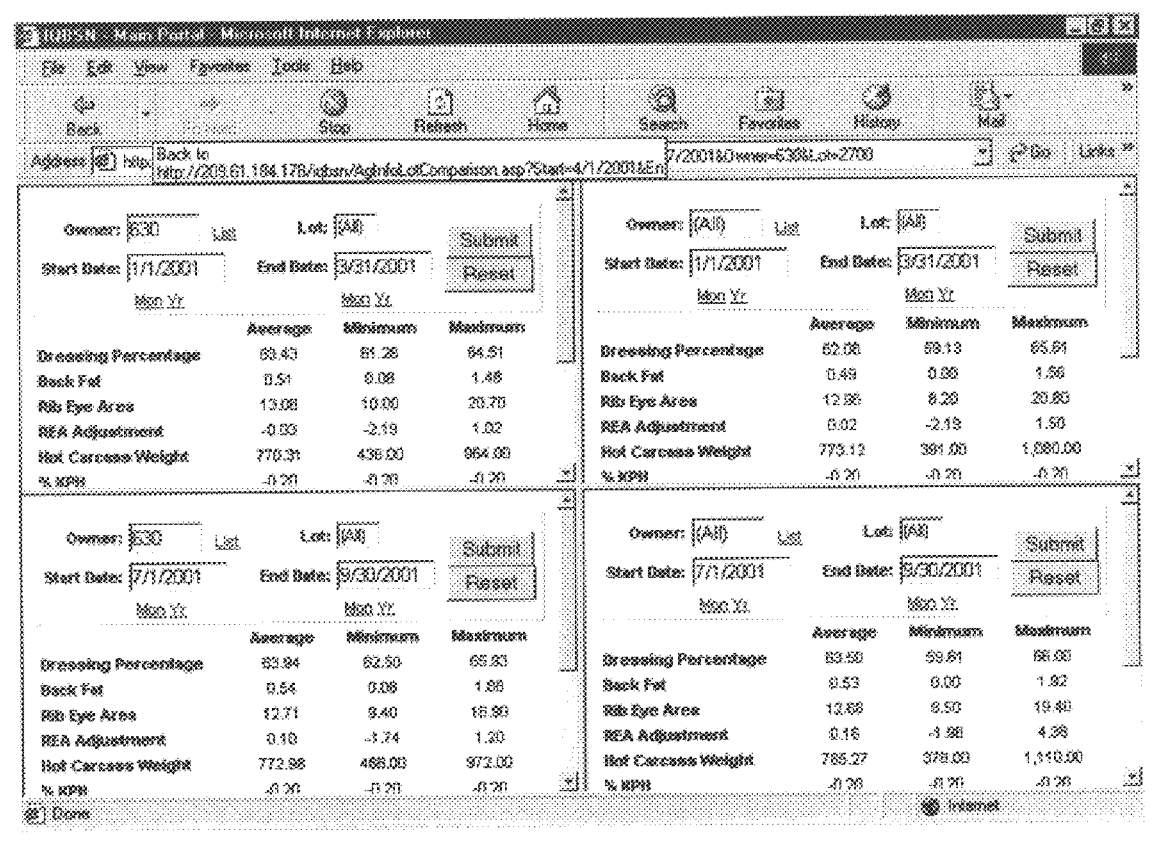

Referring now to FIG. 57 and 58, which are 2-view and 4-view examples of a comparison-reporting feature. The 2-view page by default, will show comparison tables for all cattle, across all owners, broken down into financial quarters. The user may select his lots or "ALL", and may select the date range for comparison.

The user may open a report into a new window in order to eliminate the graphics and provide a larger data viewing area.

EXAMPLE

Value Based Feeder Cattle Procurement System

In this embodiment, individual animals are identified, and attributes including breed, size, weight, frame size, and flesh condition are recorded for each animal. Values are assigned to the attributes, such as a premium of $1.00 per hundred weight for an Angus breed, a base price of $85.00 per hundred weight for a 600 pound steer, $1.00 premium per hundred weight for a specified vaccination program, or $2.00 per hundred weight premium if the animal has been weaned for at least 45 days. These values are user-adjustable. A feedlot can access the data from individual producers or groups of producers and identify specific animals that meet its target specifications, and can acquire those specific animals. This value-based approach permits the feedlot to acquire specific animals to better meet its particular business goals; and allows the producer to obtain a premium for supplying animals that provide more value to his customer.

EXAMPLE

Shared Premium Procurement

In this embodiment, a producer who believes that he is supplying better than average quality animals contracts to sell those animals to a producer for a combination of (a) an average market price immediately; and (b) a share of any premium recognized by that animal upon its sale. As the majority of cattle are now sold on a value grid system, the feedlot can share risk and reward with the producer. The feedlot operator is able to acquire better animals at a lower initial price; and the producer is able to recognize more income from animals that do prove to have additional value to the packer. Individual animal identification and data collection provide historical data that the feedlot operator can evaluate in making a purchase decision; and continued data acquisition for the animal provides health, feed efficiency, and carcass merit information that may be used by the feedlot and the producer to better identify the performance of individual animals. Those animals that demonstrate more efficiency in weight gain, better health, and higher carcass grades provide better return to the feedlot. As those animals are sold, the producer is able recognize a portion of the premium over an average carcass. For instance, a producer sells an 750 pound calf to the feedlot at the then-current average market price of $85.00 per hundred weight. The feedlot feeds the animals for about 20 weeks. The animal is then sold on a grid system and its 750 pound carcass grades at the upper ⅔ of the Choice grade which represents a price of $1.25 per pound versus $1.17 per pound for average carcass. At this point, the carcass has a value that is $60.00 higher than an average carcass. The producer receives a premium of $30.00 due to the more efficient weight gain and the higher carcass value. The feeder has recognized additional profit of $30.00 without incurring the risk of having paid a higher price for the animal.

EXAMPLE

Supply Chain Management

In this embodiment, groups such as marketing alliances have contracted with processors to supply a given quantity of a product such as beef cattle meeting specified criteria. For instance, a packer is to be supplied 1,000 cattle per week with a finished weight of 1,250 pounds and meeting certain quality characteristics. One challenge to this type of marketing alliance is that it takes 16 months from birth for a beef animal to reach the packer. The alliance uses individual animal identification and the BeefLink data collection and data sharing methods to have a visibility to prospective animals over the next 12 months. The alliance can plan the delivery of specific animals to a feedlot in order to meet this schedule, and can make decisions regarding the actual end point; or of accelerating or delaying the weight gain, and therefore delivery data, of specific animals.

EXAMPLE

Financing

A traditional livestock lender typically will finance 70% of the value of a beef calve. The owner or operator is responsible for providing the other 30%. These values are based on historical practices and average cattle values and risk. This cost of financing can be lowered by providing the traditional lenders with a lower risk, and by providing tools that permit other lenders to provide funding. A lender can reduce risk by identifying and tracking individual animals, and by knowing those animals' history and performance. A risk-adjusted financing of 85–90% of a calf can reduce ownership costs by $50.00 to $120.00. The risk can be shared by performing market analysis throughout the production cycle. Generally, the animals will become more valuable over time, but the risk of market downturns and individual animal loss can be borne by the producer more economically by adjusting the "margin call" in these circumstances than by self financing the 30%.

Some of the lender risk is due to a very small number of producers misrepresenting their collateral. Individual animal identification permits a virtual national lien registry of individual animals so that they cannot fraudulently be used as collateral in multiple loans.

EXAMPLE

Swine

Another example of livestock data collection is the use of handheld devices, work cards, and Beeflink to capture swine data including number of pigs farrowed, pig loss, and dam data.

EXAMPLE

Hand Held Device Data Collection

In this embodiment a hand held device such as the Pocket Tracker™ System, provided by InfoClip LLC, has an RFID reader and a small display screen, The device is used to read an animal or work card RFID transponder remote from a host computer. After data collection, typically from several animals the hand held device is synchronized with a host computer running the Beeflink program.

EXAMPLE

Email Update of Carcass Information

Figure 8:
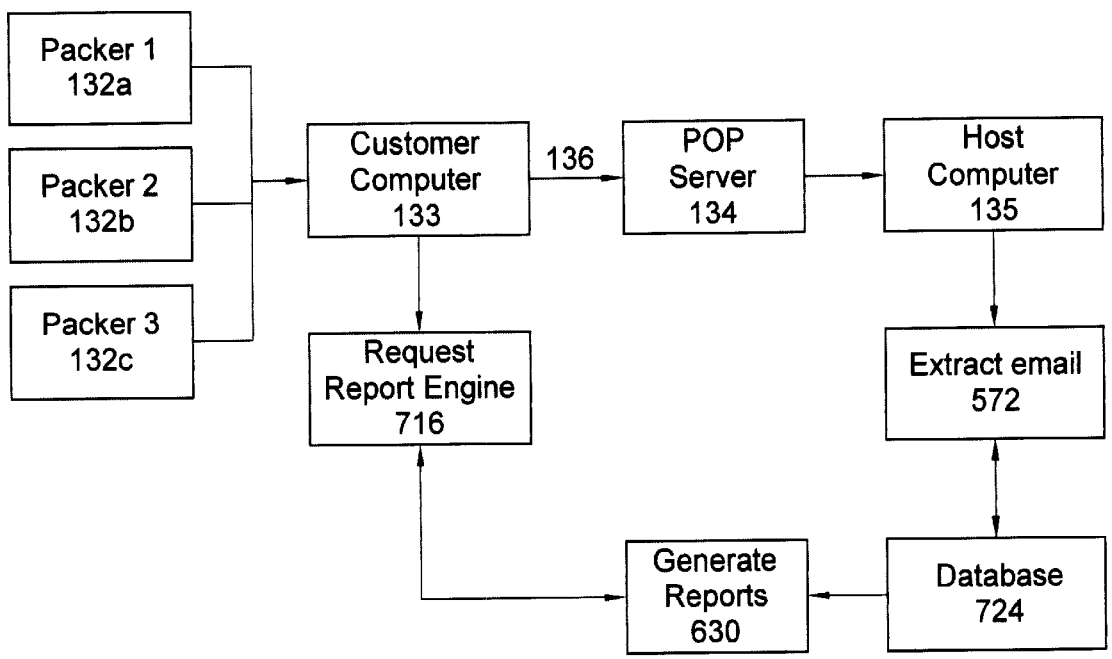
FIG. 8 is a schematic illustrating email file updates to a database.

Referring now to FIG. 8 which is a flowchart of an email file update method, data files are prepared at one or more packing plant 132a–132c to provide carcass data and other information which can be related to individual animals. The carcass data is attached as a file to an email 136 from a customer computer 133 to a host computer's 135 POP Server 134. The PEProcessing component 572 automatically searches email attachments and extracts the entity information such as sender, recipient, time sent, time received, and attachments, and prepares it for the ETL Engine 630. The information in the packer files is converted to transactional format if necessary. The customer can request reports through the Report Engine 716. The reports typically marry carcass data to individual animal data and present the data to the customer in an Excel pivot table. These updates and reports are typically performed daily.

EXAMPLE

Tracing Food Products

Referring again to FIG. 7, one or more food tracking databases 123 is extracted from a plurality of distributed PERD transaction databases 118 in order to provide a history of a food item through multiple ownership and multiple product forms, from live animal to carcass to disassembly in a packing plant to individual meat products. These food tracking databases provide a basis for auditing the ability of a supplier to track food products forward or backward, and to quickly and efficiently recall specific products when necessary.

The data was collected at step 116 with BeefLink software 20 and third party software from entities through the supply chain including cow/calf operations 83, auction sales 101, stockers 84, feeders 85, packers 86, retailers and consumers 98. This data collection is accomplished without a loss of historical data through the supply chain, without the expense and errors associated with re-entering the data at various points in the supply chain. The data is collected in, or converted to, a transactional format as described below.

The transactional database and the audit features of the data structures permit an analysis of the integrity of the data and to determine when and if any alteration was made to the data. The transactional nature of the data also provides an audit trail and chronology of events. The architecture is robust and is quickly adaptable to products at any point in a livestock supply chain. Data capture can begin immediately without waiting for business rules and database design to be developed.

In the case of red meats, some data on live animals will be available at a packer upon the animals' arrival. As events occur during the packer's slaughter, quartering, batching, de-boning, fabrication, packaging, and shipping operations, that information is entered and stored. As subsequent events occur such as batching of products, and movement of products, those events can be entered and stored. The robust methods of storing and extracting that data into meaningful information comprises the functionality of a food tracing system and other applications.

After the data is collected it is pushed at step 117 to PERD transaction databases 118, where it is available at the next stage for sharing with previous and subsequent owners. It can be sent automatically via a compacted email or electronic transfer. If the data collector is on line, the data can flow from a remote database in real time. If necessary, the data can also move physically, such as mailing a bar-coded card containing event data as in the case of the CattleCard 14; sending information along with the animal as in the case of the European passport system; or sending the information in portable data format such as bar code or RFID.

The original or raw data is stored in a transactional, event-oriented, format including Date/Time stamps for the actual event, and optionally for the time that the event was entered into a database. The database not typically a central database structure, large scale data sets are both logically and physically distributed, and organizations that are geographically distributed need a decentralized approach to reporting and decision support.

The data is extracted from the raw transactional databases, transformed into the type of data storage structure necessary for a particular application, and loaded into use-specific structures called data marts at step 120. Third party databases are typically accessed in the generation of the data as described in FIG. 6, or in the creation of data marts at step 120.

Data Structures

The data is collected, transferred, and stored in a transactional, event-oriented, row-oriented structure with very few columns. Unlike relational databases, there are no tables to relate to each other. The typical relational database structure places dynamic events that occur on the animal in their own tables. There are often tables of data related in complicated ways.

The transactional structure eliminates the need for defining relational structures between the tables by allowing all events to be entered as transactions, with event names replacing table names (i.e. Treatment becomes an event instead of a table). The transactional structure is entirely extensible, so that whenever a new type of data needs to be added, the user simply starts collecting an Event with that field's name and the data collected is stored as the Event Detail for that Event.

Referring now to FIG. 59, which is an illustration of a data structure, each item in the list represents a column in the table. The data tables comprise a set of rows, where each row is of this data structure. One column in the data table is called an "Event" and is in combination with a second column called an "Event Detail". The values in the Event column replace the columns of a typical database table so that values such as Breed, Batch#, Location, Vaccination, Carcass ID, Birth date, etc. are now simply values stored in the Event column. The values in the Event Detail column replace the values that would be in each of the many columns of a columnar database.

The event and event detail together form attributes of live animals, carcasses, or other forms in the supply chain.

The data structure also included a unique identifier such as Animal ID as the item about which information is collected. This can be any item—an animal, a carcass, a batch, a primal, a sub-primal, etc., depending on what item is having information added to it.

Every event in the table has a globally Unique Event ID associated with it so that no matter where that row of data ends up, it is uniquely identified. In order to connect two or more events, the "child" event stores the Unique Event ID of its "parent" in the Parent ID column. This allows relational features within a single-table architecture.

The Date/Time stamp column is used to insert the exact timing of the collection of an event and detail. This acts as both a chronology and an audit trail of the timing and sequence of all event entries. The Entity ID is the field that identifies the entity which posted each event. The record entry method (REM) identifies how an event entered the system, such as keyed in, scanned in, put in as a regimen, as a group, etc.

The Security Level is typically used to restrict access to portions of the data.

The transactional structure is an extremely flexible and extensible architecture. Database architects do not have to plan for, or even know about, each field that will be in a database. Nor do they need to construct the relational tables and links that are required in a relational database structure.

Data Entry and Retrieval

Figure 60:
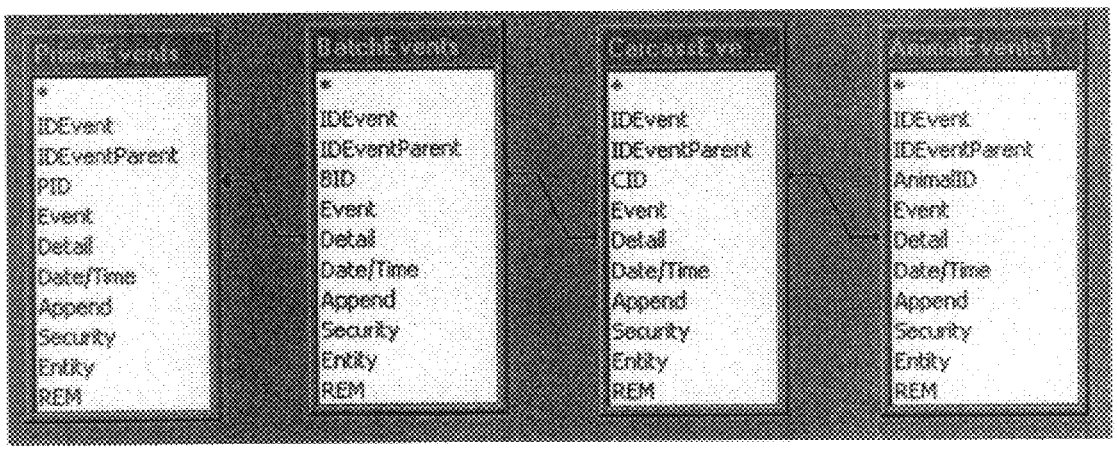
FIG. 60 illustrates a linking of events in a food tracing application.

Referring now to FIG. 60 which is an example of the linking of event tables, to link the tables together, the Event Detail of the previous data table is linked to the item ID of the next table.

As an example of the linking of event tables through the supply chain, a live animal is slaughtered, and its carcass is converted in a batch and then to primals. A live animal is uniquely identified with an Animal ID. This Animal ID is common through changes of ownership of the live animal. Changes in ownership of the live animal are recorded as events for both the seller and the buyer where an event detail identifies the buyer and the seller, respectively. In this manner, the ownership of the live animal can be traced, and events and event details from every owner can be accrued.

This same type of logging occurs when the form of the livestock item changes such as at slaughter where a live animal is converted to a carcass. In this case, the identification changes, but a unique carcass id can be linked to a unique animal ID by providing the carcass ID as an event detail in the feedlot's Animal Events table as illustrated in FIG. 60. An event, CID, has an associated event detail of the unique carcass id.

As the carcass is disassembled in a packing plant or subsequent processing plant, similar Batch IDs and Primal Ids can be linked through event details of the previous owner or processing stage, thereby enabling access, in either direction, of all data related to each of the entities associated with each form of the livestock.

For efficiency, the "411" data warehouse 119 is typically maintained to identify each entity associated with a particular animal, carcass, etc.

This structure permits a flexible and extensible method for tracking livestock and other agricultural items through multiple owners and multiple forms, including assembly or disassembly.

The transactional table structure is identical regardless of the item for which data is being entered.

Data entry is typically performed at various disconnected sites into separate databases. However, since the data is being collected on different items—animals, batches, primals, etc., the transactional table for all animals, a separate table for all batches, another for all primals, etc. can be located in one central database or in disconnected structures that link the tables. Once data is received into its correct table, the system can be queried to perform traceback and trace forward functions. Additionally, the data can be extracted into specific data marts at step 120 for labeling and lookup operations.

The structure is extensible to further processing; for instance, the primals could be split into sub-primals, and the transactional structure used to link back to PID. Once the relationships between the event tables are established, the data from all of the tables can be queried, displayed, looked up, moved, etc.

When a Batch ID number is queried, the Animal IDs, Carcass IDs, and the Primal IDs that make up that batch can be identified, and data associated with those other entities can be accessed. Similarly, the query of any of the other entities will also provide limited access to data for the other entities. These same results can come in the form of a report or as data used to describe or list the makeup of a batch for labeling and/or verification reasons.

Therefore, an animal may be traced forward to see where the primals for that animal have been sent; or products such as primals may be traced to a batch and individual animals within the batch. Even if individual carcass information is lost in a patch process, the list of animals that make up the batch are known. Alternately, a batch size of one can be used to provide a certain linkage to a specific carcass and animal.

The event structure contains full auditability of each atomic data item.

The Events of this structure standardize the actual data into an atomic level: an Event is an attribute with relationships to rows and other columns. In this data sharing environment, the structure of the tables will always the same, as well as the structure of each row.

With this structure, data can be collected and shared, so that business rules can be applied once they are discovered.

The advantages of the architecture include:

- the ability of each producer in the supply chain to select an appropriate data collection technology such as manual collection, hand held devices, laptop computer, or on line collection;
- the use of passive data collection to reduce keyboard entry;
- the selection of appropriate thin client or thick client solution at any point in the supply chain;
- the use of distributed, cascading databases which, support various security levels, to address producer privacy concerns and provide scaling while still providing mechanisms for consolidation, filtering, and benchmarking;
- the use of a transaction based data structure to permit new data elements to be collected without changing the underlying data schemes and to support appropriate data schemes at the data mart level;
- inherent parent-child relationship for each event, thereby supporting many-to-many relationships;
- an event translator to permit each producer to use nomenclature familiar to him;
- underlying software cores to providing rapid interfacing to third-party solutions;
- a Date-time stamped audit trail for all transactions; and tamper-evidence records, for reducing post-hoc fraud;
- producer data ownership and routing to reduce resistance to imputing data into the system;
- the ability to support transaction pricing to lower entry cost;
- an open systems architecture to support third party applications;
- a rugged hardware and software system for real world operations;
- reusable components to support fast implementation of semi-custom solutions;
- leveraging of familiar standard uses spreadsheet tools for data analysis;
- real-time web or near real-time reporting to reduce infrastructure cost relative to true real-time systems and to support an appropriate level of computing at each point in the supply chain;
- top level data coordination through the "All" data warehouse to provide network coordination which maintaining data privacy; and
- support on Internet email as a familiar data transfer mechanism.

EXAMPLE

Source Verification of Feeds

One aspect of source verification of livestock is the ability to determine whether a particular animal was fed genetically modified grain; feed made from partially from animal protein components such as that associated with BSE; and whether an animals diet has been limited to organic products. This type of analysis permits a vendor to confirm compliance with regulatory restrictions, and it permits the vendor to certify product as being GM-free or organic.

The BeefLink system permits feeding sessions to be events and permits the identification of particular feed lots. These events are similar to the way that vaccination events can reference specific lot numbers of vaccine. In the vaccine example, overall pharmaceutical usage can be compared to reported event vaccinations. In the feed example, specific lots of grain or other feed can be identified so that source and nature of the feed can be tracked; and the reported usage of the feed can be compared to supply records.

In a manner similar to that described in the above embodiment, specific animals can be linked with events and event details to specific feed identification can be tracked backward and forward in both the feed supply chain and the animal supply chain. In one application of this example, contaminated feed can be linked to specific animals or groups of animals, or animal feeds can be source verified to be organic or non-genetically modified.

What is claimed is:

1. A wireless livestock data collection system comprising a host computer with data collection software;
a base station connected to the host computer;
a means for unique animal identification;
a plurality of unique animal identification readers in wireless communication with the base station; and
a plurality of data measurement devices in wireless communication with the base station.

2. The wireless livestock data collection system of claim 1 wherein the base station includes a global positioning system device.

* * * * *